(12) United States Patent
Gil

(10) Patent No.: US 12,049,164 B2
(45) Date of Patent: Jul. 30, 2024

(54) AUTOMATED PACKAGE TRANSPORT VEHICLE

(71) Applicant: United Parcel Service of America, Inc., Atlanta, GA (US)

(72) Inventor: Julio Gil, Veldhoven (NL)

(73) Assignee: UNITED PARCEL SERVICE OF AMERICA, INC., Atlanta, GA (US)

(*) Notice: Subject to any disclaimer, the term of this patent is extended or adjusted under 35 U.S.C. 154(b) by 666 days.

(21) Appl. No.: 17/185,374

(22) Filed: Feb. 25, 2021

(65) Prior Publication Data

US 2021/0179357 A1 Jun. 17, 2021

Related U.S. Application Data

(63) Continuation of application No. 16/189,853, filed on Nov. 13, 2018, now Pat. No. 10,934,093.

(Continued)

(51) Int. Cl.
| | |
|---|---|
| *B60P 1/64* | (2006.01) |
| *B25J 5/02* | (2006.01) |
| *B25J 5/04* | (2006.01) |
| *B25J 15/02* | (2006.01) |
| *B25J 15/04* | (2006.01) |
| *B60P 1/44* | (2006.01) |
| *B60P 1/54* | (2006.01) |

(Continued)

(52) U.S. Cl.
CPC . *B60P 1/64* (2013.01); *B25J 5/02* (2013.01); *B25J 5/04* (2013.01); *B25J 15/026* (2013.01); *B60P 1/44* (2013.01); *B60P 1/4471* (2013.01); *B60P 1/54* (2013.01); *B60P 3/007* (2013.01); *B65G 1/0407* (2013.01); *B65G 1/0421* (2013.01); *B65G 1/14* (2013.01)

(58) Field of Classification Search
CPC .. B60P 1/64; B60P 1/44; B60P 1/4471; B60P 1/54; B60P 3/007; B60P 7/0892; B65G 1/14; B65G 1/0407; B65G 1/0421; B65G 1/02; B25J 5/02; B25J 5/04; B25J 15/026
See application file for complete search history.

(56) References Cited

U.S. PATENT DOCUMENTS

| | | |
|---|---|---|
| 833,887 A | 10/1906 | Maccallum |
| 918,039 A | 4/1909 | Grundmann |

(Continued)

*Primary Examiner* — Thomas Randazzo
(74) *Attorney, Agent, or Firm* — Shook, Hardy & Bacon L.L.P.; Elena K. McFarland

(57) ABSTRACT

Embodiments provide shelves, bracket systems, automated picker robots, totes, and other features that may be used with delivery vehicle configurations that have automated cargo areas. A delivery vehicle may include a picking robot that selectively retrieves packages for delivery without requiring substantial human intervention for locating those packages. The cargo area of the delivery vehicle may further comprise a plurality of customizable shelving units that generate custom-sized shelves for packages. The shelves may include a plurality of individually movable shelf brackets having retaining members that pivot between an extended and retracted position to hold the package in place and to enable the picking robot to retrieve the package from the shelf. Another embodiment provides for a tote having a drive mechanism to hold letters so that a letter may be automatically retrieved from the cargo arear and provided at a delivery location.

20 Claims, 27 Drawing Sheets

Related U.S. Application Data

(60) Provisional application No. 62/585,867, filed on Nov. 14, 2017.

(51) Int. Cl.
  *B60P 3/00* (2006.01)
  *B65G 1/04* (2006.01)
  *B65G 1/14* (2006.01)

(56) References Cited

U.S. PATENT DOCUMENTS

| | | | |
|---|---|---|---|
| 2,218,894 A | 10/1940 | Schlosser | |
| 2,453,254 A | 11/1948 | Odin | |
| 2,767,950 A | 10/1956 | Bellon et al. | |
| 2,772,846 A | 12/1956 | Skar | |
| 2,889,907 A | 6/1959 | Sullivan | |
| 2,943,742 A | 7/1960 | Colley | |
| 3,126,892 A | 3/1964 | French | |
| 3,561,713 A | 2/1971 | Berkowitz | |
| 3,652,048 A | 3/1972 | Hartman | |
| 3,881,585 A | 5/1975 | Coleman et al. | |
| 3,888,441 A | 6/1975 | Rebentisch | |
| 3,966,050 A | 6/1976 | Dahl | |
| 3,984,163 A | 10/1976 | Boorman et al. | |
| 4,067,265 A * | 1/1978 | Watson | B62B 5/049 |
| | | | 211/150 |
| 4,378,925 A | 4/1983 | Griffin | |
| 4,415,090 A | 11/1983 | Bustos | |
| 4,437,572 A | 3/1984 | Hoffman | |
| 4,715,765 A | 12/1987 | Agnoff | |
| 4,784,547 A | 11/1988 | Prinz et al. | |
| 4,953,719 A | 9/1990 | Spamer | |
| 5,318,264 A | 6/1994 | Meiste | |
| 5,387,064 A * | 2/1995 | Cardinal | B62D 33/042 |
| | | | 414/679 |
| 5,524,981 A | 6/1996 | Herrmann et al. | |
| 5,718,343 A | 2/1998 | Belokin et al. | |
| 5,740,926 A | 4/1998 | Mulloy | |
| 5,873,473 A | 2/1999 | Pater | |
| 5,887,732 A | 3/1999 | Zimmer et al. | |
| 6,132,158 A | 10/2000 | Pfeiffer et al. | |
| 6,179,152 B1 | 1/2001 | Sarnowski | |
| 6,189,707 B1 | 2/2001 | Meyers et al. | |
| 6,196,141 B1 | 3/2001 | Herron et al. | |
| 6,230,908 B1 | 5/2001 | Sloan et al. | |
| 6,405,883 B1 | 6/2002 | Schambach | |
| 6,601,715 B2 | 8/2003 | Hardy | |
| 6,763,930 B2 | 7/2004 | Johnson et al. | |
| 7,338,110 B1 * | 3/2008 | Eckloff | B60R 11/00 |
| | | | 296/3 |
| 7,497,533 B2 | 3/2009 | Remmers | |
| 7,506,879 B1 * | 3/2009 | Frahm | B60P 1/64 |
| | | | 193/41 |
| 7,690,519 B2 | 4/2010 | Kahl et al. | |
| 7,967,268 B2 | 6/2011 | Herron et al. | |
| 8,256,602 B2 | 9/2012 | Huber et al. | |
| 8,408,666 B2 | 4/2013 | Armstrong et al. | |
| 8,453,982 B2 | 6/2013 | Baruch | |
| 8,556,060 B2 | 10/2013 | Sejourne | |
| 8,843,231 B2 | 9/2014 | Ragusa et al. | |
| 9,004,427 B2 | 4/2015 | Irudayaraj et al. | |
| 9,115,927 B2 | 8/2015 | Rackley et al. | |
| 9,451,836 B2 | 9/2016 | Szpak et al. | |
| 9,599,459 B1 | 3/2017 | Janicki | |
| 2001/0047972 A1 | 12/2001 | Plutsky | |
| 2005/0211140 A1 * | 9/2005 | McDonald, II | A47B 57/20 |
| | | | 108/108 |
| 2005/0230338 A1 | 10/2005 | Farinola et al. | |
| 2006/0169659 A1 | 8/2006 | Robinson et al. | |
| 2007/0131633 A1 | 6/2007 | Ferm | |
| 2007/0267271 A1 | 11/2007 | Brown | |
| 2008/0083353 A1 | 4/2008 | Tuttle et al. | |
| 2008/0319574 A1 * | 12/2008 | Wilke | G06Q 10/08 |
| | | | 700/226 |
| 2010/0140202 A1 | 6/2010 | Janis | |
| 2011/0001415 A1 | 1/2011 | Park et al. | |
| 2011/0100942 A1 | 5/2011 | Spizman et al. | |
| 2011/0315507 A1 | 12/2011 | Yang et al. | |
| 2012/0103922 A1 | 5/2012 | Bird et al. | |
| 2013/0106259 A1 | 5/2013 | Lockwood et al. | |
| 2013/0304349 A1 | 11/2013 | Davidson | |
| 2014/0083958 A1 | 3/2014 | Leonelli et al. | |
| 2014/0212253 A1 * | 7/2014 | Bryant | B60P 1/64 |
| | | | 414/813 |
| 2014/0263112 A1 | 9/2014 | Bird et al. | |
| 2014/0299559 A1 | 10/2014 | Bird et al. | |
| 2016/0189087 A1 * | 6/2016 | Morton | G06Q 10/083 |
| | | | 705/337 |
| 2017/0225601 A1 * | 8/2017 | Borders | B60P 1/6418 |
| 2017/0291766 A1 * | 10/2017 | Orth | G06Q 10/0832 |
| 2017/0313421 A1 | 11/2017 | Gil | |
| 2018/0311704 A1 | 11/2018 | Gil | |
| 2019/0038023 A1 | 2/2019 | Stocker | |
| 2019/0113935 A1 * | 4/2019 | Kuo | G06Q 50/40 |
| 2019/0143872 A1 | 5/2019 | Gil | |
| 2019/0193939 A1 * | 6/2019 | Meng | G06Q 10/06 |
| 2020/0178688 A1 | 6/2020 | Graber et al. | |

* cited by examiner

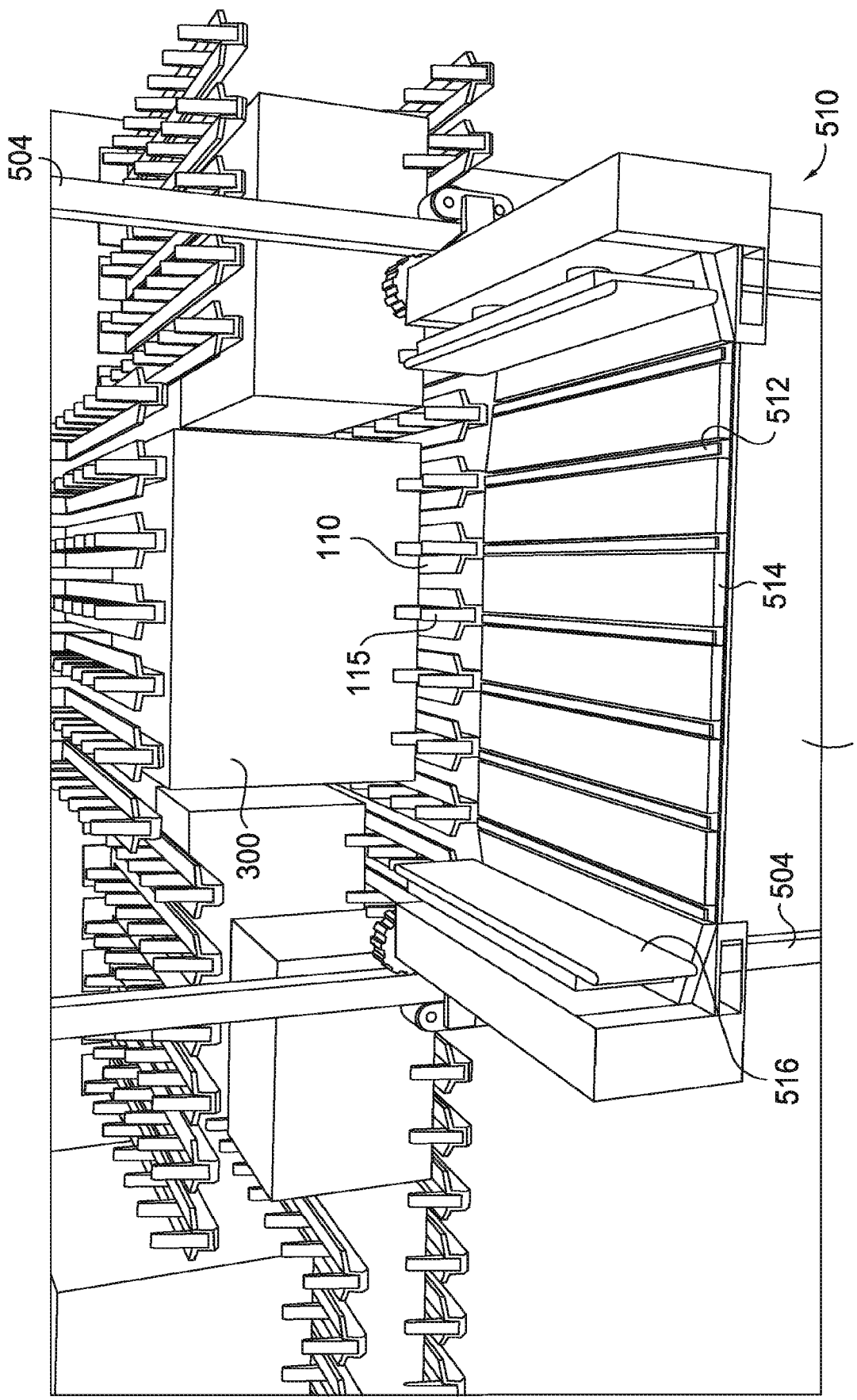

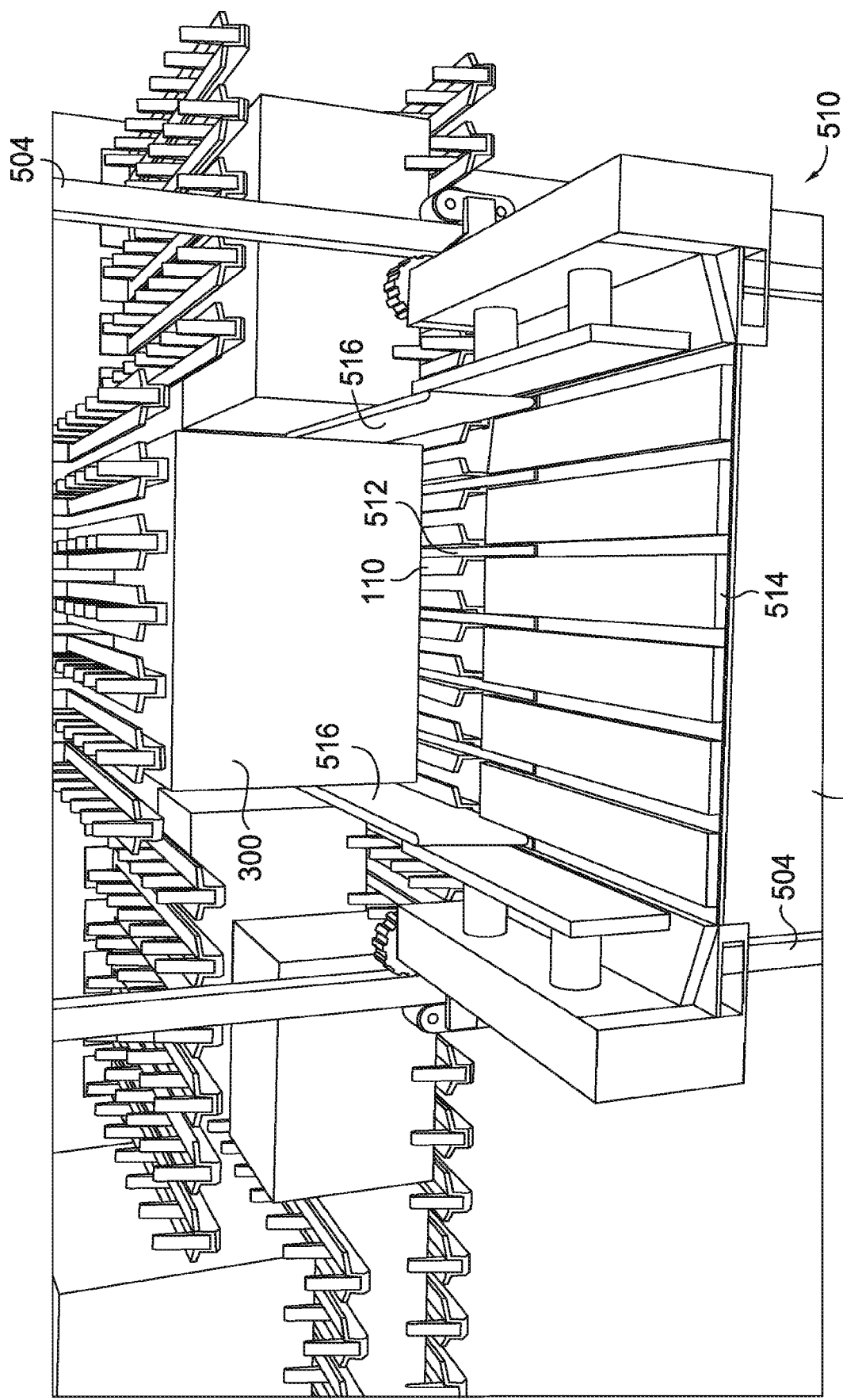

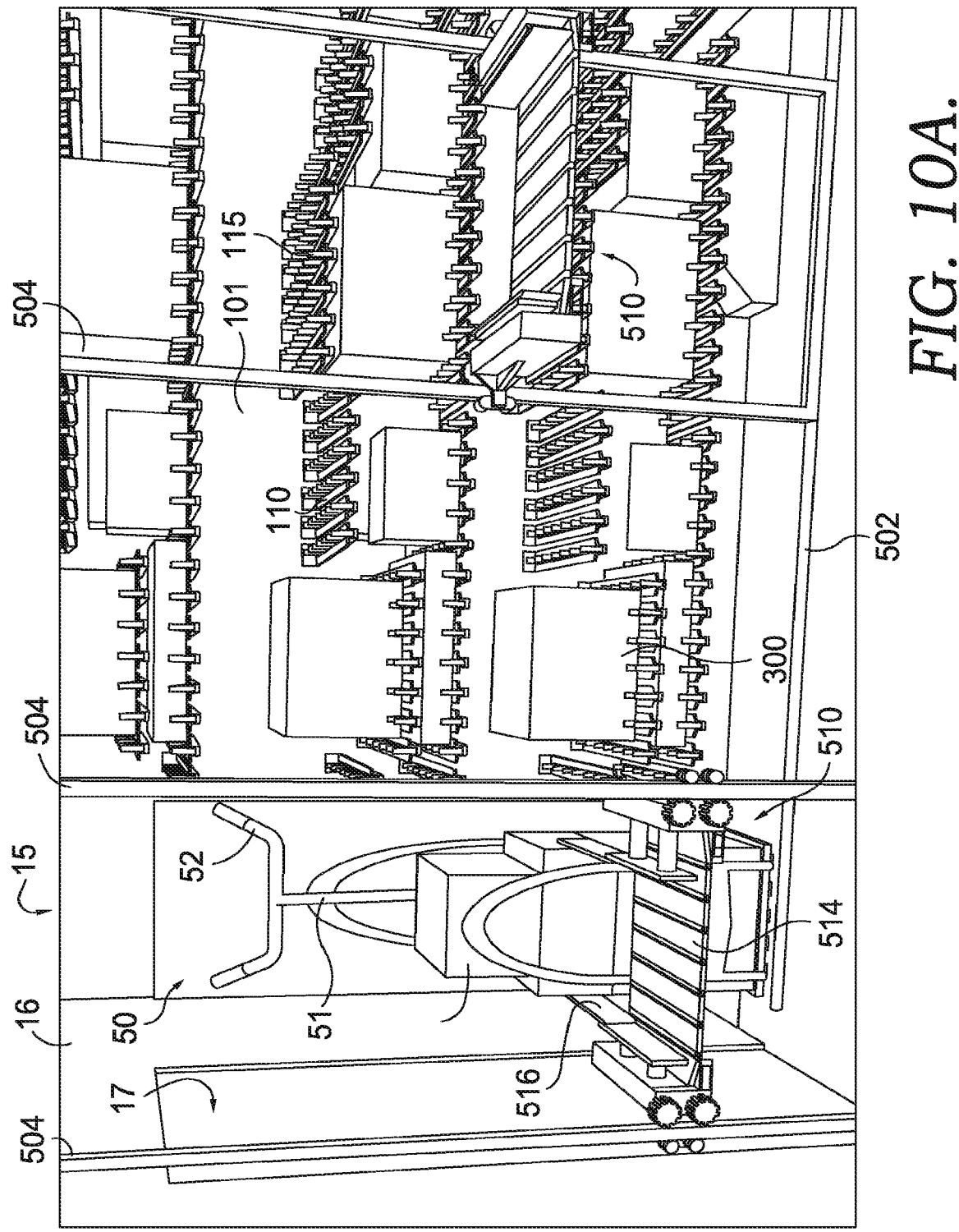

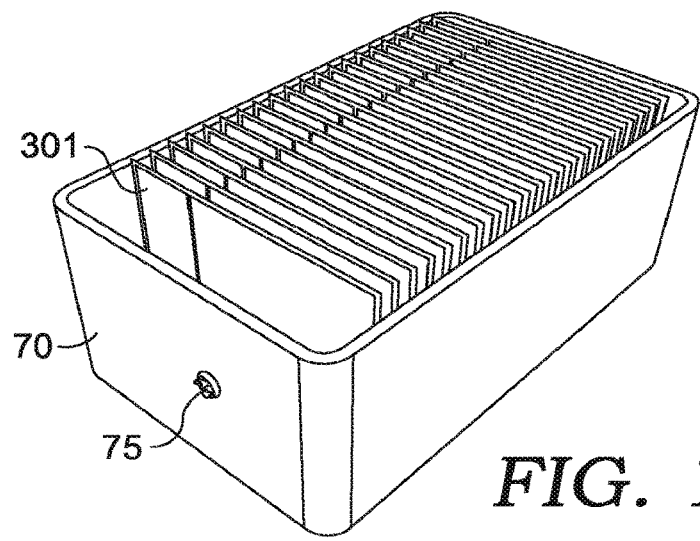
FIG. 11A.
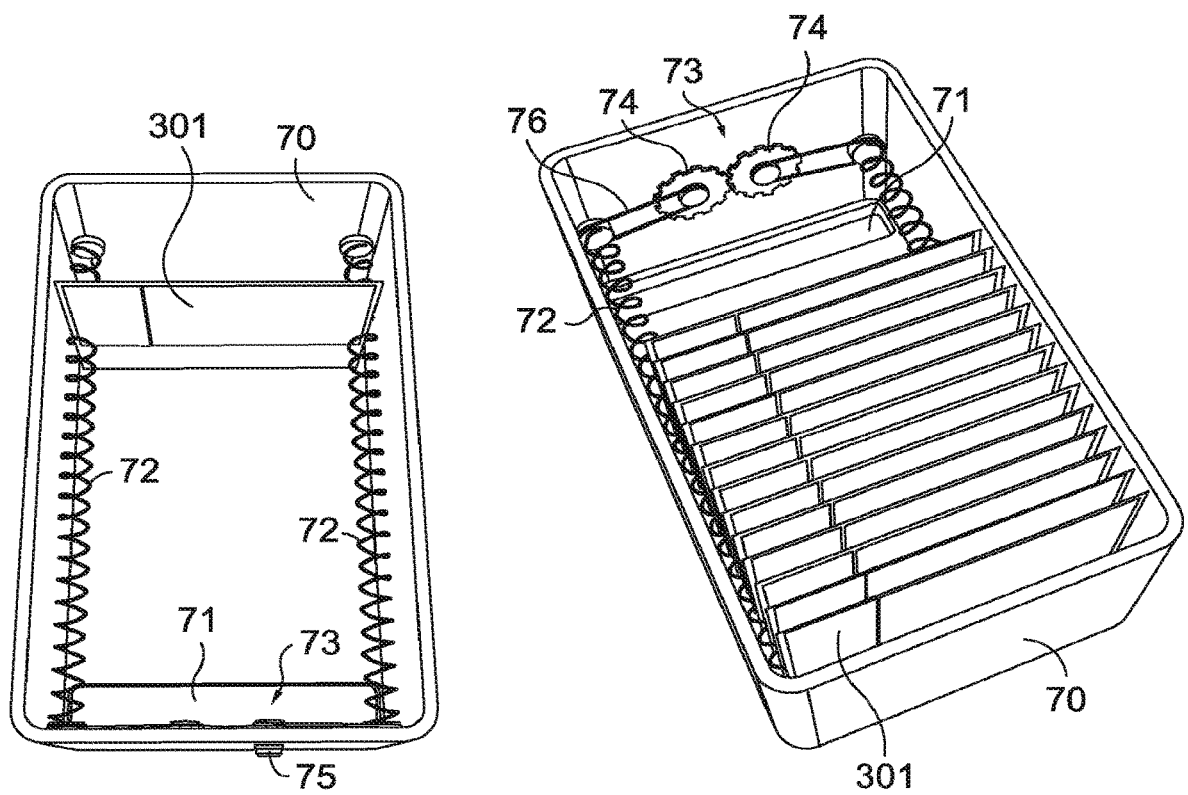
FIG. 11B.
FIG. 11C.

AUTOMATED PACKAGE TRANSPORT VEHICLE

CROSS-REFERENCE TO RELATED APPLICATIONS

The present application claims priority to U.S. application Ser. No. 16/189,853, entitled "Automated Package Transport Vehicle," filed Nov. 13, 2018, which claims the benefit of U.S. Provisional Application No. 62/585,867, entitled "Automated Package Transport Vehicle," filed Nov. 14, 2017, both of which are expressly incorporated by reference in its entirety.

BACKGROUND

Package carriers and others in the logistics industry are constantly seeking to improve the efficiency of the package transportation and delivery process. As the number of packages being shipped is growing, consumers (both shippers and recipients) are constantly looking for more readily available tracking information/data for shipments, as well as faster delivery options.

As a part of this effort to increase consumer satisfaction with shipping services, package carriers are looking for new ways to improve and/or increase the amount of package tracking information that may be made available to consumers, without sacrificing delivery speed for the increasing number of shipments that package carriers are currently transporting. Accordingly, a need constantly exists for improved systems and methods for delivering packages in an efficient and trackable manner.

BRIEF SUMMARY

Various embodiments are directed to improved delivery vehicle configurations including at least partially automated cargo areas. The delivery vehicle includes one or more robots configured for selectively retrieving packages for delivery at a particular location, and for presenting or otherwise preparing those packages for delivery at an intended destination, without requiring substantial human intervention for locating those packages. The cargo area of the delivery vehicle further comprises a plurality of customizable shelving units for generating custom-sized shelves for individual packages. Those shelves are configured to maintain the positioning of the packages and to maintain a space between packages to enable the robots to retrieve packages when needed. The described configurations thus minimize the amount of time a human vehicle operator is required to search for packages to be delivered at a particular location, which thereby increases the number of packages that may be delivered by the vehicle operator during a particular work shift.

BRIEF DESCRIPTION OF THE SEVERAL VIEWS OF THE DRAWINGS

Reference will now be made to the accompanying drawings, which are not necessarily drawn to scale, and wherein:

FIGS. 8A-8G show movements of a portion of a picking robot while retrieving a package from a shelf according to one embodiment;

FIGS. 10A-10B show a delivery staging area 15 of a cargo area according to one embodiment;

FIGS. 11A-11C show various views of a letter tote according to one embodiment;

DETAILED DESCRIPTION

Figure 1:
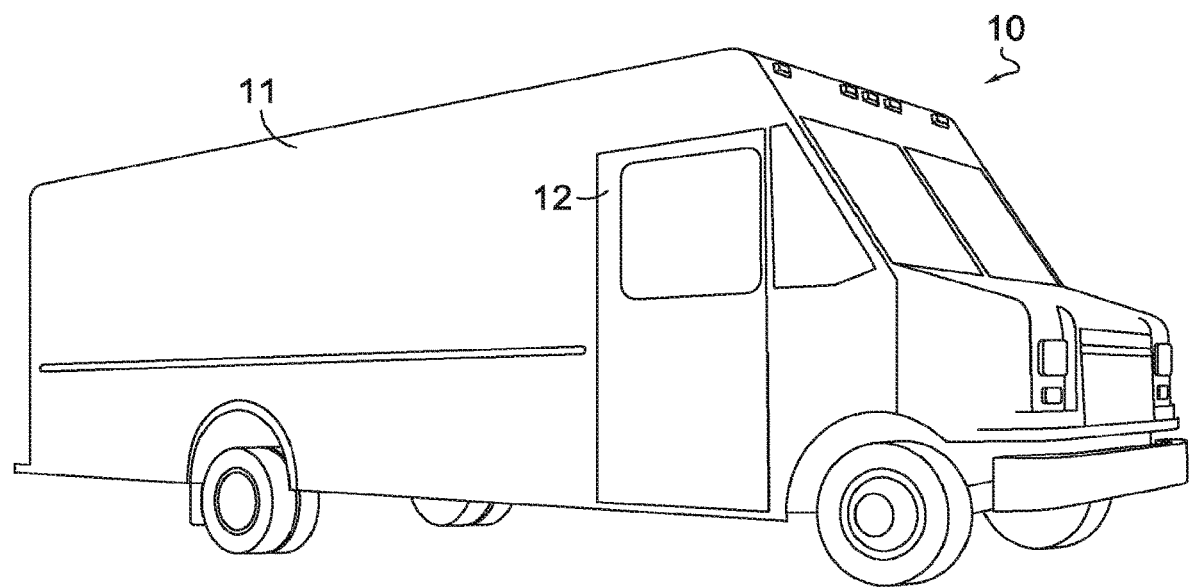
FIG. 1 shows a vehicle according to one embodiment.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

I. OVERVIEW

Various embodiments are directed to package delivery vehicles having automated package sortation, tracking, and delivery mechanisms. Various package delivery vehicles comprise one or more onboard picking robots configured to interact with automatically resizable shelves (formed from a plurality of movable shelving brackets having retaining members 115 to prevent packages from significantly deviating from a placed position) to automatically load packages onto identified shelves within the vehicle, and to automatically pick packages for delivery by a delivery vehicle operator. Although not directly discussed herein, it should be understood that certain features may be implemented for use with an unmanned final delivery vehicles (e.g., an unmanned aerial vehicle) configured to shuttle packages from the package delivery vehicle to respective final destinations, as discussed in detail in co-pending U.S. patent application Ser. No. 15/582,129, filed Apr. 28, 2017, which is incorporated herein by reference in its entirety.

Various embodiments utilize one or more computing entities (e.g., onboard the delivery vehicle, carried by a user, and/or a centralized server) to track packages assigned to a particular delivery vehicle (e.g., for final delivery via the delivery vehicle) and to generate a packing configuration for the vehicle interior, including assigned storage locations on shelves for each package, such that the onboard picking robots properly place the packages within the vehicle and retrieve proper packages for delivery when the delivery vehicle is at or nearing a particular delivery location.

While the delivery vehicle is traversing a delivery route, computing entities in communication with the onboard picking robots identify packages for delivery at an upcoming delivery stop, and automatically retrieve those packages from their respective storage locations within the vehicle. In certain embodiments, the picking robots directly present the packages to a delivery vehicle operator located within a cockpit area of the delivery vehicle to enable the vehicle operator to quickly retrieve the package from the picking robot when at a delivery destination, and to complete delivery. In certain embodiments, the picking robot may be configured to place packages destined for delivery at an upcoming destination location in a delivery staging area (which may be within a cargo area of the vehicle). Multiple packages destined for delivery at a single destination may be stacked in the delivery staging area (e.g., on a delivery cart) to ease the delivery vehicle operator's task for retrieving multiple packages for delivery at a particular destination location. The picking robots may be configured to continue stacking additional packages for delivery at the destination location (if necessary) in the delivery staging area while the delivery is underway (e.g., while the delivery vehicle operator is shuttling packages from the delivery vehicle to a final delivery destination).

II. VEHICLE

Figure 2:
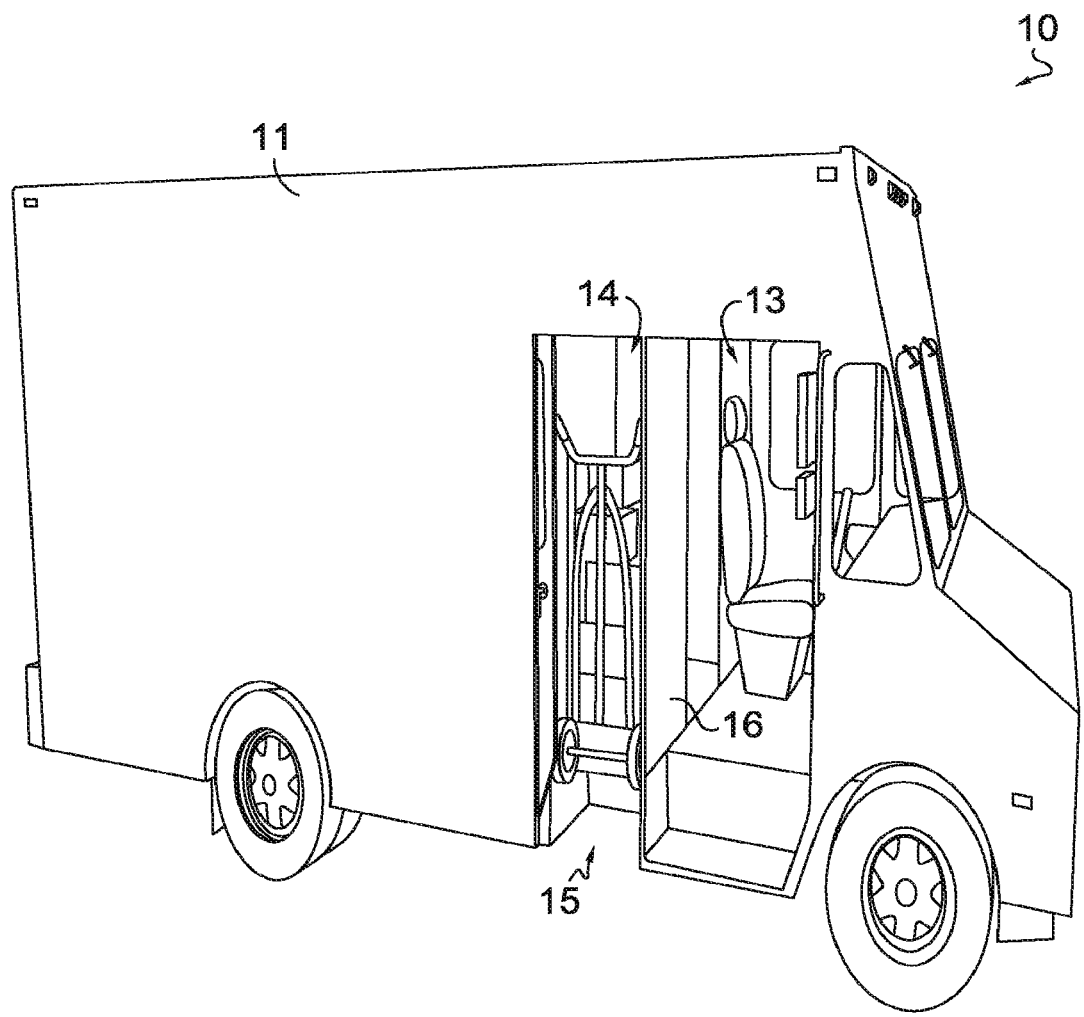
FIG. 2 shows a vehicle with an access door in an open configuration, according to one embodiment.

FIGS. 1-2 illustrate example embodiments of a vehicle 10. The delivery vehicle 10 comprises a vehicle body 11 (enclosing a cockpit 13 and a cargo area 14, as discussed below) supported a distance above a travel surface (e.g., the ground) on wheels via a vehicle frame and vehicle suspension. The vehicle 10 encompasses a drive mechanism which may be embodied as an internal combustion engine (e.g., converting a fuel, such as gasoline, diesel, biofuel, natural gas, and/or the like into energy), a fuel cell, one or more electrical motors having power supplied by one or more onboard batteries, and/or the like. As shown in FIGS. 1-2, the vehicle body 11 comprises an access door 12 to enable a vehicle operator to enter/exit the vehicle 10. As shown in FIGS. 1-2, the access door 12 may be configured to slide relative to the vehicle body 11 (e.g., into and/or out of a door sleeve within a portion of the vehicle body 11). The access door 12 may be manually movable (e.g., by the vehicle operator) and/or the access door 12 may be automatically movable by features of the vehicle 10. For example, the access door 12 may be biased to a closed configuration by a biasing mechanism (e.g., a counterweight pulling the access door 12 to the closed configuration, a spring-based biasing mechanism, and/or the like). In such embodiments, the access door 12 may additionally comprise a selectably releasable door latch configured to secure the access door 12 in the open configuration to facilitate entry and/or exit into the vehicle 10. Of course, the access door 12 may additionally comprise a door lock configured to secure the access door 12 in the closed position to prevent unauthorized access to the interior of the vehicle 10.

The access door 12 may be configured to grant access only to the cockpit 13 of the vehicle 10, or the access door 12 may extend at least partially into the cargo area 14 (e.g., a delivery staging area 15) to facilitate retrieval of packages 300 for delivery. In the latter embodiments, the access door 12 may comprise two operating modes, depending on whether access to the cargo area 14 is needed. For example, the delivery vehicle 10 may comprise a latch mechanism movable between an engaged configuration and a disengaged configuration. In the engaged configuration, the latch mechanism may be configured to prevent the slidable access door 12 from sliding beyond a first open position in which only the cockpit 13 of the vehicle 10 is accessible through the access door 10. In this configuration, the vehicle operator may enter/exit the cockpit 13 of the vehicle 10, for example to complete a delivery of a package 300, to take a break, and/or the like. While the latch is in the engaged configuration, the access door 10 prevents access to the cargo area 14, even while in the first open configuration. Moreover, the access door 10 may additionally comprise a first open latch configured to maintain the access door 10 in the first open configuration as needed. Accordingly, the latch provides an added level of security against unauthorized access to the packages 300 stored within the cargo area 14, even if unauthorized access is gained into the cockpit 13 of the vehicle 10.

The latch mechanism may be moved to the disengaged configuration, for example, to enable the vehicle operator to retrieve packages 300 from the delivery staging area 15 within the cargo area 14 (as discussed in detail herein), while in the disengaged configuration, the latch enables the access door 12 to be moved to the second open configuration (as shown in FIG. 2) in which the access door 12 enables access to both the cockpit 13 and the cargo area 14 of the vehicle 10. Moreover, the access door 12 may additionally comprise a second open latch configured to maintain the access door 12 in the second open configuration as needed. In certain embodiments, the second open latch and the first open latch may be embodied as a single open latch mechanism.

A. Cockpit

As mentioned, the delivery vehicle 10 comprises a cockpit 13 and a cargo area 14, which may be separated by a bulkhead wall 16 (which may define one or more access apertures, such as a door, window, and/or the like). The cockpit 13, visible in FIG. 2 as being proximate the front of the delivery vehicle 10 (between the cargo area 14 and the front bumper of the delivery vehicle 10) may comprise a driver's seat and a vehicle control interface (e.g., comprising one or more of a steering wheel as shown, a gear change switch/lever, brake/gas pedals, on-off switch/key, tachometer, speedometer, door lock switches, climate control, and/or the like). The cockpit 13 may additionally comprise a passenger/helper seat (not shown). Moreover, it should be understood that the cockpit 13 may comprise more or fewer features, for example, in embodiments in which the vehicle 10 is an autonomous or semi-autonomous vehicle 10.

The cockpit 13 may be accessible for a vehicle operator via the access door 12 and/or a separate access door 12 located on an opposite side of the vehicle 10 (in the illustrated embodiment, an access door 12 located adjacent the illustrated driver's seat). In certain embodiments, the separate access door 12 may be configured to enable access to the cockpit 13 of the vehicle 10 only.

B. Cargo Area

In the illustrated embodiments, the cargo area 14 of the delivery vehicle 10 is located at the rear of the vehicle 10 (e.g., behind the cockpit 13). The cargo area 14 may be accessible from the cockpit 13 through the bulkhead wall 16, for example, via a bulkhead door 17 that enables a vehicle operator to enter the cargo area 14 directly from the cockpit 13. The bulkhead door 17 may be configurable between an open configuration enabling a vehicle operator to pass through the bulkhead wall 16 between the cargo area 14 and the cockpit 13, and a closed configuration preventing movement through the bulkhead wall 16. The bulkhead door 17 may also comprise a locking mechanism configured to selectably lock the bulkhead door 17 in the closed configuration.

Moreover, although not shown, the bulkhead wall 16 may additionally define a window and/or slot enabling packages 300 to be presented from the cargo area 14, through the bulkhead wall 16, to a vehicle operator located within the cockpit 13. The window may be spaced a distance from a floor of the vehicle interior (e.g., a bottom edge of the window may be between 3-4 feet from the floor of the vehicle interior), and may be sized to enable a vehicle operator to easily reach through the window to retrieve a package 300 presented by a picking robot 500. Alternatively, the window may be sized to enable the picking robot 500 to pass a package 300 through the bulkhead wall 16, such that the package 300 is presented to the vehicle operator within the cockpit 13. Like the bulkhead door 17, the bulkhead window may be configurable between an open configuration (such that packages 300 may be presented to the vehicle operator) and a closed configuration (preventing access to the cargo area 14 from the cockpit 13). Moreover, the bulkhead window may comprise a locking mechanism configured to selectably lock the bulkhead window in the closed configuration.

The cargo area 14 itself may be defined by the vehicle interior floor, vehicle sidewalls (which may include the access door 12), the vehicle ceiling, and the rear wall of the vehicle 10. The rear wall of the vehicle 10 may comprise an access door 12 to enable access to the cargo area 14 of the vehicle 10.

Figure 17:
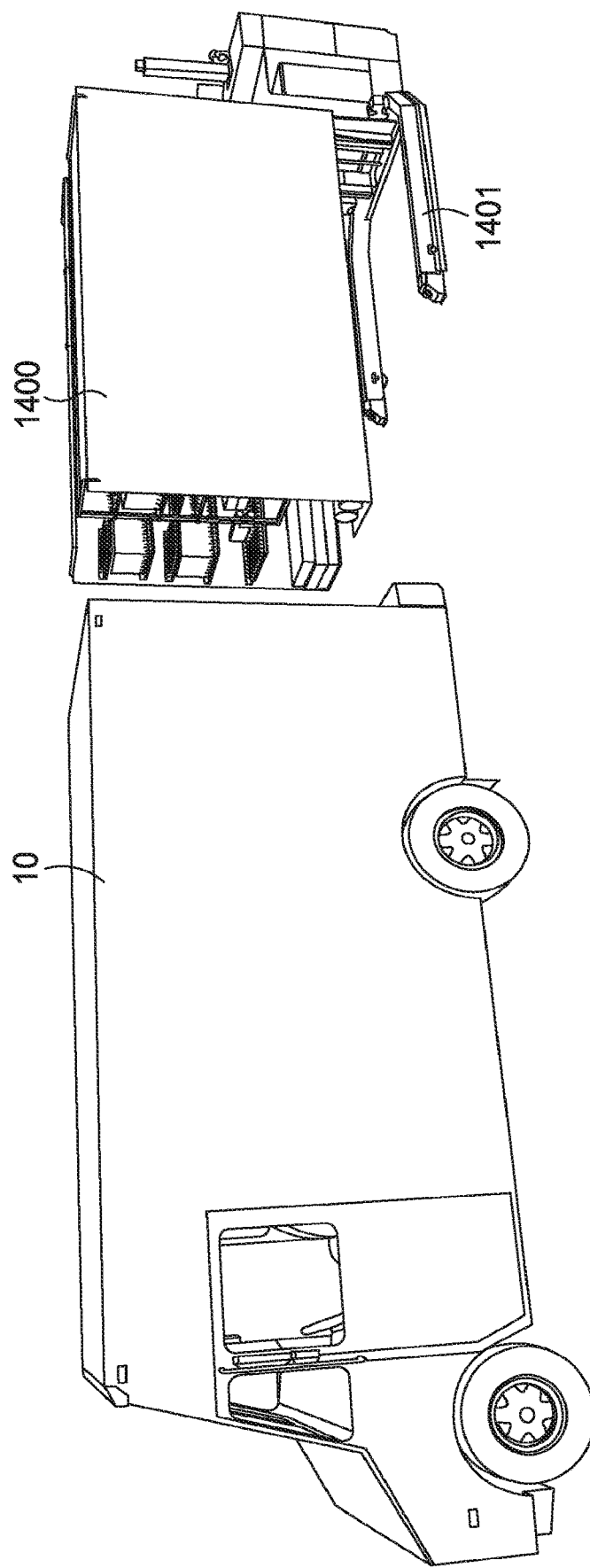
FIG. 17 shows a cargo cartridge being loaded into a cargo area of a vehicle according to one embodiment.

In certain embodiments, the cargo area 14 may be at least substantially empty, and may be configured to accept a cargo cartridge 1400 (as shown in FIG. 17) comprising a plurality of shelves (e.g., comprising configurable shelving brackets 110), one or more picking robots 500, and/or a plurality of packages 300 to be delivered by the vehicle 10. In such embodiments, the cargo cartridge 1400 may be preloaded with packages 300 for delivery by the vehicle 10 prior to placement of the cargo cartridge 1400 within the cargo area 14.

In such embodiments, the cargo area 14 may comprise one or more cartridge features configured to engage and guide the cargo cartridge 1400 into the interior of the cargo area 14 and to secure the cargo cartridge 1400 in a desired position within the cargo area 14. For example, the cargo area 14 may comprise one or more features such as one or more rails, tracks, grooves, and/or the like in and/or on the floor and/or sidewalls of the cargo area 14 that are configured to engage corresponding features of the cargo cartridge 1400 to guide the cargo cartridge 1400 into the interior of the cargo area 14 (as discussed herein). In various embodiments, the one or more features are configured to engage and guide the cargo cartridge 1400 into a position within the interior of the cargo area 14 that enables the picker robots 500 to present packages 300 to the vehicle operator (e.g., through the bulkhead wall 16 and/or at a delivery staging area 15).

The various features described in the following subsections may be provided on/in a cargo cartridge 1400 to be loaded into the cargo area 14 (e.g., within sidewalls, floors, ceilings, and/or the like of a cargo cartridge 1400). However, in certain embodiments, the features discussed herein may be provided directly within the cargo area 14 (e.g., directly secured to and/or embodied within the vehicle sidewalls). Such embodiments may not comprise a separate cargo cartridge 1400, and packages 300 may be loaded directly onto shelves (e.g., adjustable shelves) secured within the cargo area 14 of the vehicle 10.

1. Sidewalls

Figure 3:
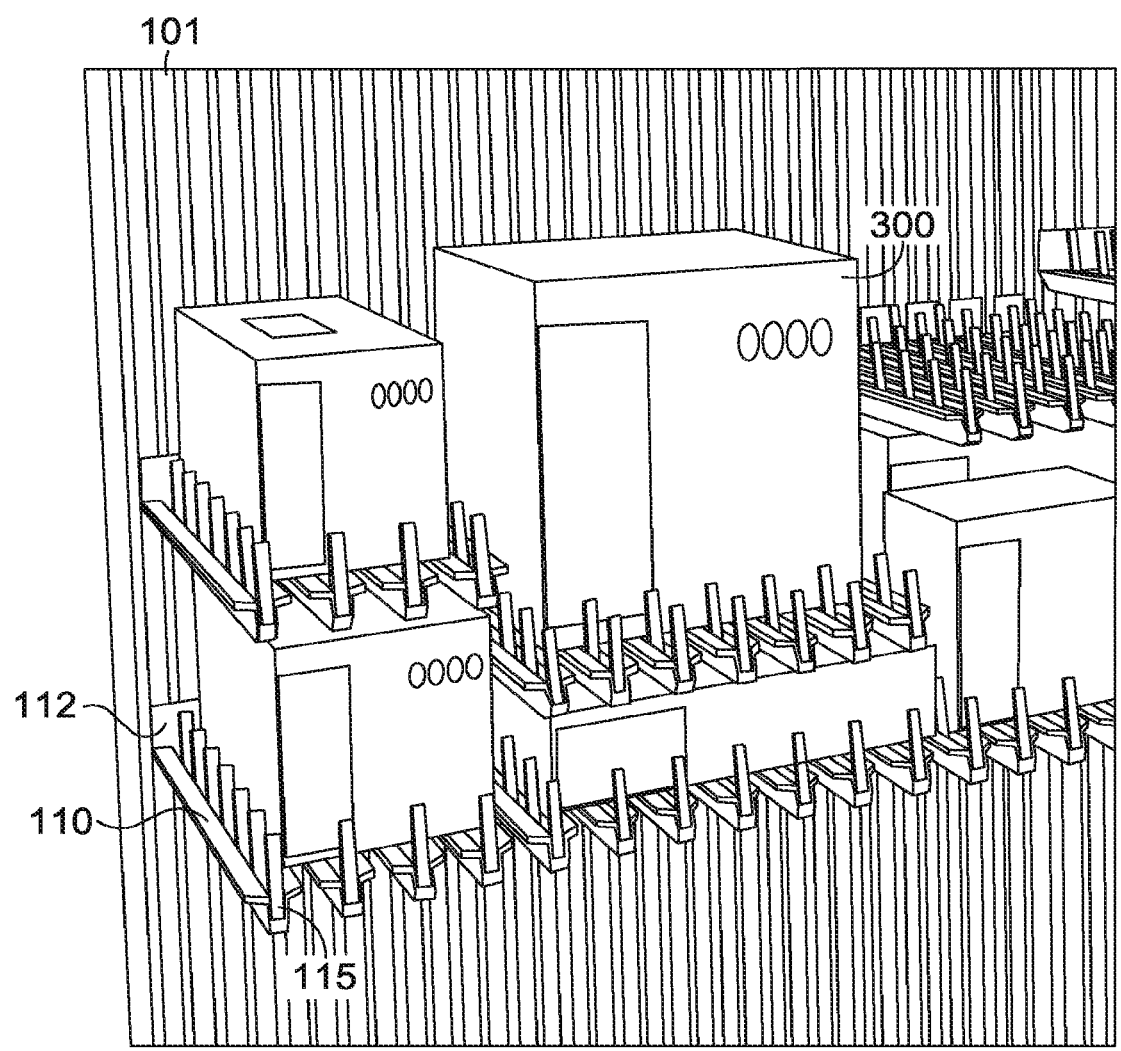
FIG. 3 shows adjustable shelving brackets forming shelves along a cargo area sidewall according to one embodiment.

The sidewalls of the vehicle cargo area 14 (or the cargo cartridge 1400) may be embodied as vertical surfaces extending at least substantially perpendicularly from a horizontal floor surface of the cargo area 14 (or the cargo cartridge 1400). The sidewalls may define a plurality of at least substantially vertical bracket supports 101 (e.g., rails, channels, grooves (e.g., "U"-shaped grooves, "T"-shaped groove, and/or the like), rods (e.g., having a circular cross-section, having a square cross-section, and/or the like), and/or the like) configured for securing shelf brackets 110 (as discussed herein) relative to sidewalls of the cargo area 14. For example, FIG. 3 illustrates a close-up view of a portion of a vehicle sidewall having a plurality of shelf brackets 110 secured relative to vertical bracket supports 101 of the vehicle sidewall. The vertical bracket supports 101 may extend along at least substantially the entire height of the sidewalls of the cargo area 14 (or cargo cartridge 1400), such that shelf brackets 110 may be movable along at least substantially the entire height of the cargo area 14. Moreover, a plurality of vertical bracket supports 101 may be spaced at least substantially evenly across the length of the cargo area 14 (defined between the back wall and the bulkhead wall 16 of the cargo area 14). The vertical bracket supports 101 may be spaced at a distance such that adjacent shelf brackets 110 (e.g., secured relative to adjacent vertical bracket supports 101) do not interfere with one another when moving vertically along the adjacent vertical bracket supports 101.

Moreover, the vertical bracket supports 101 may be configured to enable infinite adjustment of the shelf brackets 110 relative to the vertical bracket supports 101. For example, the vertical bracket supports 101 may be embodied as at least substantially smooth rails, grooves, channels, and/or the like that are configured for frictional engagement with one or more shelf brackets 110. As yet another example, the vertical bracket supports 101 may be configured to enable adjustment of the shelf brackets 110 between a plurality of defined adjustment locations. For example, the vertical bracket supports 101 may each define a plurality of engagement positions (e.g., grooves, detents, notches, ridges, and/or the like) configured to enable secure engagement between the shelf brackets 110 and the vertical bracket supports 101. In such embodiments, the shelf brackets 110 may be configured to "snap" into engagement with an engagement position of the vertical position, and to slide at least substantially smoothly between adjacent engagement positions along a vertical bracket support 101. In certain embodiments, the engagement positions of adjacent vertical bracket supports 101 are at least substantially aligned, such that shelf brackets 110 secured relative to adjacent engagement positions collectively form at least substantially horizontal shelves.

Moreover, the vehicle sidewalls may comprise one or more bracket movement mechanisms secured relative to the one or more vertical bracket supports 101. The one or more bracket movement mechanisms are configured to drive vertical movement of the one or more shelf brackets 110 relative to the vertical bracket supports 101. For example, the bracket movements may be driven by one or more electrical motors driving a belt, chain, screw-drive, and/or the like configured to selectably move shelf brackets 110 relative to the vertical bracket supports 101. As yet another example, the bracket movements may be driven by one or more solenoids or other movement mechanisms configured for providing linear movement of the shelf brackets 110 relative to the vertical bracket supports 101.

2. Shelf Brackets

Figure 4A:
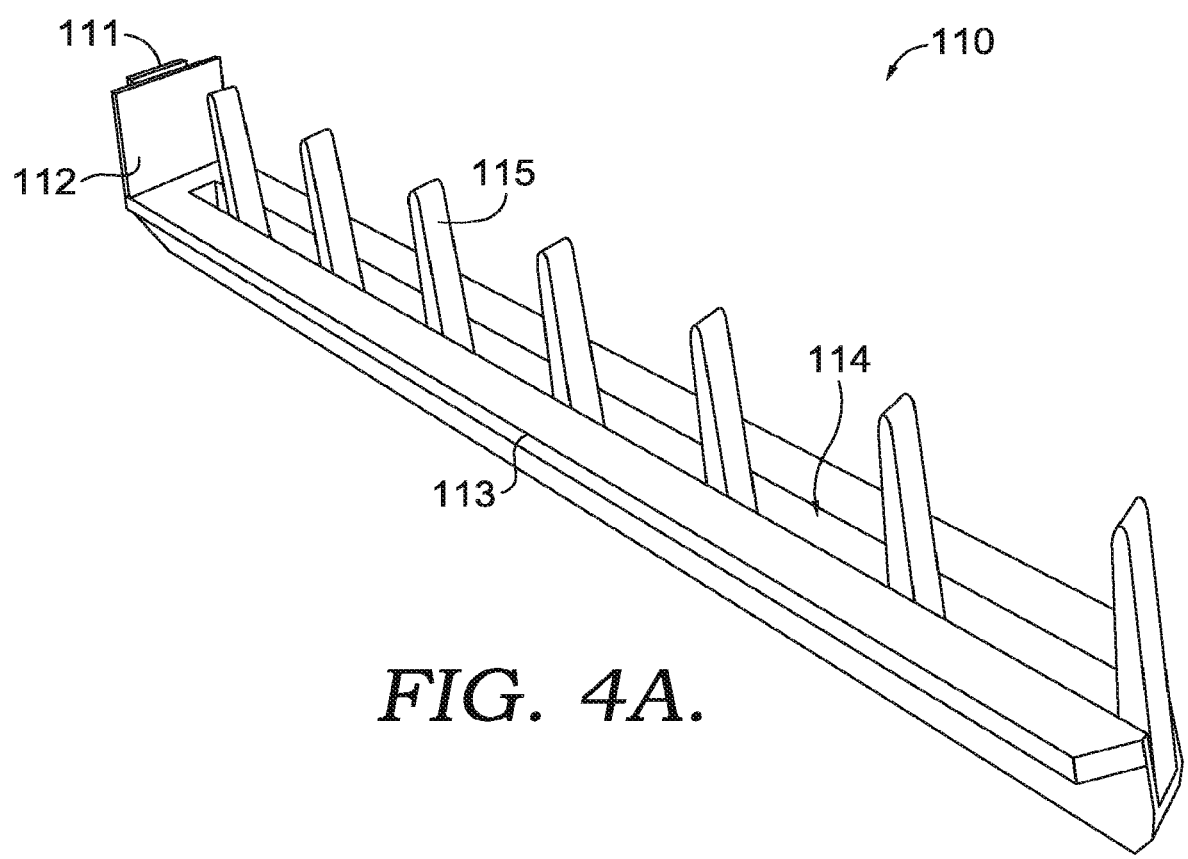
FIGS. 4A-4B show an adjustable shelving bracket according to one embodiment.
Figure 4B:
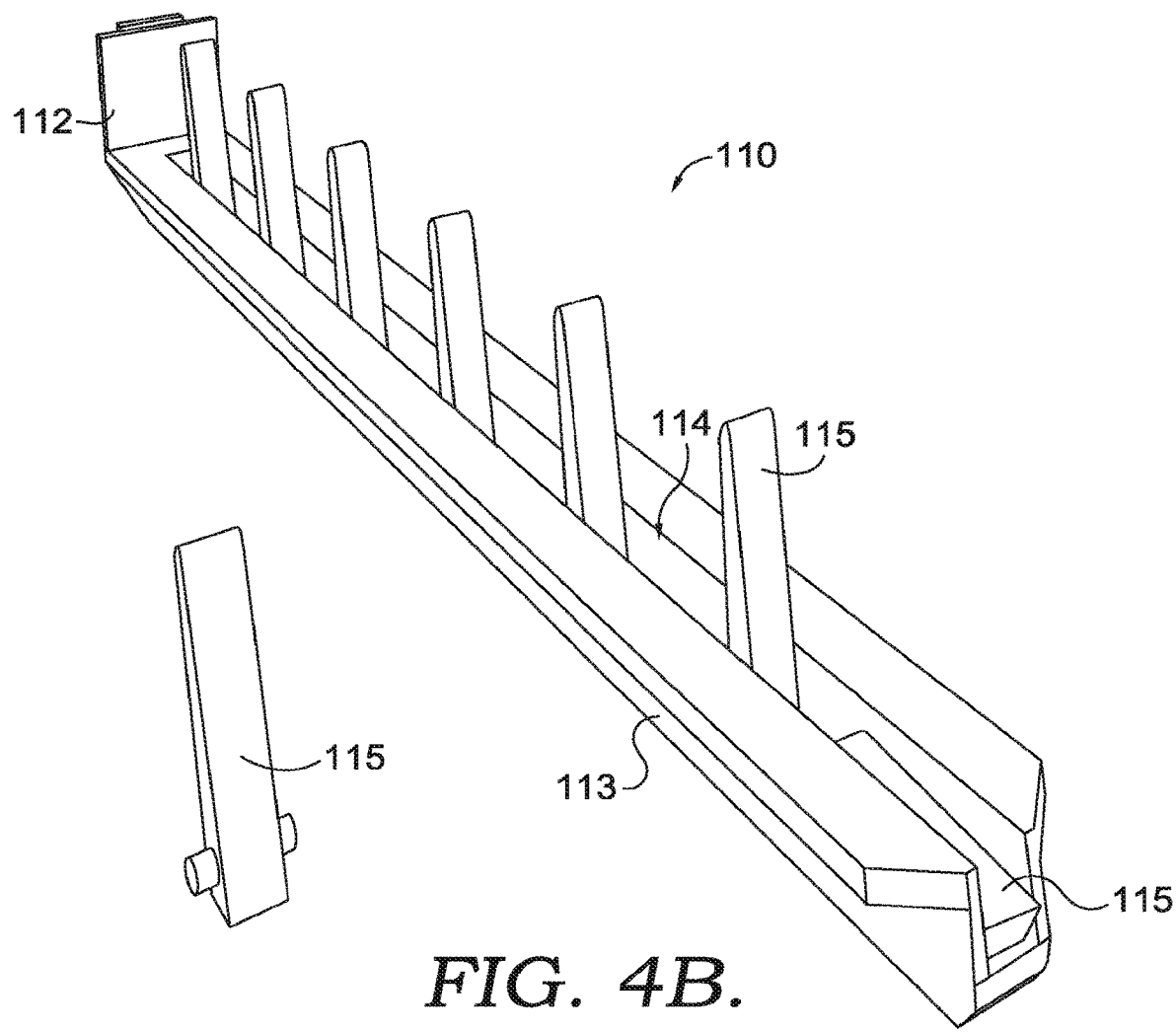

An example shelf bracket 110 disconnected from the vertical bracket supports 101, is shown in FIGS. 4A-4B. The illustrated shelf bracket 110 comprises an engagement feature 111 proximate a base portion of the shelf bracket 110. The engagement feature 111 is configured for engaging with the vertical bracket supports 101 for securing the shelf bracket 110 thereto. In the illustrated embodiment, the engagement feature 111 of the shelf bracket 110 is defined as a "T" shaped protrusion extending away from a base portion of the shelf bracket 110. The illustrated engagement feature 111 is thus configured to engage a corresponding "T" shaped groove of a vertical bracket support 101.

As shown, the base portion of the shelf bracket 110 further comprises a base plate 112 extending parallel to the engagement feature 111 (e.g., the T-shaped protrusion). In the illustrated embodiment, the T-shaped protrusion extends away from the base plate 112, and collectively, the base plate 112 and the T-shaped protrusion are configured to engage the vertical bracket support 101 to secure the shelf bracket 110 relative to the vertical bracket support 101. For example, at least a portion of the base plate 112 may be configured to engage a front surface of the vertical bracket support 101 while the protrusion is configured to engage the groove of the vertical bracket support 101. However, it should be understood that other configurations may be possible for the base portion to correspond with the configuration of the vertical bracket supports 101.

The shelf bracket 110 of the illustrated embodiment further comprises a rigid support rail 113 extending linearly away from the base portion to a distal end. The support rail 113 may comprise any of a variety of rigid materials, such as metals (e.g., aluminum, steel, and/or the like), composite materials (e.g., carbon fiber), rigid plastic materials (e.g., polycarbonate, polyvinyl chloride, and/or the like), and/or the like.

The support rail 113 defines an at least substantially planar top surface that, when the shelf bracket 110 is secured within the vertical bracket support 101, defines an at least substantially horizontal surface on which packages 300 may be placed (in certain embodiments, the planar top surface may be angled slightly toward the vertical bracket support 101, thereby providing a slight retaining bias to packages 300 placed thereon toward the sidewall of the vehicle 10). As shown in FIGS. 4A-4B, the planar top surface is defined by two at least substantially planar surfaces extending away from the base portion, those two surfaces being separated by a channel 114. As shown, the channel 114 is bound by at least substantially vertical and parallel sidewalls (which serve to provide added strength against bending of the support rail 113), and may be bound by a bottom surface extending at least partially along the length of the support rail 113. In certain embodiments, the support rail 113 may have a generally thin profile (measured between the horizontal top surface and the bottom edge of the channel 114) to minimize the amount of volume occupied by the support rail 113, for example, between vertically stacked packages 300.

The shelf bracket 110 further comprises one or more retaining members 115 secured at their respective bases within the channel 114 between the planar surfaces of the support rail 113. The retaining members 115 comprise at least substantially rigid (e.g., metal, rubber, resilient plastic, rigid plastic, wood, and/or the like) members extending from their respective bases to respective distal ends. The retaining members 115 are configured to selectably retain packages 300 on top of the shelving bracket 110. The retaining members 115 may be formed at least substantially entirely from a non-damaging material a non-marking material, and/or the like, or the retaining members 115 may be coated with a non-damaging or non-marking material, such as a foam padding, a carpet, a rubber, and/or the like, to diminish damage that may be inflicted on packages 300 or other objects secured by the retaining members 115.

As shown in FIG. 4B, which illustrates a retaining member 115 separated from the support rail 113 and a retaining member 115 in a retracted position, the retaining members 115 are pivotably secured within the channel 114 and are movable between a retracted position in which the retaining members 115 are parallel with or below the planar top surface of the support rail 113 (as shown in FIG. 4B), and an extended position in which the retaining members 115 extend above the planar top surface of the support rail 113. For example, the retaining members 115 may be pivotable by at least 90 degrees between the retracted position and the extended position. As discussed in greater detail herein, the shelf bracket 110 may be configured to accept a retraction tool of a picking robot 500 (e.g., an end effector rail 512) between the bottom surface of a package 300 (positioned on top of and adjacent to the top surface of the support rail 113) and the retaining members 115. Accordingly, the retaining members 115 may be configured to pivot to a retracted position spaced a distance below the top support surface of the support rail 113 to accommodate the thickness of the retraction tool within the channel 114 and above the retaining members 115.

The retaining members 115 may be configured to pivot about respective pivot axes defined by pins secured relative to portions of the vertical sidewalls of the channel 114. In certain embodiments, the pins may be integrally formed with the retaining members 115 (as shown in FIG. 4B), or the pins may be separate components secured relative to the retaining members 115.

Moreover, retaining members 115 may be pivotable downward toward the base portion of the shelf bracket 110, such that objects (e.g., packages 300) may be slid along the planar top surface of the support rail 113 onto the shelf bracket 110, and to depress retaining members 115 into the retracted position while the object is slid onto the shelf bracket 110. The retaining members 115 may additionally comprise biasing members configured to bias the retaining members 115 to the extended position. For example, the biasing members may be embodied as resilient members providing a biasing force to the retaining members 115, torsion springs, and/or the like. As mentioned, the retaining members 115 may be pivotable to the retracted position while an object (e.g., a package 300) is slid over the retaining members 115, and accordingly the biasing members may be configured to provide approximately a minimum amount of force to overcome gravitational forces on the retaining members 115 themselves to bias the retaining members 115 to the extended position, while enabling packages 300 to easily depress the retaining members 115 to the retracted position when slid across the surface of the shelf brackets 110. Accordingly, retaining members 115 positioned below an object resting on the shelf bracket 110 remain in the retracted position until the object is removed.

In certain embodiments, the shelf bracket 110 may comprise an integrated tool to move the retaining members 115 to the retracted position. For example, the biasing members may be secured relative to a movable member that may be moved (e.g., manually moved) such that the biasing members are moved away from the retaining members 115 to remove the biasing force from the retaining members 115. In such embodiments, the retaining members 115 may be weighted or otherwise configured to fall/rotate into the retracted position when the biasing force is removed. As yet another example, a retraction tool may be configured to move various members into engagement with the retaining members 115 to overcome the biasing force of the biasing members and to depress the retaining members 115 into the retracted configuration. In certain embodiments, the retraction tool may be integrated into the shelf brackets 110, may be integrated into the picking robot 500 (e.g., end effector rails 512), and/or the retraction tool may be a separate tool that may be used to depress the retaining members 115.

With reference again to FIG. 4, the shelf bracket 110 comprises a plurality of retaining members 115 spaced at intervals along the length of the support rail 113. The length of the intervals between adjacent retaining members 115 defines the maximum distance that a package 300 can shift on the shelf bracket 110 with at least one retaining member 115 in the extended configuration. As packages 300 are slid onto the shelf bracket 110, the retaining members 115 are depressed into the retracted configuration consecutively, as the leading edge of the package 300 engages each retaining member 115 and slides past/over the retaining member 115. The retaining members 115 each return to the extended configuration under the force applied by the biasing member when the trailing edge of the package 300 clears a distal end of the retaining members 115 (to provide a clear rotational path between the retracted configuration and the extended configuration). Thus, for a package 300 pressed against the base portion of the shelving bracket 110, the maximum distance the package 300 can shift between the distal end of the shelving bracket 110 and the base portion is equal to the distance between the distal end of a first retaining member 115 in the retracted position and a trailing face of a second retaining member 115 positioned adjacent to the first retaining member 115 and located between the first retaining member 115 and the distal end of the shelving bracket 110. In certain embodiments, the distance between adjacent retaining members 115 is at least substantially identical for all shelving brackets 110. In such embodiments, when two or more shelving brackets 110 are utilized to form a shelf (as discussed in greater detail herein), the distance between a rectangular package 300 with parallel sides and the nearest extended retaining member 115 is identical between all shelving brackets 110. However, in various embodiments the distance between adjacent retaining members 115 may vary between shelving brackets 110 and/or the positioning of the retaining members 115 relative to the distal end and the base portion of the shelving brackets 110 may vary between shelving bracket 110 (e.g., the retaining members 115 may be shifted, while the spacing between adjacent retaining members 115 may remain the same). Such embodiments may decrease the maximum package shifting distance for packages 300 secured on two or more shelving brackets 110, because the limit of the package shifting is defined by the extended retaining member 115 positioned nearest to the trailing edge of the package 300.

In certain embodiments, each shelving bracket 110 may comprise an on-board movement mechanism (e.g., motor and gear mechanism) configured to move the shelving bracket 110 relative to the vertical bracket supports 101 in the sidewalls of the cargo area 14. The movement mechanism may be journaled and in communication with one or more onboard computing entities of the vehicle 10, such that the vertical position of each shelving bracket 110 may be monitored and/or selected. In such embodiments, separate movement mechanisms disposed in the sidewalls of the cargo area 14 of the vehicle 10 may be unnecessary.

At least one shelving bracket 110 is secured relative to each of a plurality of adjacent vertical bracket support 101 along the wall of the cargo area 14. Shelving brackets 110 secured relative to adjacent vertical bracket supports 101 may be horizontally aligned (e.g., via movement) to collectively form a shelf to support a package 300. As shown in FIG. 3, packages 300 supported by a shelf formed from a plurality of shelving brackets 110 are separated from adjacent packages 300. Each package 300 is surrounded by the base portion of the each of the shelving brackets 110 on one side (e.g., the side of the package 300 closest to the sidewall of the cargo area 14), and retaining members 115 in extended configurations on the remaining sides of the package 300. Thus, the package's lateral movement (parallel to the length of the cargo area sidewall) is limited by the extended retaining members 115 positioned along the side edges of the packages 300, and the package's longitudinal movement (toward and away from the cargo area sidewall) is limited between the base portion of the shelving brackets 110 and the extended retaining members 115 adjacent the trailing edge of the package 300.

With reference again to FIG. 3, the configuration of utilizing a plurality of shelving brackets 110 to form individual shelves enables the formation of custom-sized shelves for individual packages 300. Shelves for individual packages 300 may thus be formed and placed to minimize the distance between adjacent packages 300 while retaining at least a minimum distance of separation between packages 300 to enable a picking robot 500 (discussed herein) to automatically retrieve desired packages 300 for presentation to a vehicle operator.

3. Picking Robot

Figure 5:
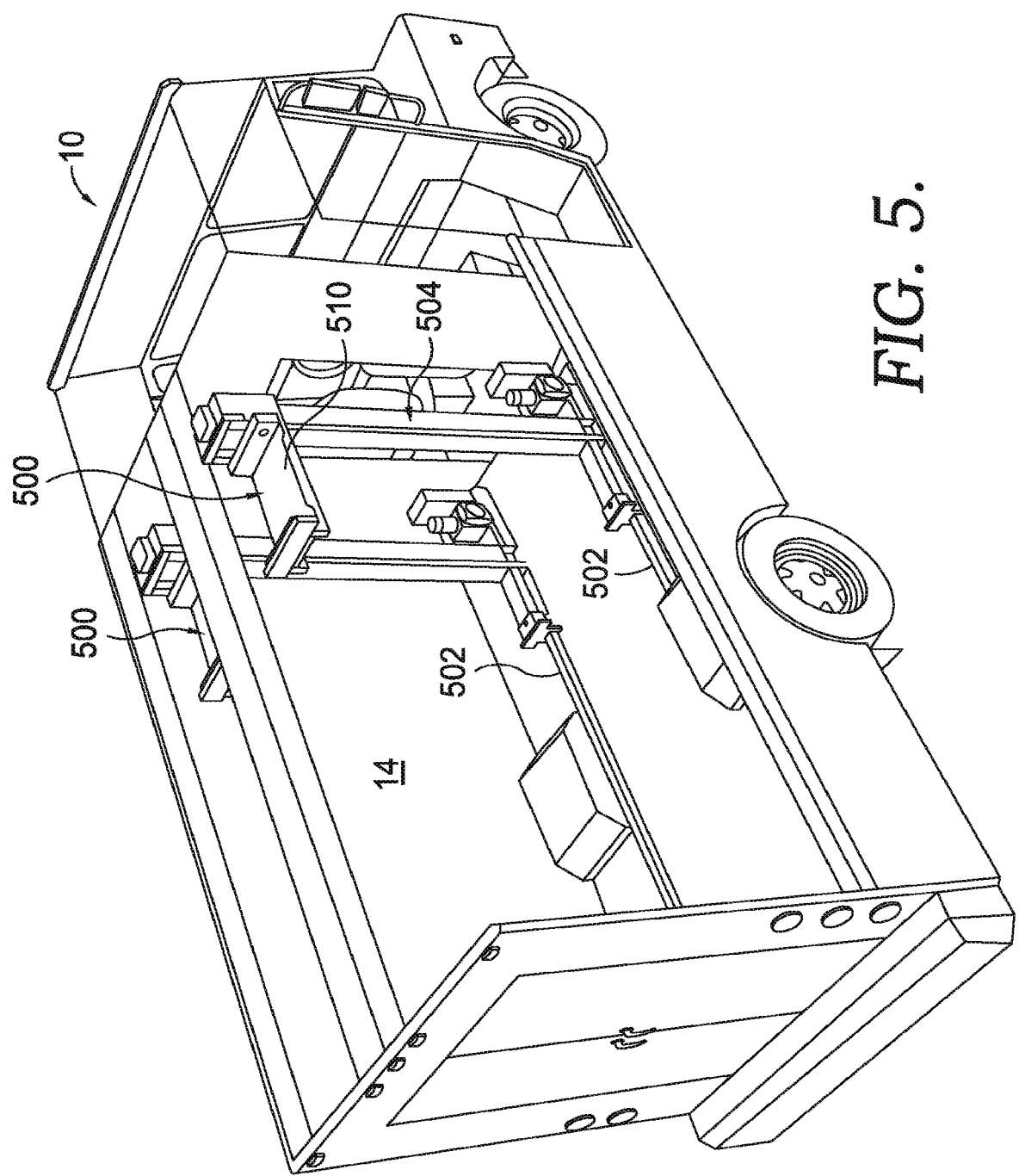
FIG. 5 shows a cutaway view of a vehicle interior according to one embodiment.
Figure 6:
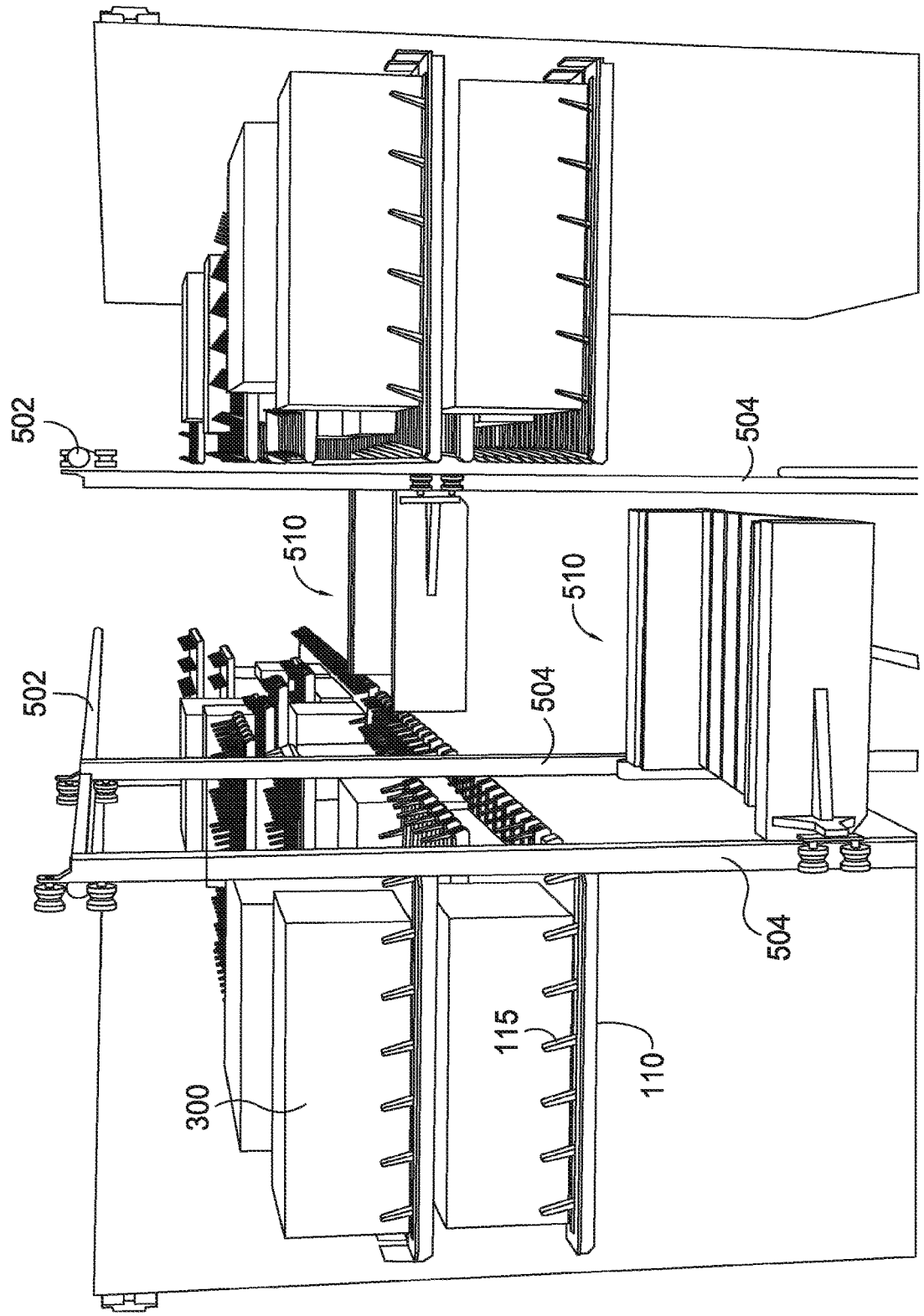
FIG. 6 shows a portion of a cargo area of a vehicle interior according to one embodiment.
Figure 7:
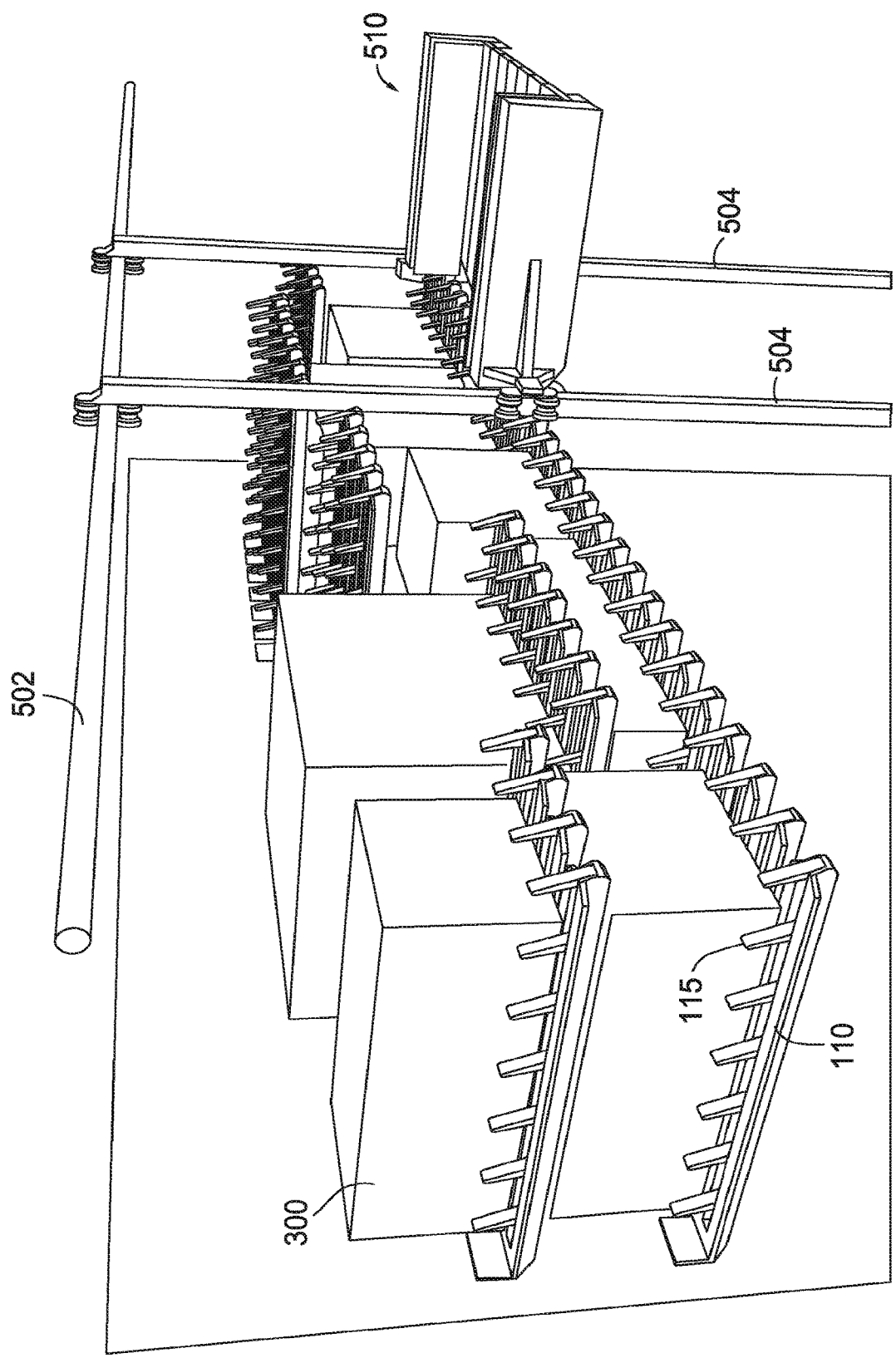
FIG. 7 shows a portion of a sidewall of a cargo area according to one embodiment.

In certain embodiments, one or more picking robots 500 are positioned within the cargo area 14 of the vehicle 10. The picking robots 500 assist in moving packages 300 within the cargo area 14 of the vehicle 10. The picking robots 500 may take any of a variety of configurations (see e.g., FIG. 5 and FIG. 6). For example, the illustrated example embodiment of FIG. 6 comprises a vehicle 10 including two picking robots 500. The picking robots 500 are each movable along a horizontal track 502 that extends along the interior of the cargo area 14 in the longitudinal direction, as shown in FIGS. 6-7. The horizontal track 502 may comprise an upper portion (e.g., secured proximate to a ceiling of the cargo area 14) and a lower portion (e.g., secured proximate a floor of the cargo area 14; secured to a shelf proximate the floor of the cargo area 14, and/or the like). The picking robots 500 each include at least one upright member 504 (e.g., two upright members) operatively coupled to the horizontal track 502, and an end effector 510 coupled to the at least one upright member 504. The upright members 504 extend upward in the vertical direction and generally define a vertical track extending along the upright members 504 in the vertical direction, along which the end effectors 510 are configured to move. Moreover, the at least a portion of the upright members 504 (e.g., one upright member per picking robot 500) may comprise a motor configured to move the picking robot 500 relative to the horizontal track 502. In certain embodiments, the motor may comprise an indexing aspect (e.g., a position sensor) configured to monitor the location of the upright member 504 relative to the horizontal track 502. The horizontal track 502 has a fixed position relative to the sidewalls of the cargo area 14, and accordingly, the positioning of the upright member 504 along the length of the horizontal track 502 may be utilized to determine the positioning of the picking robot 500 along the length of the sidewalls, and therefore to determine the positioning of the picking robot 500 relative to one or more shelves (e.g., formed from one or more shelving brackets 110).

The end effector 510 is movable along the upright member 504 in the vertical direction along the vertical track (e.g., via an onboard movement mechanism such as a motor with an integrated position sensor). In certain embodiments, the robots 500 include a package identification unit that is configured to scan, read, interrogate, receive, communicate with, and/or similar words used herein interchangeably a package identifier and/or a package carrier identifier, and the package identification unit may be communicatively coupled to one or more computing entities, as will be described in greater detail herein.

Referring collectively to FIGS. 8A-8G, a perspective view of the end effector 510 is schematically depicted at various stages of a package retrieval process. The end effector 510 includes an end effector platform 514, a plurality of end effector rails 512 positioned within and movable along channels within the end effector platform 514, and clamping members 516 positioned on opposing ends of the platform 514. The platform 514 may generally support the package 300 during movement of the package 300 via the picking robot 500, for example, during loading and/or presentation of the package 300 to the vehicle operator. The clamping members 516 and the end effector rails 512 may be configured to aid in moving a package 300 relative to the platform 514, for example, onto or off of a shelf formed on a sidewall of the cargo area 14 (e.g., comprising a plurality of shelf brackets 110 as discussed herein). Moreover, in certain embodiments the clamping members 516 and end effector rails 512 may be configured to move packages 300 onto and/or off of the platform 514, for example, onto or off of shelves within the cargo area 14 of the vehicle 10. As shown in FIGS. 6-7, the picking robot 500 may be positioned within an aisle between shelves on opposing sidewalls of the cargo area 14, and accordingly the picking robot 500 may be configured to place and/or retrieve items on/from shelves on either side of the aisle (e.g., positioned against opposing sidewalls of the cargo area 14). Consequently, both the end effector rails 512 and the clamping members 516 may be configured to extend in opposing directions relative to the platform 514, toward opposing sidewalls of the cargo area 14.

In various embodiments, the end effector rails 512 are rigid rails comprising a material such as a metal, a rigid plastic, a composite, and/or the like. In certain embodiments, the top surface of the end effector rails 512 may have a low coefficient of friction to ease sliding of packages 300 relative to the end effector rails 512 (e.g., by polishing a metal, by providing a low-friction plastic material, and/or the like). Such an embodiment may be particularly desirable in embodiments in which the clamping members 516 are configured to slide packages 300 along the top surface of the end effector rails 512. In other embodiments, the top surface of the end effector rails 512 has a high coefficient of friction (e.g., a high coefficient of friction polymeric material, a rubber material, and/or the like). Such an embodiment may be particularly desirable in embodiments in which the end effector rails 512 move with the clamping members 516 (and packages 300) between the extended configuration and the retracted configuration.

In the illustrated embodiment, the end effector rails 512 have a width smaller than the width of the channel 114 within the shelf brackets 110, a length sufficiently long to extend from the platform 514 to depress the retaining member 115 closest to the base portion of a shelving bracket 110, and a height sufficiently small to extend between the top horizontal surface of a support rail 113 and a surface of the retaining members 115 in the retracted position. Accordingly, the end effector rails 512 are configured to extend into a support rail 113 of a shelf bracket 110 to retract the retaining members 115 such that a package 300 placed on a shelf formed of one or more shelving brackets 110 may be slid off of the shelf and onto the platform 514 without interference caused by the retaining members 115.

As discussed in greater detail herein, the end effector rails 512 may be linearly movable between a retracted position in which the end effector rails 512 are retracted within the perimeter defined by the platform 514, and an extended position in which the end effector rails 512 extend beyond the edges of the platform 514 toward a sidewall of the cargo area 14. In certain embodiments, the end effector rails 512 are individually movable (e.g., via a motor, a solenoid, or other moving mechanism) or the end effector rails 512 of the picking robot 500 may be movable as a group (e.g., all end effector rails 512 are movable together). Moreover, as mentioned above, the end effector rails 512 may be movable in opposite directions relative to the platform 514, in order to retrieve packages 300 from shelves on either side of the cargo area 14.

In certain embodiments the picking robot 500 may comprise a position sensor configured to precisely monitor the position of the end effector 510 and the end effector rails 512 relative to the position of one or more shelving brackets 110 to ensure the end effector rails 512 properly engage the retaining members 115 within the shelving bracket channel 114, without damaging the shelving brackets 110, the packages 300, and/or the end effector rails 512.

The clamping members 516 may comprise at least substantially rigid panels, having a low-marking, high-friction surface for engaging a package 300. For example the clamping members 516 may comprise a metal material, a rigid plastic material, a rubber material, and/or the like. In certain embodiments, the clamping members 516 may be coated with a resilient material to increase the coefficient of friction of the clamping members 516 (e.g., to improve frictional engagement with a package 300).

In the illustrated embodiment, the clamping members 516 may be repositionable between an engaged position, in which the clamping members 516 contact opposing sides of the package 300, and a disengaged position, in which the clamping members 516 are spaced apart from the sides of the package 300. In the illustrated embodiments, the disengaged position of the clamping members 516 is the widest position of the clamping members 516 relative to the end effector platform 514 (e.g., such that the clamping members 516 are closest to the side edges of the end effector platform 514). The location of the engaged position for the clamping members 516 may be dependent on the dimensions of the package 300. In certain embodiments, the clamping members 516 may comprise a pressure sensor, a proximity sensor, and/or the like configured to locate sidewalls of a package 300 to provide a retaining pressure on the sidewalls of the package 300 without damaging (e.g., crushing) the package 300. Accordingly, the engaged position of the clamping members 516 may be in a configuration narrower than the disengaged position, and may be located at a position in which the clamping members 516 engage the sidewalls of a package 300.

Moreover, the clamping members 516 may be movable between a retracted position in which the clamping members 516 are retracted within the perimeter defined by the platform 514, and an extended position in which the clamping members 516 extend beyond the edges of the platform 514 toward a sidewall of the cargo area 14. The clamping members 516 may be configured to move between the engaged and disengaged positioned regardless of the positioning of the clamping members 516 between the retracted and extended configurations. Thus, the clamping members 516 are configured to move to an engaged position on a package 300 and then move laterally relative to the platform 514 to slide the package 300 along the rails onto and/or off of the platform 514 and shelves. Once the package 300 is moved to a desired position (e.g., on a shelf), the clamping members 516 expand to a disengaged position and retract to the platform 514. In certain embodiments, the clamping members 516 may remain in the engaged configuration while the picking robot 500 moves with a package 300 positioned on the platform 514 (e.g., moving the package 300 vertically and/or horizontally, for example, to present the package 300 to the vehicle operator).

In certain embodiments, the movement of the clamping members 516 are synchronized with the movement of the end effector rails 512. The clamping members 516 may be configured to await placement of the end effector rails 512 as necessary (e.g., within channels 114 of shelf brackets 110) to ensure the movement path of a package 300 to be moved by the clamping members 516 is clear. For example, when removing a package 300 from a shelf, the movement of the clamping members 516 may be synchronized with the movement of the end effector rails 512 to ensure the end effector rails 512 retract any retaining members 115 within the shelving brackets 110 on which the package 300 is placed prior to engaging the package 300 and/or retracting the clamping members 516 with the engaged package 300 to move the package 300 onto the platform 514.

In the embodiment depicted in FIGS. 8A-8G, the clamping members 516 are positioned on opposing ends of the platform 514, however, it should be understood that the clamping members 516 may be positioned at any suitable location of the end effector 510 to retain the position of the package 300 with respect to the platform 514 of the end effector 510 as desired. The clamping members 516 may be repositionable between the engaged position and the disengaged position in any suitable manner, including, but not limited to, electrical power, hydraulic power, and/or the like.

Moreover, in certain embodiments the clamping members 516 and/or the end effector rails 512 may be configured to move vertically relative to the end effector platform 514. Such embodiments may be configured to lift packages 300 to facilitate movement of the packages 300 relative to the shelving brackets 110 and/or the end effector platform 514.

The picking robot 500 may be configured to move in multiple directions within the cargo area 14. For example, as noted above, the picking robots 500 may be configured to move forward/aft within the cargo area 14 (e.g., along horizontal track 502), and may be configured to move vertically (e.g., along upright members 504). In certain embodiments, each picking robot 500 is configured to place packages 300 onto and/or retrieve packages 300 from shelves located at any position along sidewalls within the cargo area 14, and is configured to present those packages 300 to the vehicle operator (e.g., while the vehicle operator is within the cockpit 13), and/or to place those packages 300 into a delivery staging area 15.

Figure 9:
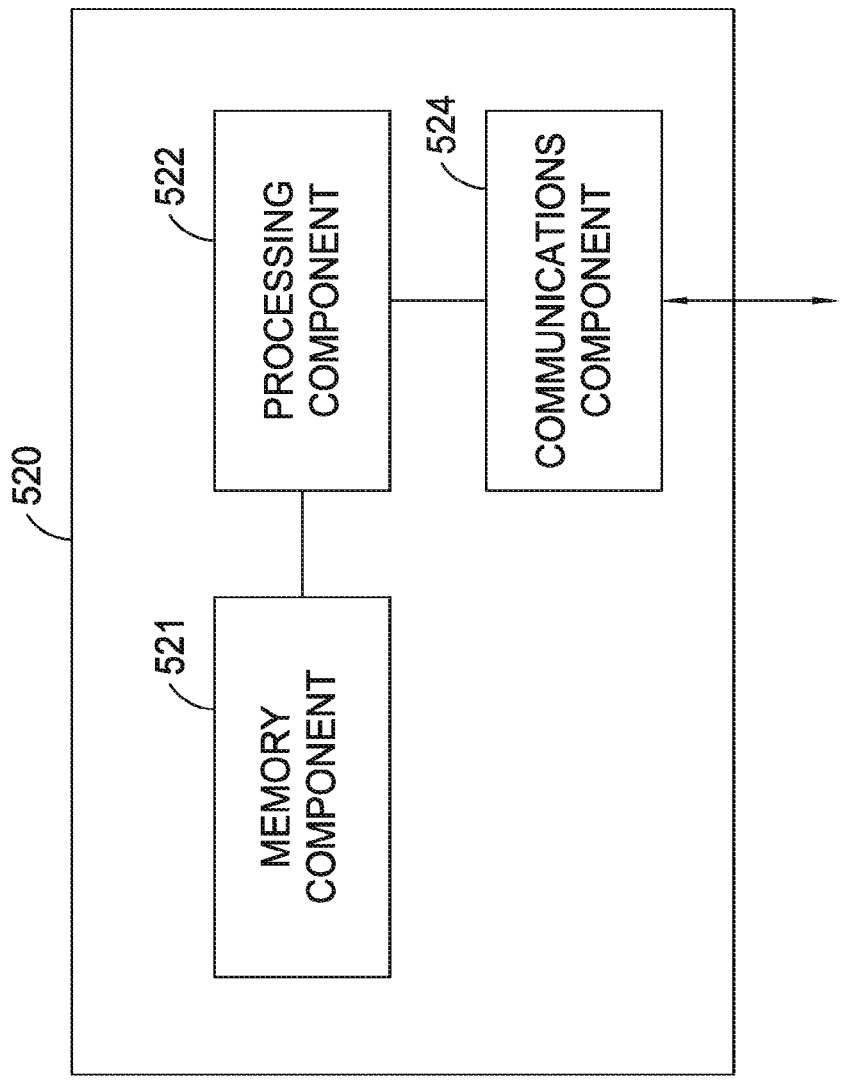
FIG. 9 schematically depicts a robot controller according to one embodiment.

Referring to FIG. 9, a schematic diagram of a cargo area controller 520 is schematically depicted. The cargo area controller 520 is communicatively coupled to various components of the picking robot 500 and generally controls the movement and function of the picking robot 500. The cargo area controller 520 generally includes one or more picking robot processing elements/components 522, one or more memory elements/components 521, and one or more picking robot communications elements/components 524. In embodiments, the cargo area controller 520 may be communicatively coupled to a conveyor controller 460, a vehicle's onboard computing entity, and/or the like such that the operation of the robot may be initiated based on signals received from the one or more computing entities. For example the cargo area controller 520 may initiate movement of the picking robot 500 when a vehicle computing entity 810 identifies one or more packages 300 to be delivered at an upcoming delivery stop, as will be described in greater detail herein. The communications device 524 is configured for communicating with various computing entities, such as by communicating information/data, content, information, and/or similar terms used herein interchangeably that can be transmitted, received, operated on, processed, displayed, stored, and/or the like. Such communication may be executed using a wired data transmission protocol, such as FDDI, DSL, ATM, frame relay, DOCSIS, or any other wired transmission protocol. Similarly, the central computing entity 802 may be configured to communicate via wireless external communication networks using any of a variety of protocols, such as GPRS, UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR protocols, NFC protocols, Wibree, Bluetooth protocols, wireless USB protocols, and/or any other wireless protocol.

It should be understood that the picking robots 500 may define additional degrees of freedom, additional package picking mechanisms, and/or the like. For example, the picking robots 500 may comprise multi-axis robotic arms that may be secured to a portion of the cargo area 14, such as a floor of the cargo area 14, a wall of the cargo area 14, a ceiling of the cargo area 14, and/or the like. Moreover, the picking robots 500 may comprise any of a variety of picking mechanisms, such as vacuum-based picking mechanisms (e.g., forming a vacuum between a surface of a package 300 and the picking robot 500 to support the package 300). In such embodiments, the picking mechanism may be configured to engage a front surface of a package 300 (e.g., the surface opposite the sidewall of the cargo area 14).

Moreover, in various embodiments the cargo area controller 520 is configured to minimize the amount of energy used during movement of the one or more picking robots 500. For example, the cargo area controller 520 may be configured to move the picking robot 500 based on the movement of the vehicle 10. In such embodiments, the cargo area controller 520 may be configured to move the picking robot 500 forward (e.g., toward the cockpit 13) during vehicle braking events, and may be configured to move the picking robot 500 aft (e.g., toward the back wall of the cargo area 14) during vehicle acceleration events. Thus, the cargo area controller 520 may be configured to select a desired location of a particular picking robot 500, and may be configured to selectably move the picking robot 500 toward the desired location during respective acceleration and braking events of the vehicle 10.

The cargo area controller 520 may also be configured to move the picking robots 500 to respective starting positions having known coordinates to reset the picking robots 500, and/or to store the picking robots 500 when not in use. In certain embodiments, the starting positions of the picking robots 500 may be proximate a ceiling of the cargo area 14, such that the picking robots 500 do not substantially block an aisle of the cargo area 14 (extending between shelves) such that a vehicle operator may access portions of the cargo area 14, if needed. For example, the picking robots 500 may be moved to the starting position upon a determination that a large and/or heavy item unsuitable for movement by a picking robot 500 is to be delivered at a particular destination, such that the vehicle operator is able to retrieve the items for delivery from the cargo area 14, without interference by the picking robots 500.

4. Cart Loading Area

Figure 10B:
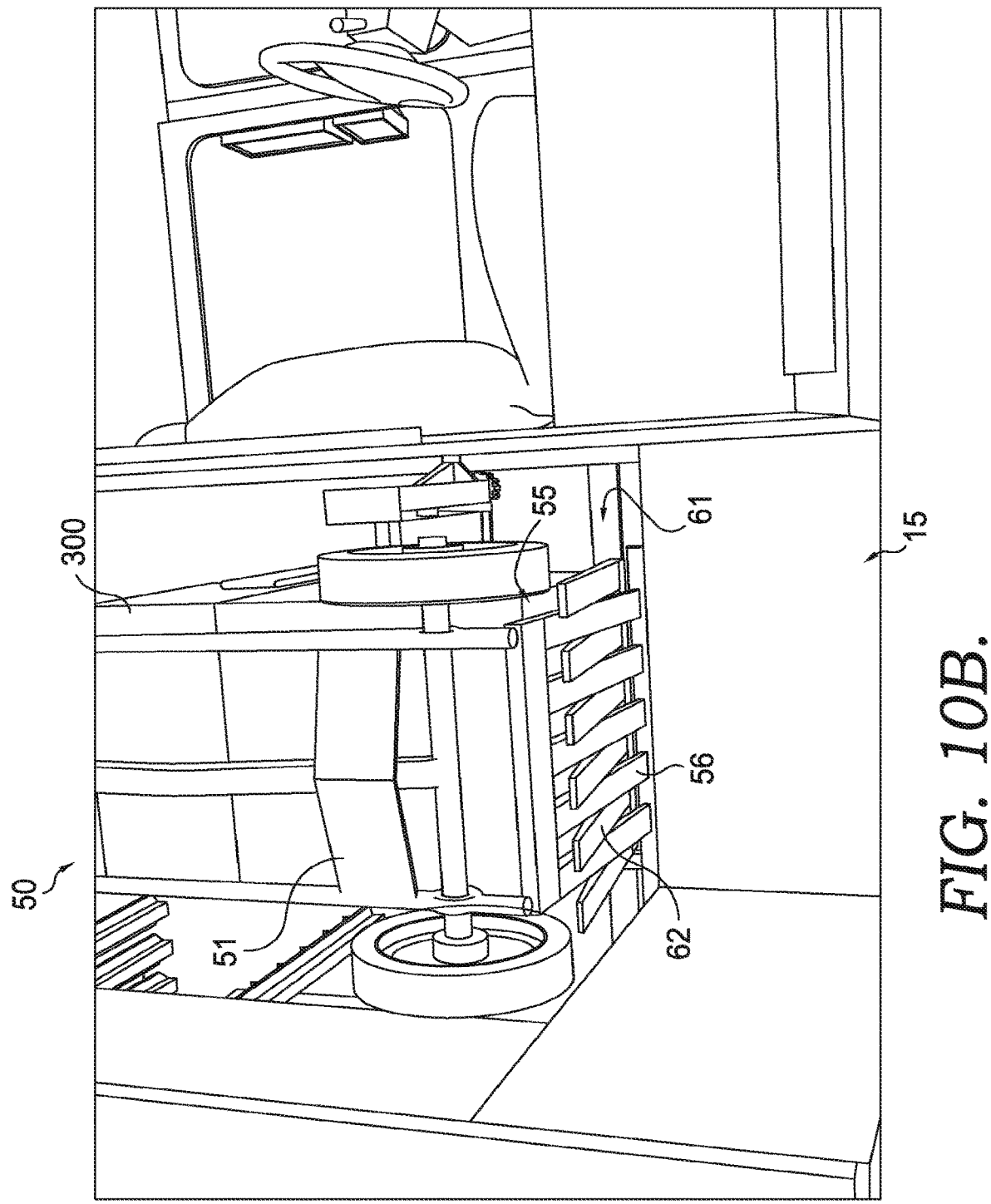

In certain embodiments, the cargo area 14 comprises a cart 50 that may be usable by a vehicle operator to ease delivery of large or heavy packages 300 and/or large numbers of packages 300 destined for a single destination location. In certain embodiments, the cargo area 14 comprises a ground robot configured to facilitate delivery of packages 300 from the vehicle 10 to respective destination locations. In such embodiments, the ground robot may operate in a manner similar to the cart 50 described herein while receiving packages 300 in a delivery staging area 15. Moreover, the ground robot may be an autonomous vehicle configured to maneuver from the delivery vehicle 10 to a delivery location for packages 300 placed thereon. As shown in FIGS. 2 and 10A-10B, the cart 50 may comprise a two-wheel cart 50 having a support backing portion 51 with integrated handles 52, and a base portion 55. Such as cart 50 may be commonly referred to as a two-wheel dolly. The base portion 55 may be defined by a planar, discontinuous base plate forming a plurality of tines 56 extending away (e.g., perpendicularly away) from a lower end of the support backing portion 51. As discussed herein, the plurality of tines 56 are configured to engage corresponding staging tines 62 of a cart staging plate 61 within the delivery staging area 15 of the vehicle 10.

In various embodiments, the delivery staging area 15 is located within the cargo area 14 and proximate the access door 12. Accordingly, the delivery staging area 15 is located proximate a sidewall of the cargo area 14, and may be directly accessed from an exterior of the vehicle 10 via the access door 12 (e.g., while the access door 12 is in an open position). Moreover, as discussed herein, the delivery staging area 15 is accessible by the at least one picking robot 500, such that the picking robots 500 may be configured to deposit packages 300 in the delivery staging area 15 prior to an upcoming delivery.

The delivery staging area 15 comprises a cart staging plate 61 at least partially defining a floor of the delivery staging area 15. As discussed herein, the cart staging plate 61 is defined by a planar, discontinuous plate comprising a plurality of staging tines 62 configured to engage the plurality of tines 56 of the cart 50. The tines 56 of the cart 50 are configured to fit between the staging tines 62 of the cart staging plate 61, for example, to enable the cart 50 to be slid under packages 300 placed onto the cart staging plate 61 (e.g., by sliding the cart tines 56 between the staging tines 62 that are supporting packages 300 thereon). Moreover, the cart 50 may be configured to lift packages 300 away from the cart staging plate 61 by tipping the cart 50 onto the wheels, thereby lifting the tines 56 of the cart 50 from between the staging tines 62 of the cart staging plate 61, thereby lifting the packages 300 as the tines 56 are lifted.

In certain embodiments, the cart staging plate 61 may be lowerable to a ground level below the cargo area 14 floor (e.g., the ground on which the vehicle's tires are supported). Thus, the cart staging plate 61 may be at least partially supported by one or more vertical mechanisms, such as pneumatic movement mechanisms, hydraulic movement mechanisms, motorized movement mechanisms, solenoid movement mechanisms, and/or the like. Moreover, although not shown in the attached figures, the cart staging plate 61 may be configured to selectably engage and lock the cart 50 relative to the cart staging plate 61. In certain embodiments, the cart staging plate 61 may be configured to engage a portion of the cart base portion 55, a portion of the cart support backing portion 51, a portion of the handle 52, and/or the like. Once the cart staging plate 61 and the cart 50 are locked, the cart 50 may be movable with the cart staging plate 61 between the storage position (e.g., within the cargo area 14) and the deployment position (e.g., with the cart 50 and cart staging plate 61 positioned on the support surface below the floor of the cargo area 14).

As discussed in greater detail herein, the delivery staging area 15 is configured to accept a plurality of packages 300 therein (e.g., from the picking robots 500), and to retain those packages 300 until the packages 300 are to be delivered. Moreover, the delivery staging area 15 is configured to continue receipt of packages 300 while the cart 50 is removed (e.g., during a delivery). For example, for delivery stops where multiple cart-loads of packages 300 are to be delivered at the single stop, the delivery staging area 15 is configured to receive a first load of packages 300 prior to the delivery vehicle 10 reaching the stop. The cart 50 may then be unloaded (e.g., by lowering the cart 50 and cart staging plate 61 to the support surface) with the packages 300, and the cart 50 may be removed for delivery. While the cart 50 is removed, the cart staging plate 61 may be returned into the cargo area 14, and may be loaded with a second load of packages 300 for delivery at the same destination location. Once the second load of packages 300 is filled, the cart staging plate 61 may be lowered to the support surface, the emptied cart 50 (after delivery of the first load) may be reengaged with the cart staging plate 61 by sliding the tines 56 of the cart 50 between the staging tines 62 of the cart staging plate 61, and the packages 300 of the second load of packages 300 may be lifted away from the cart staging plate 61 onto the cart 50 (e.g., by tipping the cart 50 onto its wheels). This process may be repeated as necessary until all packages 300 are delivered at the delivery location. After delivery, the cart 50 may be reengaged with the cart staging plate 61, and both the cart 50 and cart staging plate 61 may be raised into the cargo area 14 prior to the vehicle 10 departing.

5. Letter Sorting

In various embodiments, the cargo area 14 may have one or more mechanisms for providing letters 301 and/or other flat packages 301 to a delivery vehicle operator to ease delivery.

As just one example, the letters 301 may be placed within a tote 70 stored that may be stored on a shelf of the cargo area 14 (e.g., as shown in FIGS. 11A-C and 12A). The tote 70 may have an open top, four solid sidewalls, and a solid bottom wall. Letters 301 and other flat packages 301 to be delivered by the delivery vehicle operator may be placed within the tote 70 (e.g., during a preload operation) and the tote 70 may be loaded onto a shelf within the cargo area 14 of the vehicle 10. Upon determining that a letter 301 is to be delivered to an upcoming delivery location, the picking robot 500 may be configured to retrieve the tote 70 from its respective storage location on a shelf, and may present the tote 70 to the vehicle operator to enable the vehicle operator to sift through the letters 301 within the tote 70 to retrieve the letter 301 to be delivered at a particular delivery location. In certain embodiments the letters 301 within the tote 70 may be organized, for example in an expected delivery order (e.g., as determined by a computing entity), to facilitate vehicle operator selection of a particular letter 301.

Once a letter 301 has been picked for delivery, the picking robot 500 may replace the tote 70 in its respective storage location within the cargo area 14. This process may be repeated for each letter 301 delivery along a particular delivery route.

As yet another example, a mechanized tote 70 may be configured to automatically present a single letter 301 (or a plurality of letters 301 for delivery to a single destination location) to the vehicle operator to ease selection of letters 301 for delivery. As shown in FIGS. 11A-11C, the mechanized tote 70 may comprise an open top (although the top may be closed in certain embodiments), four solid walls, and a solid bottom surface having a letter slot 71 defined proximate a first end. Within the interior of the mechanized tote 70, various embodiments comprise a letter advancement mechanism configured to automatically advance letters 301 toward the letter slot 71 for presentation to a vehicle operator. As shown in FIGS. 11B-11C, the letter 301 advancement mechanism comprises at least one (e.g., two) rotatable coils 72 driven by a drive mechanism 73. Each letter 301 is placed within an individual loop of the coil 72, such that rotation of the coil 72 causes the letters 301 to advance toward the letter slot 71. The letters 301 are provided in an expected delivery order, such that the next-expected letter 301 for delivery is provided to the vehicle operator prior to delivery.

In the specific embodiment of FIG. 11C, the drive mechanism 73 comprises at least one drive wheel 74 corresponding to each rotatable coil 72. At least one of the drive wheels 74 comprises a drive shaft 75 extending through a sidewall of the tote 70 and configured for engagement with a corresponding external drive mechanism (discussed in detail herein). Moreover, the drive wheels 74 may be embodied as intermeshed gears, such that rotation of a first drive wheel 74 (e.g., a drive wheel comprising a drive shaft 75) causes an opposite rotation of a second drive wheel 74. In embodiments comprising two or more drive wheels 74 (corresponding to respective rotatable coils 72), the drive wheels 74 may have at least substantially identical diameters, such that the geared drive wheels 74 rotate at an at least substantially equal angular velocity upon receipt of an input by the drive shaft 75.

Each of the drive wheels 74 may be mechanically coupled to respective rotatable coils 72, for example via a belt drive, a chain drive, and/or the like. In the illustrated embodiment, continuous belts 76 surround a portion of the drive wheels 74 and a driven portion of the rotatable coils 72. Accordingly, the belts 76 translate rotational forces from the drive wheels 74 to the corresponding coils 72, thereby causing the coils 72 to rotate to advance letters 301 placed therein.

Figure 12A:
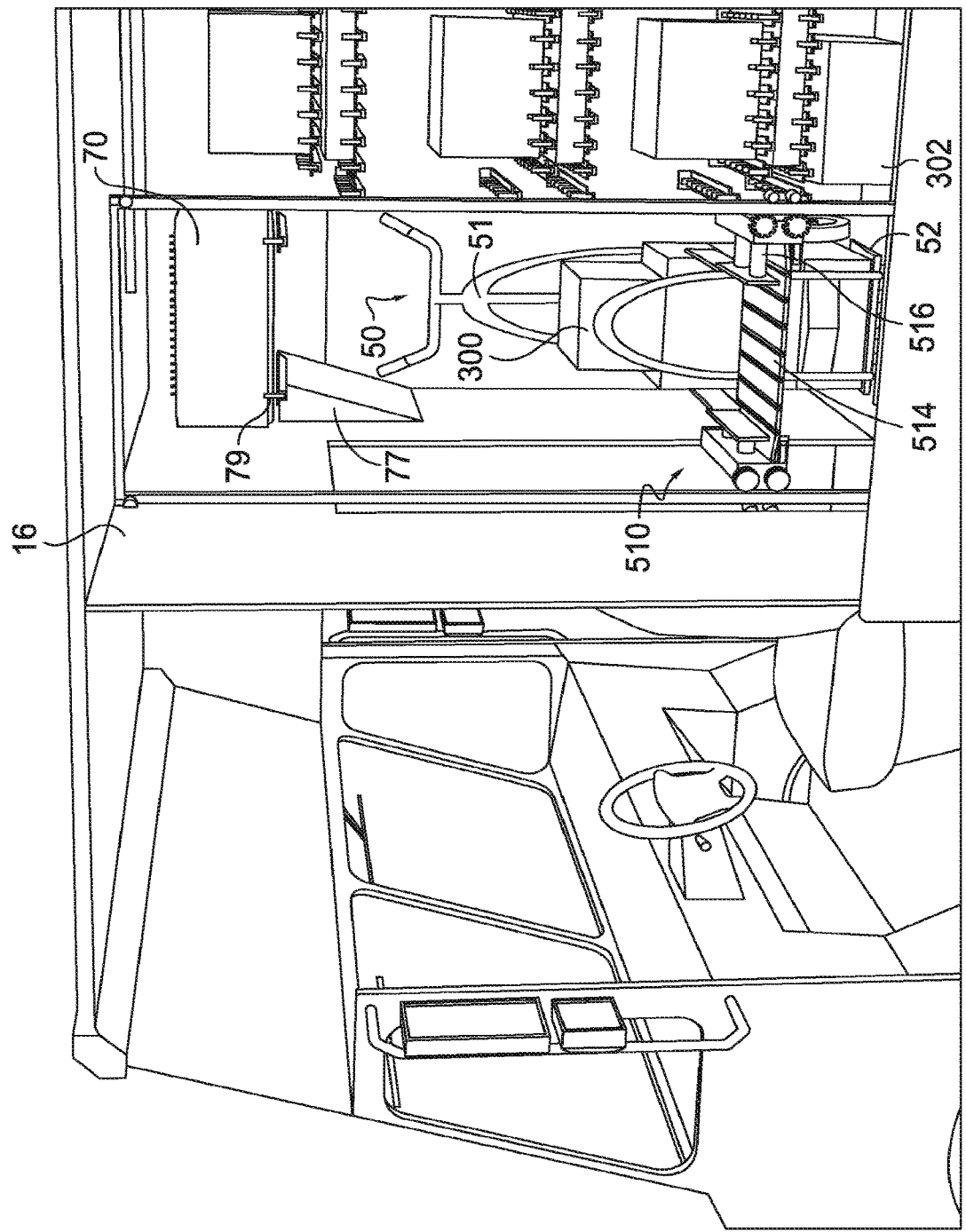
FIGS. 12A-12B show portion of a letter presentation system of a vehicle according to one embodiment.
Figure 12B:
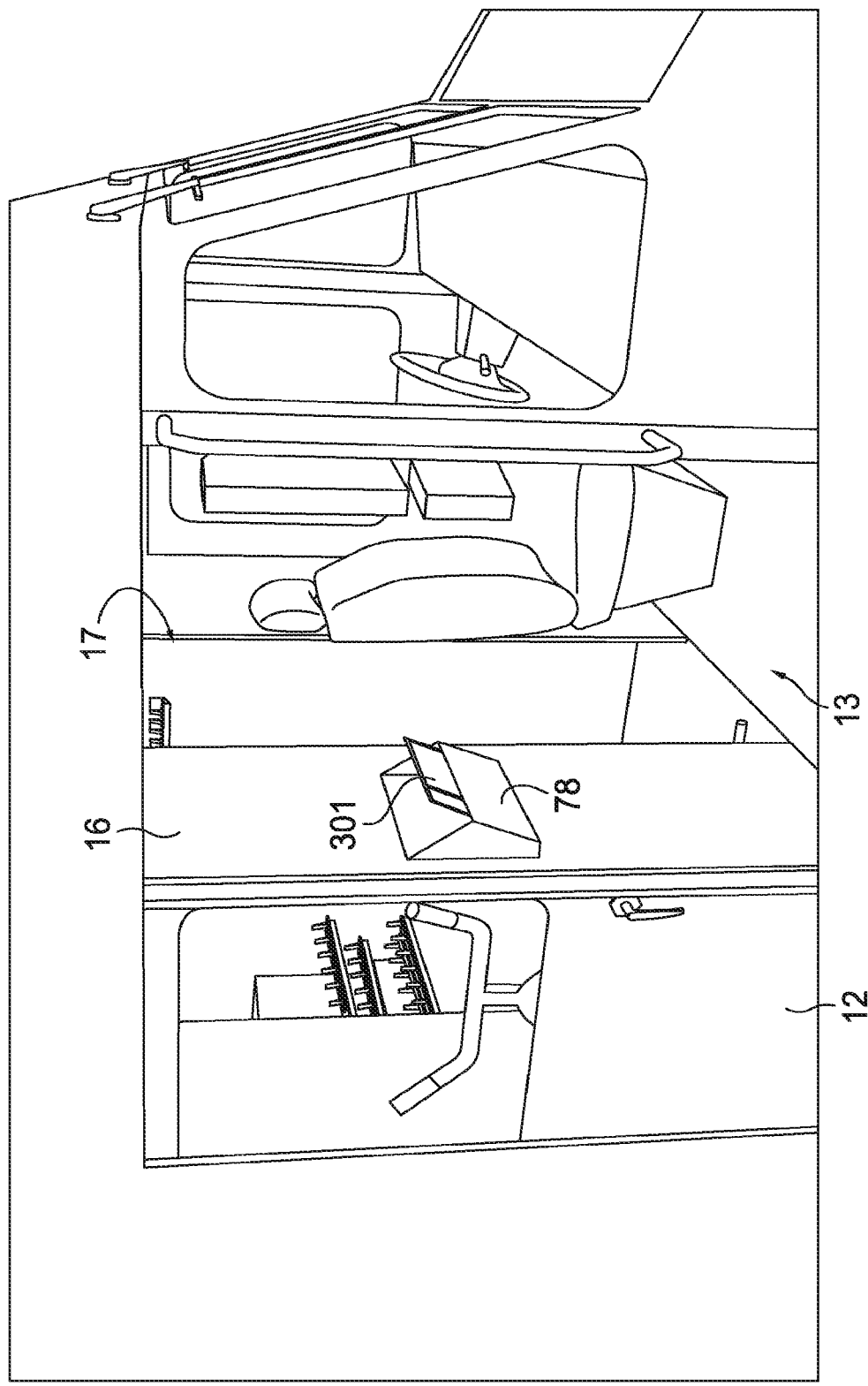

As shown in FIGS. 12A-12B, the mechanized tote 70 may be positioned against the bulkhead wall 16 between the cargo area 14 and the cockpit 13, and may be positioned above a letter chute 77 extending through the bulkhead wall 16 to a letter bin 78 disposed within the cockpit 13. Accordingly, when a letter 301 is advanced to the letter slot 71, the letter 301 slides through the letter chute 77 to the letter bin 78 for presentation to the vehicle operator.

Moreover, the mechanized tote 70 may be placed in mechanical communication with an external drive mechanism of the vehicle 10 configured to engage a tote drive shaft 75 within the tote 70. For example, a motor may be positioned adjacent the placement of the mechanized tote 70 (e.g., within the bulkhead wall 16), with a drive shaft configured to engage a drive shaft 75 of the tote 70 as discussed herein. Moreover, in certain embodiments the letter chute 77 and/or the letter bin 78 may comprise a letter sensor (e.g., presence sensor, optical sensor, pressure sensor, and/or the like) configured to detect the presence of a letter 301 moving through the letter chute 77 and/or positioned within the letter bin 78. Detection data generated by the letter sensor may be provided to the external drive mechanism in certain embodiments. The external drive mechanism may be configured to continue rotating the tote drive shaft 75 until the external drive mechanism receives a stop signal that is generated upon detection of a letter by the letter sensor. Accordingly, the external drive mechanism may be configured to avoid potential letter jams by continuing to rotate until the letter 301 has been detected within the letter chute 77 and/or the letter bin 78 by the letter sensor.

The mechanized tote 70 may be removable from the delivery position shown in FIG. 12A (e.g., via one or more of the picking robots 500). Accordingly, the delivery position may be defined by one or more supports 79 (e.g., support shelves, support brackets, and/or the like) configured to selectably engage the mechanized tote 70. Thus, the mechanized tote 70 may be automatically removed from the delivery position once it has been emptied of letters 301 for delivery, and may be placed in a shelf of the cargo area 14 for storage. In certain embodiments, the picking robots 500 may be configured to replace the mechanized tote 70 with a second mechanized tote 70 within the delivery position, if additional letters 301 are destined for delivery during a particular route.

6. Loading Mechanism

In various embodiments, the cargo area 14 (or cargo cartridge 1400) of a vehicle 10 may be automatically loaded. As mentioned above, the cargo area 14 may be configured to engage and support a cargo cartridge 1400 which may be loaded while the cargo cartridge 1400 is outside of the vehicle 10, and then may be placed into the vehicle 10 once loaded.

The cargo area 14 (whether cargo cartridge 1400 or integrated cargo components of a vehicle 10) may be loaded by the picking robots 500 retrieving packages 300 from a loading mechanism 400. In certain embodiments, the loading mechanism 400 may be analogous to that described in co-pending U.S. patent application Ser. No. 15/582,129, filed Apr. 28, 2017, which is incorporated herein by reference in its entirety.

Figure 13:
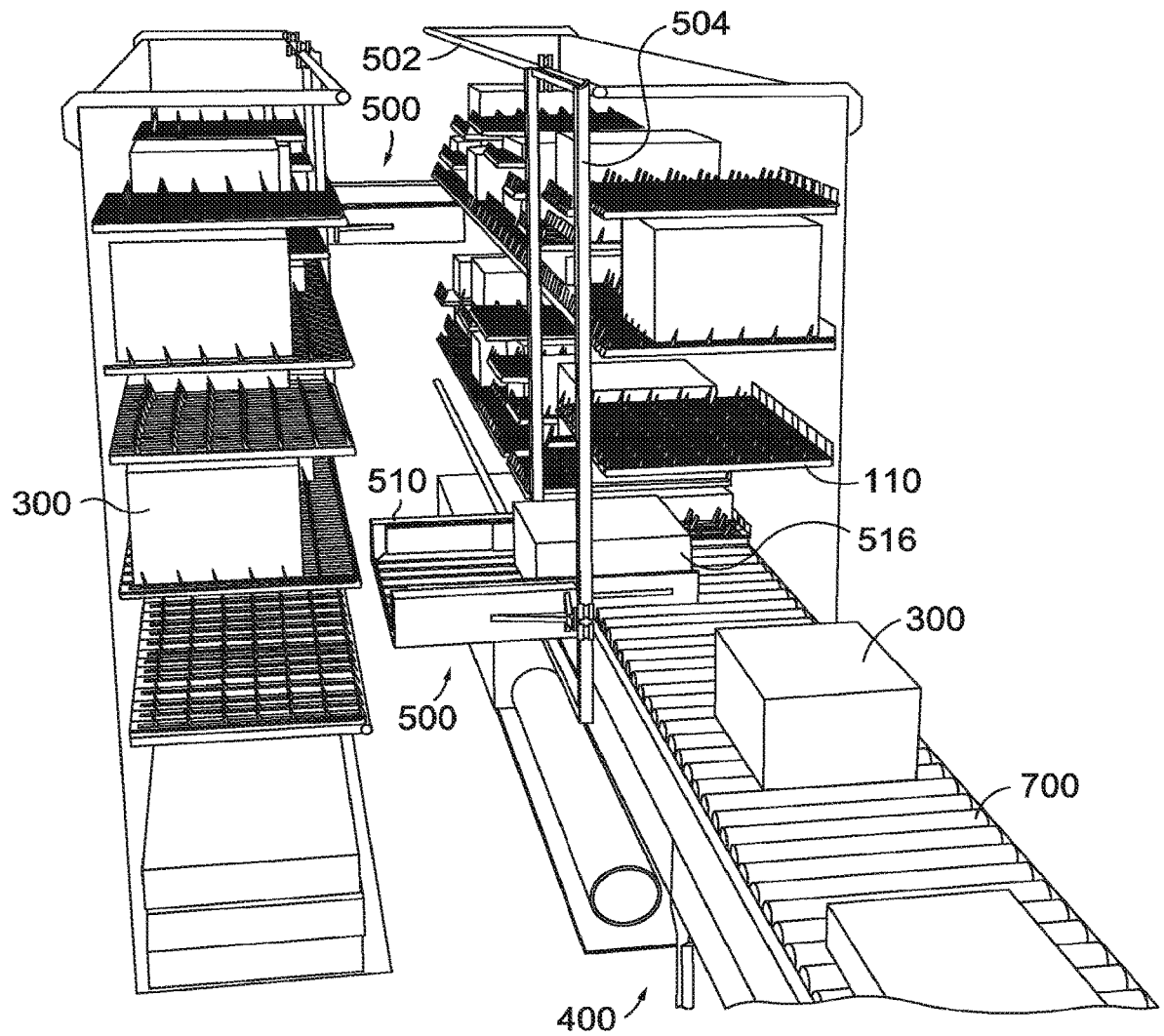
FIG. 13 shows a loading mechanism providing packages to a cargo area of a vehicle according to one embodiment.

FIG. 13 illustrates an example embodiment of a loading mechanism 400 usable in certain embodiments. As shown therein, the loading mechanism 400 may comprise a conveying mechanism 700 (e.g., a conveyor belt) that may be placed within the cargo area 14 and may be accessible to the one or more picking robots 500. The picking robots 500 may be configured to extend the clamping members 516 of the end effector 510 to engage the side surfaces of a package 300 delivered to the cargo area 14 via the loading mechanism 400. The picking robots 500 may then pull the packages 300 onto the end effector 510, and may move the packages 300 to a respective shelf assigned for the package 300. In certain embodiments, the sidewalls of the cargo area 14 may automatically form shelves (e.g., by moving shelving brackets 110 as discussed herein) as the packages 300 are received, such that shelves are formed for the packages 300 as needed.

III. COMPUTER PROGRAM PRODUCTS, METHODS, AND COMPUTING ENTITIES

Embodiments described herein may be implemented in various ways, including as computer program products that comprise articles of manufacture. Such computer program products may include one or more software elements/components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software elements/components of a similar type or functionally related may be stored together such as, for example, in a particular directory, folder, or library. Software elements/components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

Figure 14:
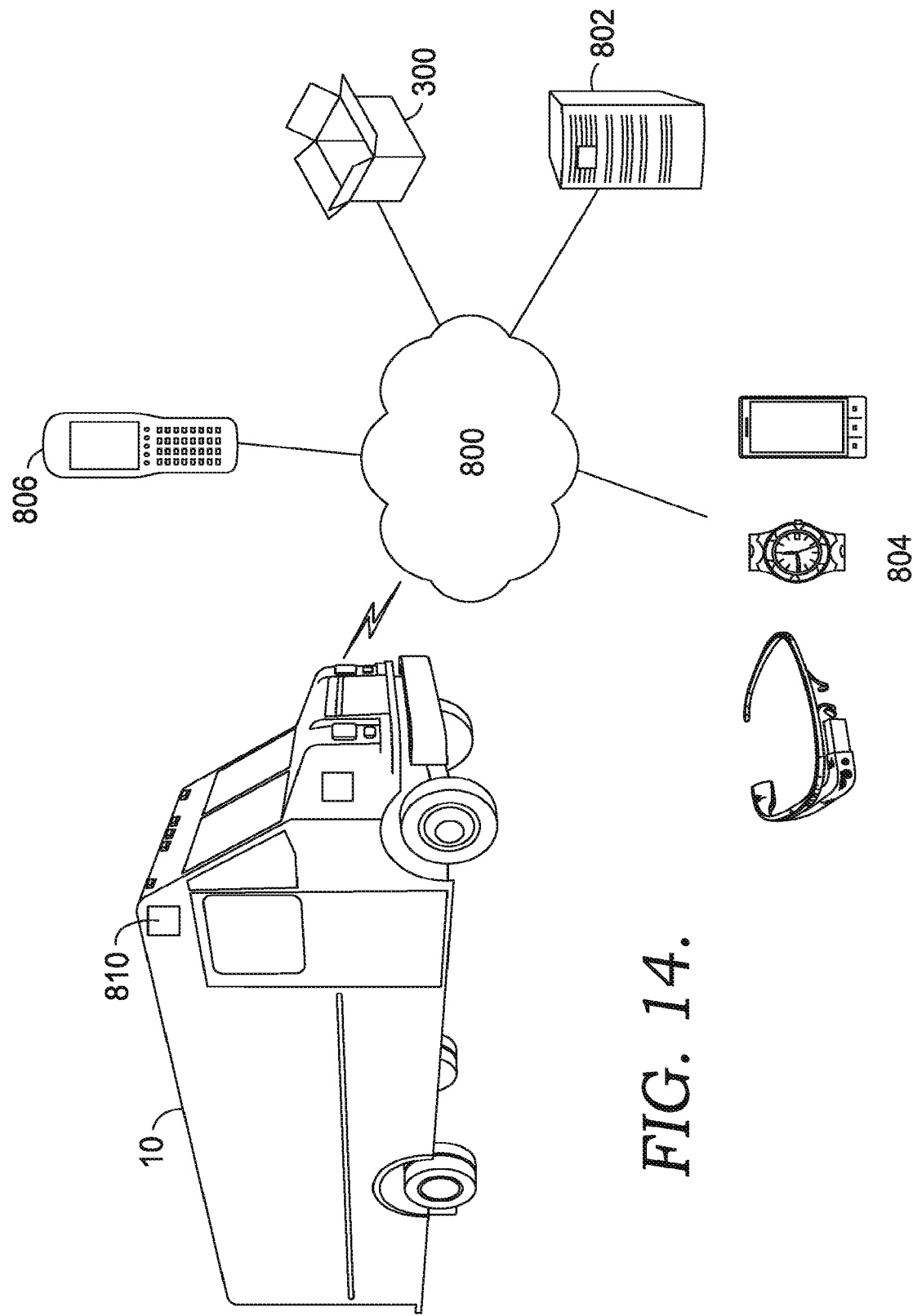
FIG. 14 schematically depicts the interconnectivity of computing entities according to one embodiment.

FIG. 14 provides an illustration of an exemplary embodiment of the present invention. As shown in FIG. 14, this particular embodiment may include one or more central computing entities 802, one or more networks 800, one or more user computing entities 804, one or more mobile carrier computing entities 806, one or more delivery vehicle computing entities 810, and/or the like. Each of these components, entities, devices, systems, and similar words used herein interchangeably may be in direct or indirect communication with, for example, one another over the same or different wired or wireless networks 800. Additionally, while FIG. 14 illustrates the various system entities as separate, standalone entities, the various embodiments are not limited to this particular architecture.

A. Exemplary Central Computing Entity

Figure 15:
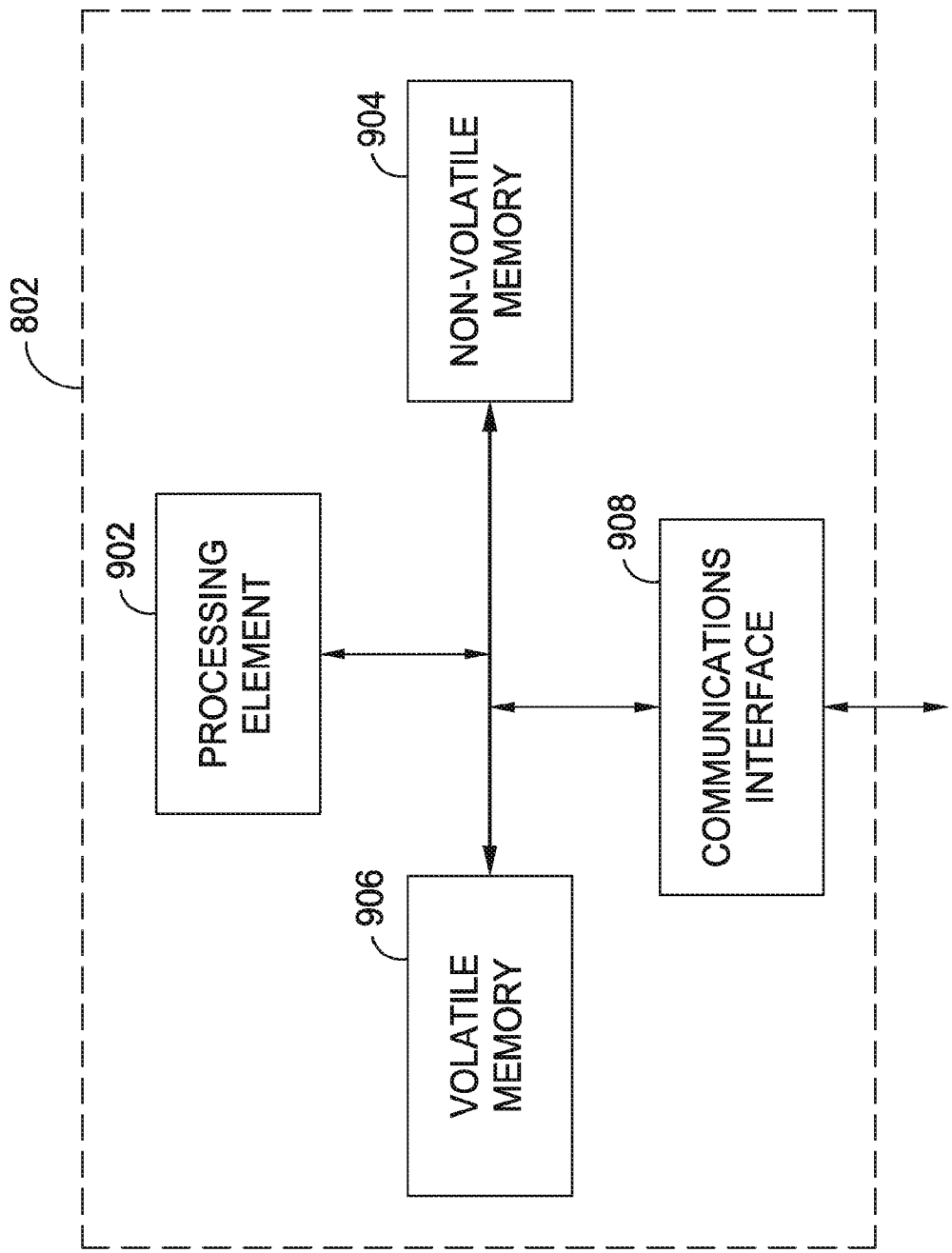
FIG. 15 schematically depicts a central computing entity according to one embodiment.

FIG. 15 provides a schematic of a central computing entity 802 according to one embodiment of the present invention. The central computing entity 802 can be operated by a variety of entities, including carriers. As will be recognized, a carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Coyote, Amazon, Google, Airbus, Uber, ride-sharing services, crowd-sourcing services, retailers, and/or the like.

As indicated, in one embodiment, the central computing entity 802 may also include one or more communications elements/components 908 for communicating with various computing entities, such as by communicating information/data, content, information, and/or similar terms used herein interchangeably that can be transmitted, received, operated on, processed, displayed, stored, and/or the like.

As shown in FIG. 15, in one embodiment, the central computing entity 802 may include or be in communication with one or more processing elements/components 902 (also referred to as processors, processing circuitry, processing device, and/or similar terms used herein interchangeably) that communicate with other elements/components within the central computing entity 802 via a bus, for example. As will be understood, the processing elements/components 902 may be embodied in a number of different ways. For example, the processing element/component 902 may be embodied as one or more CPLDs, "cloud" processors, microprocessors, multi-core processors, coprocessing entities, ASIPs, microcontrollers, and/or controllers. Further, the processing element/component 902 may be embodied as one or more other processing devices or circuitry. The term circuitry may refer to an entirely hardware embodiment or a combination of hardware and computer program products. Thus, the processing element/component 902 may be embodied as integrated circuits, ASICs, FPGAs, PLAs, hardware accelerators, other circuitry, and/or the like. As will therefore be understood, the processing element/component 902 may be configured for a particular use or configured to execute instructions stored in volatile or non-volatile media or otherwise accessible to the processing element/component 902. As such, whether configured by hardware or computer program products, or by a combination thereof, the processing element/component 902 may be capable of performing steps or operations according to embodiments of the present invention when configured accordingly.

In one embodiment, the central computing entity 802 may further include or be in communication with memory components/elements—such as non-volatile media (also referred to as non-volatile storage, memory, memory storage, memory circuitry and/or similar terms used herein interchangeably). In one embodiment, the non-volatile storage or memory may include one or more non-volatile storage or memory media 904, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, information/data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the memory components/elements may further include or be in communication with volatile media (also referred to as volatile storage, memory, memory storage, memory circuitry and/or similar terms used herein interchangeably). In one embodiment, the volatile storage or memory may also include one or more volatile storage or memory media 906, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, information/data, applications, programs, program modules, scripts, source code, object code, byte code, compiled code, interpreted code, machine code, executable instructions, and/or the like being executed by, for example, the processing element/component 902. Thus, the databases, database instances, database management systems, information/data, applications, programs, program modules, scripts, source code, object code, byte code, compiled code, interpreted code, machine code, executable instructions, and/or the like may be used to control certain aspects of the operation of the central computing entity 802 with the assistance of the processing element/component 902 and operating system.

As indicated, in one embodiment, the central computing entity 802 may also include one or more communications components/elements 908 for communicating with various computing entities, such as by communicating information/data, content, information, and/or similar terms used herein interchangeably that can be transmitted, received, operated on, processed, displayed, stored, and/or the like. Such communication may be executed using a wired data transmission protocol, such as FDDI, DSL, ATM, frame relay, DOCSIS, or any other wired transmission protocol. Similarly, the central computing entity 802 may be configured to communicate via wireless external communication networks using any of a variety of protocols, such as GPRS, UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR protocols, NFC protocols, Wibree, Bluetooth protocols, wireless USB protocols, and/or any other wireless protocol.

Although not shown, the central computing entity 802 may include or be in communication with one or more input components/elements, such as a keyboard input, a mouse input, a touch screen/display input, motion input, movement input, audio input, pointing device input, joystick input, keypad input, and/or the like. The central computing entity 802 may also include or be in communication with one or more output elements/components (not shown), such as audio output, video output, screen/display output, motion output, movement output, and/or the like.

As will be appreciated, one or more of the central computing entity's 802 elements/components may be located remotely from other central computing entity 802 components/elements, such as in a distributed system. That is, the term "central" is used in the generic sense and is not intended to necessarily indicate a central location. Furthermore, one or more of the elements/components may be combined and additional elements/components performing functions described herein may be included in the central computing entity 802. Thus, the central computing entity 802 can be adapted to accommodate a variety of needs and circumstances. As will be recognized, these architectures and descriptions are provided for exemplary purposes only and are not limiting to the various embodiments.

B. Exemplary User Computing Entity

A user may be an individual, a family, a company, an organization, an entity, a department within an organization, a representative of an organization and/or person, and/or the like. Thus, as will be recognized, in certain embodiments, users may be consignors and/or consignees. To do so, a user may operate a user computing entity 804 that includes one or more elements/components that are functionally similar to those of the central computing entity 802.

Figure 16:
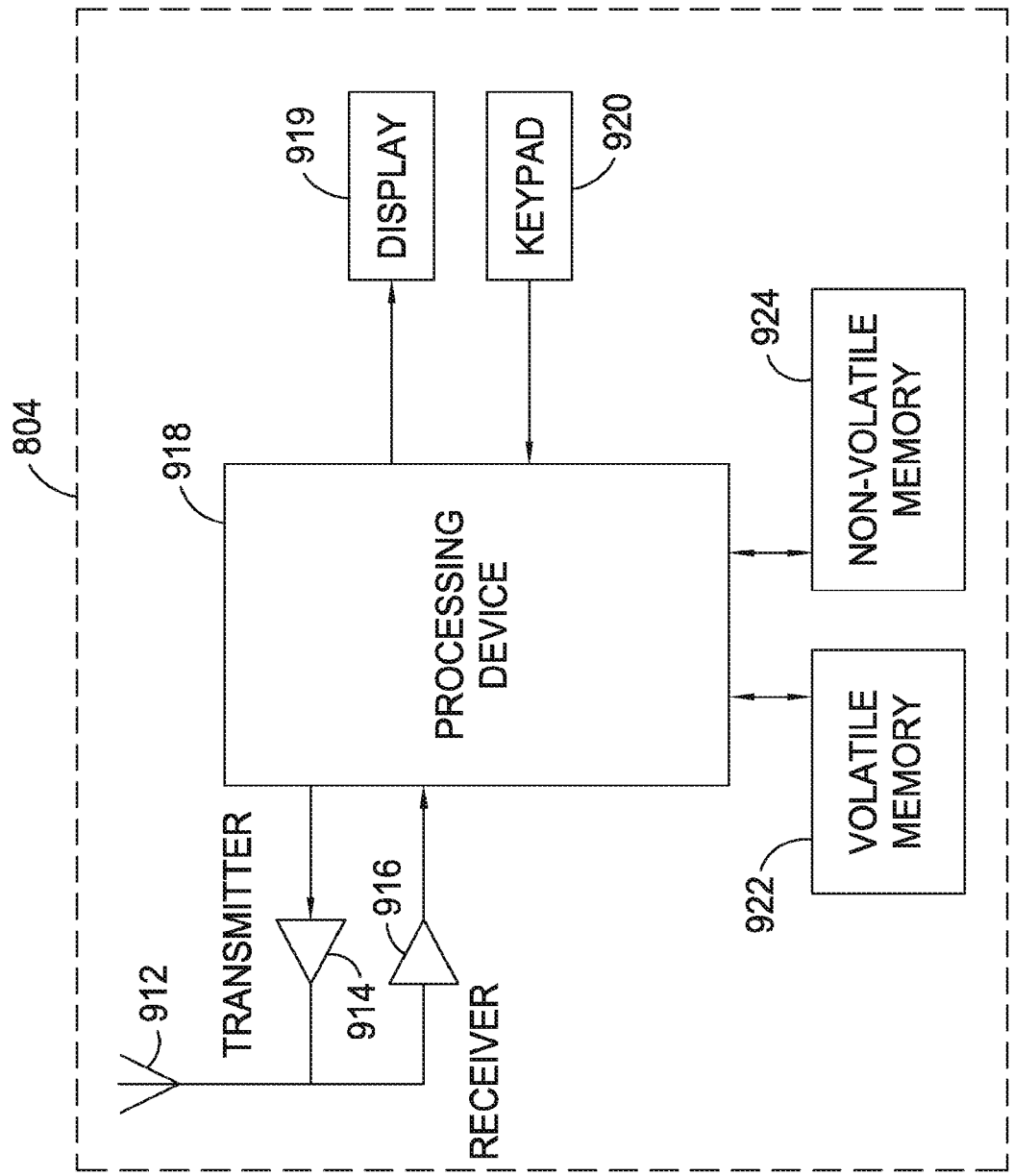
FIG. 16 schematically depicts a user computing entity according to one embodiment.

FIG. 16 provides an illustrative schematic representative of a user computing entity 804 that can be used in conjunction with embodiments of the present invention. In general, the terms device, system, computing entity, entity, and/or similar words used herein interchangeably may refer to, for example, one or more computers, computing entities, desktop computers, mobile phones, tablets, phablets, notebooks, laptops, distributed systems, smart home entities, kitchen appliances, Google Home, Amazon Echo, garage door controllers, cameras, imaging devices, thermostats, security systems, networks, gaming consoles (e.g., Xbox, Play Station, Wii), watches, glasses, iBeacons, proximity beacons, key fobs, RFID tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG. 45, the user computing entity 804 can include communication components/elements, such as an antenna 912, a transmitter 914 (e.g., radio), and a receiver 916 (e.g., radio). Similarly, the user computing entity 804 can include a processing element/component 918 (e.g., CPLDs, microprocessors, multi-core processors, cloud processors, coprocessing entities, ASIPs, microcontrollers, and/or controllers) that provides signals to and receives signals from communication elements/components.

The signals provided to and received from the transmitter 914 and the receiver 916, respectively, may include signaling information/data in accordance with air interface standards of applicable wireless systems. In this regard, the user computing entity 804 may be capable of operating with one or more air interface standards, communication protocols, modulation types, and access types. More particularly, the user computing entity 804 may operate in accordance with any of a number of wireless communication standards and protocols, such as those described above with regard to the central computing entity 802. In a particular embodiment, the user computing entity 804 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 804 may operate in accordance with multiple wired communication standards and protocols, such as those described above with regard to the central computing entity 802 via a network interface 908.

Via these communication standards and protocols, the user computing entity 804 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 804 can also download changes, add-ons, and updates, for instance, to its firmware, software (e.g., including executable instructions, applications, program modules), and operating system.

According to one embodiment, the user computing entity 804 may include location determining elements/components, aspects, devices, modules, functionalities, and/or similar words used herein interchangeably. For example, the user computing entity 804 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Global Navigation Satellite System (GLONASS), Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the user computing entity's 804 position in connection with a variety of other systems, including cellular towers, Wi-Fi access points, and/or the like. Similarly, the user computing entity 804 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Bluetooth Smart, NFC transmitters, and/or the like. These indoor positioning aspects can be used in a variety of settings to determine the location of someone or something to within inches or centimeters.

The user computing entity 804 may also comprise a user interface (that can include a display 919 coupled to a processing element/component 918) and/or a user input interface (coupled to a processing element/component 918). For example, the user interface may be a user application, browser, user interface, interface, and/or similar words used herein interchangeably executing on and/or accessible via the user computing entity 804 to interact with and/or cause display of information/data from the central computing entity 802, as described herein. The user input interface can comprise any of a number of devices or interfaces allowing the user computing entity 804 to receive information/data, such as a keypad 920 (hard or soft), a touch display, voice/speech or motion interfaces, or other input device. In embodiments including a keypad 920, the keypad 920 can include (or cause display of) the conventional numeric (0-9) and related keys (#, *), and other keys used for operating the user computing entity 804 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 804 can also include memory elements/components—such as volatile storage or memory 922 and/or non-volatile storage or memory 924, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the user computing entity 804. As indicated, this may include a user application that is resident on the entity or accessible through a browser or other user interface for communicating with the central computing entity 802, mobile carrier computing entity 806, delivery vehicle computing entity 810, and/or various other computing entities.

In another embodiment, the user computing entity 804 may include one or more elements/components or functionality that are the same or similar to those of the central computing entity 802, as described in greater detail above. As will be recognized, these architectures and descriptions are provided for exemplary purposes only and are not limiting to the various embodiments.

C. Exemplary Delivery Vehicle Computing Entity

Referring again to FIG. 15, the one or more delivery vehicle computing entities 810 may be attached, affixed, disposed upon, integrated into, or part of a delivery vehicle 10. The delivery vehicle computing entity 810 may collect telematics information/data (including location information/data) and transmit/send the information/data to various other computing entities via one of several communication methods.

In one embodiment, the delivery vehicle computing entity 810 may include, be associated with, or be in wired or wireless communication with one or more processing elements/components, location determining elements/components, one or more communication elements/components, one or more sensing elements/components, one or more memory location determining elements/components, one or more power sources, and/or the like. Such elements/components may be similar to those described with regard to the central computing entity 802 and/or the user computing entity 804.

In one embodiment, the one or more location determining elements/components may be one of several components in wired or wireless communication with or available to the delivery vehicle computing entity 810. Moreover, the one or more location determining elements/components may be compatible with various satellite or navigation systems, coordinate systems, and/or the like. Thus, the one or more location determining elements/components may be used to receive latitude, longitude, altitude, heading or direction, geocode, course, position, time, and/or speed information/data (e.g., referred to herein as telematics information/data and further described herein below). The one or more location determining elements/components may also communicate with the central computing entity 802, the delivery vehicle computing entity 810, mobile carrier computing entity 806, and/or similar computing entities.

As indicated, in addition to the one or more elements/components, the delivery vehicle computing entity 810 may include and/or be associated with one or more sensing elements/components, modules, and/or similar words used herein interchangeably. For example, the sensing elements/components may include vehicle sensors, such as motor/engine, fuel, odometer, hubometer, tire pressure, location, weight, emissions, door, and speed sensors. The sensed information/data may include, but is not limited to, speed information/data, emissions information/data, RPM information/data, tire pressure information/data, oil pressure information/data, seat belt usage information/data, distance information/data, fuel information/data, idle information/data, and/or the like (which may be referred to as telematics information/data). The sensing elements/components may include environmental sensors, such as air quality sensors, temperature sensors, and/or the like. Thus, the sensed information/data may also include CO, NOx, SOx, EtO, O3, H2S, and/or NH4 information/data, and/or meteorological information/data (which may be referred to as weather, environmental, and/or atmospheric information/data).

In one embodiment, the delivery vehicle computing entity 810 may further be in communication with a vehicle control module or system. The vehicle control module or system, which may be a scalable and subservient device to the delivery vehicle computing entity 810, may have information/data processing capability to decode and store analog and digital inputs from vehicle systems and sensors. The vehicle control module or system may further have information/data processing capability to collect and present telematics information/data to the J-Bus (which may allow transmission to the delivery vehicle computing entity 810), and output standard vehicle diagnostic codes when received from a vehicle's J-Bus-compatible onboard controllers and/or sensors.

As will be recognized, the delivery vehicle computing entity 810 can include communication elements/components, such as those described with regard to the central computing entity 802 and/or user computing entity 804. Furthermore the delivery vehicle computing entity 810 may be communicatively coupled to the picking robot processor 522 and the conveyor controller 460 and may control operation of the picking robot 500 and the conveyor 700, as will be described in greater detail herein.

D. Exemplary Mobile Carrier Computing Entity

In one embodiment, a mobile carrier computing entity 806 may include one or more elements/components that are functionally similar to those of the central computing entity 802, user computing entity 804, and/or delivery vehicle computing entity 810. For example, in one embodiment, each mobile carrier computing entity 806 may include one or more processing elements/components (e.g., CPLDs, microprocessors, multi-core processors, cloud processors, coprocessing entities, ASIPs, microcontrollers, and/or controllers), one or more display device/input devices (e.g., including user interfaces), volatile and non-volatile storage or memory elements/components, and/or one or more communications elements/components. For example, the user interface may be a user application, browser, user interface, interface, and/or similar words used herein interchangeably executing on and/or accessible via the mobile carrier computing entity 806 to interact with and/or cause display of information/data from the central computing entity 802, as described herein. This may also enable the mobile carrier computing entity 806 to communicate with various other computing entities, such as user computing entities 804, and/or various other computing entities. As will be recognized, these architectures and descriptions are provided for exemplary purposes only and are not limiting to the various embodiments.

V. ADDITIONAL FEATURES, FUNCTIONALITY AND/OR OPERATIONS

As discussed in greater detail herein, various embodiments utilize specific data associated with particular packages, vehicles, and/or the like for configuring the vehicles during loading and/or for selecting various packages for delivery.

A. Package Information/Data

In one embodiment, the central computing entity 802 may generate and/or receive package information/data for one or more packages 300. For example, a user may initiate the transportation process by entering identifying information/data into the central computing entity 802. In various embodiments, the user (e.g., a user or user representative operating a user computing entity 804) may access a webpage, application, dashboard, browser, or portal of a carrier. After the user is identified (e.g., based on his or her profile), the user may initiate a package 300. In various embodiments, the central computing entity 802 may then provide or be in communication with a user interface (e.g., browser, dashboard, application) for the user to provide package information/data which includes certain details regarding the package 300. In various embodiments, the package information/data may include a name, street address, city, state, postal code, country, telephone number, and/or the like for both the consignor and the consignee. In various embodiments, the user interface may comprise a fillable form with fields including ship-from information/data and ship-to information/data. In various embodiments, some of the information/data fields may be pre-populated. For example, if the user logged into a registered account/profile, the address information/data entered during registration may be pre-populated in certain information/data fields. In some embodiments, the user may also have a digital address book associated with the account comprising address information/data for possible ship-to and/or ship-from information/data. The user may be able to select certain ship-to and/or ship-from information/data from the address book for the associated package 300.

In one embodiment, after the central computing entity 802 receives the ship-to and/or ship-from information/data from the user, the central computing entity 802 may perform one or more validation operations. For example, the central computing entity 802 may determine whether the primary address (and/or other addresses) in the specified country or postal code is eligible for a pick-up or delivery. The central computing entity 802 may also determine whether the primary address (and/or other secondary addresses) is valid, e.g., by passing the primary address through one or more address cleansing or standardization systems. The central computing entity 802 may perform a variety of fraud prevention measures as well, such as determining whether the users (or one of the delivery addresses) have been "blacklisted" from user pick-up and/or delivery. As will be recognized, a variety of other approaches and techniques can be used to adapt to various needs and circumstances.

In addition to ship-to and/or ship-from information/data, the package information/data may also include service level information/data. The service level options may be, for example, Same Day Ground, Next Day Ground, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like.

In one embodiment, the central computing entity 802 (a) may be provided package 300 characteristics and attributes in the package information/data and/or (b) may determine package 300 characteristics and attributes from the package information/data. The characteristics and attributes may include the dimensions (e.g., length, width, height), weight, transportation classifications, planned movements in the carrier's transportation and logistics network, planned times, and/or the like for various packages 300. For example, the length, width, height, base, radius, and weight can be received as input information/data and/or can be determined or collected by various carrier systems. For example, sensors or cameras may be positioned to capture or determine the length, width, height, and weight (including dimensional weight) of a package 300 as it moves along the conveyor, moves in or out of loading bay, is carried by a lift truck, is transported through the carrier's transportation and logistics network, and/or the like. As discussed in greater detail herein, such dimensions and/or weight information/data may be usable by one or more computing entities to determine a relative size for a shelf to support the package 300, and/or whether the shelves may support the weight of the package 300.

In one embodiment, with such information/data, the central computing entity 802 can determine/identify the cube/volume for each package 300. The units of measurement for the equations may be established so that the size produced by the determinations is in cubic feet, or cubic inches, or any other volumetric measure. In one embodiment, after determining the cube/volume for a package 300 (and/or making various other determinations), the central computing entity 802 can apply a classification to the package 300 based at least in part on the cube/volume. The classifications may include (1) size category one packages 300, (2) size category two packages 300, (3) size category three packages 300, and/or (4) size category four packages 300. By way of example, (1) size category one packages 300 may be defined as being within >0 and <2 cubic feet, (2) size category two packages 300 may be defined as being within >2 and <4 cubic feet, (3) size category three packages 300 may be defined as being within >4 and <6 cubic feet, and/or (4) size category four packages 300 may be defined as being over >6 cubic feet. As will be recognized, a variety of other approaches and techniques can be used to adapt to various needs and circumstances.

In one embodiment, the package information/data may also include tracking information/data (of various "tracking events") corresponding to the location of the package 300 in the transportation and logistics network. To determine and reflect a package's movement, a package 300 identifier associated with the package 300 may, for example, be scanned or otherwise electronically read at various points as the package 300 is transported through the carrier's transportation and logistics network. As indicated, these events may be referred to as tracking events. In one embodiment, the latest or most-recent tracking events (e.g., tracking information/data) can associate the package 300 with the particular origin entity, destination entity, bundle/container, vehicle, employee, location, facility, and/or the like.

B. Mapping Information/Data

In one embodiment, a "serviceable point" may be any identifiable location, such as one or more addresses, delivery locations, parking locations, sidewalks, highways, trails, alleys, paths, walkways, streets, street segments, entrance or exit ramps, roads, longitude and latitude points, geocodes, zip codes, area codes, cities, counties, states, provinces, countries, stops (e.g., pick up stops, delivery stops, vehicle visits, stops) geofenced areas, geographic areas, landmarks, buildings, bridges, and/or other identifiable locations. For example, a serviceable point may be a residential location, such as one or more homes, one or more mobile homes, one or more apartments, one or more apartment buildings, one or more condominiums, one or more townhomes, one or more points at such locations, and/or the like. The serviceable point may also be any specific location at a residential location (e.g., front door of a residence, side door of a residence, and/or the like). A serviceable point may also be a commercial location, such as one or more stores in a mall, one or more office buildings, one or more office parks, one or more offices of an apartment complex, one or more garages, one or more warehouses, one or more restaurants, one or more stores, one or more retail locations, one or more points at such locations, and/or the like. The serviceable point may also be any specific location at a commercial location (e.g., front door of a commercial, dock of a commercial location, and/or the like). A serviceable point may be one or more streets, one or more street segments, one or more zones, one or more areas, one or more latitude and/or longitude points (e.g., 33.7869128, −84.3875602), one or more geocodes, and/or the like. A serviceable point may be any identifiable location, and may be utilized as a delivery destination for one or more packages 300. As will be recognized, a variety of approaches and techniques can be used to adapt to various needs and circumstances.

In certain embodiments, serviceable points can be represented digitally in geographical maps as map information/data. Map information/data may include boundary, location, and attribute information/data corresponding to the various serviceable points and/or the like. As will be recognized, the map information/data can be stored using a variety of formats, layers, and/or the like—including shapefiles, Arc-Maps, geodatabases, coverages, imagery, rasters, computer-aided drafting (CAD) files, other storage formats, and/or the like. For instance, the central computing entity 802 can appropriately store/record map information/data as a part of a digital map, e.g., as part of a feature layer, raster layer, service layer, geoprocessing layer, basemap layer, and/or the like.

Further, serviceable points can be represented in digital maps as being accessible by one or more street networks or street segments of a street network. A "street network" is collection of street segments that comprise navigable/traversable/travelable roads, streets, highways, paths, trails, walkways, entrance and exit ramps, bridges, sidewalks, alleys, and/or the like that can be used to access serviceable points. Similarly, serviceable points, street networks, and/or the like can be represented in digital maps as navigable/traversable/travelable segments or points for traveling to and/or from serviceable points.

As will be recognized, digital maps (e.g., map data) may include various types of information/data about serviceable points and street networks, such as the longitude of street segments and/or serviceable points, the latitude of street segments and/or serviceable points, the altitude of street segments and/or serviceable points, the speed limits of street segments, direction restrictions for street segments, time penalties for street segments, and/or other information/data associated with street networks and serviceable points, and/or the like. For example, in one embodiment, a serviceable point may be represented by and/or associated with a longitude and latitude, a geocode, a nearest street segment, an address, and/or the like. Similarly, street segments of street networks may be represented by or associated with a street name, a segment identifier, a connecting node, an address or address range, a series of longitude and latitude coordinates, and/or the like that define the overall shape and location of the street segment. As will be recognized, a variety of other approaches and techniques can be used to adapt to various needs and circumstances.

In one embodiment, the central computing entity 802 may store digital maps. In another embodiment, the central computing entity 802 may be in communication with or associated with one or more mapping websites/servers/providers/databases (including providers such as maps.google.com, bing.com/maps, mapquest.com, Tele Atlas®, NAVTEQ®, and/or the like) that provide map information/data of digital maps to a variety of users and/or entities. Using the digital maps, an appropriate computing entity can provide map information/data, for example, about serviceable points (e.g., their locations, attributes, and/or the like) and/or their corresponding street networks based on map data. An appropriate computing entity can also provide map information/data, for example, about traveling to different serviceable points on the street networks. For instance, the map information/data may include a route for delivering one or more items to different serviceable points, the most efficient order for delivering items to the serviceable points, directions for traveling to and/or from the serviceable points, the estimated distance for traveling to and/or from the serviceable points, the expected time for traveling to and/or from the serviceable points, and/or the like. The term "route" is used generically to refer to any path traversed by a vehicle 10, person, animal, and/or the like. The map information/data may also include other information/data about serviceable points and/or traveling to and from serviceable points, such as current estimated speeds for associated street segments, historical speeds for associated street segments, nearest street segments, posted speed limits for associated street segments, interpolated locations of serviceable points, reverse geocoded locations of serviceable points, latitude and longitude points of serviceable points, distances between various serviceable points, directions, stop orders, and/or the like. Certain examples of these types of information/data are described in U.S. Publ. No. 2013/0304349, which is hereby incorporated in its entirety by reference.

In one embodiment, the central computing entity 802 can identify and/or retrieve map information/data associated with serviceable points and/or geographic areas. A geographic area may be one or more delivery routes, delivery locations, parking locations, sidewalks, highways, trails, alleys, paths, walkways, streets, routes, street segments, entrance or exit ramps, roads, zip codes, area codes, cities, counties, states, provinces, countries, and/or other identifiable locations.

In one embodiment, although not necessary, the map information/data can be provided to the driver of the vehicle 10 in a variety of ways and using various formats. For instance, the mobile carrier computing entity 806 (or other appropriate device) may provide turn-by-turn navigation to the driver of a vehicle 10 for traveling between each stop. As will be recognized, a variety of other techniques and approaches can be used to adapt to various needs and circumstances.

In one embodiment, the central computing entity 802 can identify and/or retrieve other map information/data associated with serviceable points and/or geographic areas. In one example, the central computing entity 802 can identify, retrieve, or determine the interpolated or reverse geocoded locations on the street networks for one or more of the serviceable points. Or, in another example, the central computing entity 802 can identify, retrieve, and/or reverse geocode the latitude and longitude points of the serviceable points if available, such as the location of 1 Street Address, Anytown, GA being located at 33.7869128, −84.3875602. As will be recognized, a variety of other techniques and approaches can be used to adapt to various needs and circumstances.

The information/data about street networks, street segments, direction, altitudes, longitudes, latitudes, speed limits, direction restrictions, and/or the like can be collected in a variety of ways.

VI. METHOD OF USE

Various embodiments are directed to methods for loading packages 300 within a cargo area 14 of a vehicle 10 (including, inter alia, methods for arranging shelves within the cargo area 14 of the vehicle 10 and placing the packages 300 on the formed shelves), automatically unloading packages 300 for delivery, automatically unloading letters 301 for delivery, and/or the like.

A. Loading Packages

Packages 300 are loaded to identified locations on shelves within the cargo area 14 of a particular vehicle 10, and therefore various embodiments comprise steps for identifying an appropriate location for loading packages 300 onto shelves with the vehicle 10, automatically moving shelf brackets 110 within the cargo area 14 of the vehicle 10 to form shelves to accommodate packages 300 at the identified locations, and for automatically placing packages 300 on those shelves. However, it should be understood that certain embodiments of a vehicle cargo area 14 may have fixed shelves secured relative to sidewalls of the vehicle 10, and packages 300 may be loaded onto the fixed shelves in a manner similar to that discussed herein.

In certain embodiments, a computing entity (e.g., the central computing entity 802) may be configured to ascertain an appropriate vehicle 10 loading strategy for a particular vehicle 10 before beginning the loading process for the vehicle 10. In such embodiments, the central computing entity 802 may generate and/or receive data indicative of all packages 300 assigned for delivery by the particular vehicle 10 on a particular day (e.g., identifying all packages 300 to be placed within the vehicle 10 for a particular delivery route), and may determine appropriate locations for placing all of the packages 300 on the vehicle 10 prior to physically beginning the package 300 loading process. The central computing entity 802 may thus determine an optimal package arrangement within the vehicle 10 for optimizing the spacing between packages 300, the placement of particular packages 300 relative to an expected delivery order, and/or the like.

In certain embodiments, the placement of various packages 300 within a delivery vehicle cargo area 14 may be identified utilizing a repeatable dimensional system to identify particular locations within the vehicle cargo area 14. The dimensional system may be utilized as a reference system for pin-pointing the location of a particular package 300 within the three-dimensional space of the vehicle cargo area 14. For example, the location of particular packages 300 may be identified with respect to one or more reference points, such as the starting location of the picking robots 500. Moreover, the reference system may be consistently utilized for the picking robots 500 and the shelf brackets 110, such that identified locations for packages 300 are identified consistently between both movement mechanisms. Thus, both the location of a picking robot 500 moving to retrieve a particular package 300 may be correlated with the location of shelving brackets 110 supporting the package 300, to enable the picking robot 500 to retrieve the package 300 from the shelving brackets 110.

In certain embodiments, a computing entity (e.g., the central computing entity 802, a vehicle computing entity 810, and/or the like) may determine appropriate placements for various packages 300 in real-time, as those packages 300 are received for placement within the vehicle 10. For example, the computing entity may determine the dimensions and/or weight of each package 300 (e.g., via real-time measurements or via retrieval of dimensional data for the particular package 300), and may determine an appropriate location for placement of the package 300, based at least in part on the dimensions and/or weight of the package 300, the location of free space within the vehicle 10, an expected delivery order for the packages 300, and/or the like.

1. Arranging Shelf Brackets/Rails

The shelving brackets 110 are vertically movable relative to vertical bracket supports 101 within the sidewalls of the cargo area 14 of the vehicle 10. The shelving brackets 110 are configured to form complete shelves comprising a plurality of horizontally aligned shelving brackets 110 (e.g., positioned within adjacent vertical bracket supports 101 within the sidewalls of the cargo area 14 of the vehicle 10). For example, a shelf may comprise at least three horizontally aligned shelving brackets 110 as discussed herein, such that a package 300 placed thereon is secured on the shelf by retaining members 115 positioned adjacent to the front and lateral sides of the package 300, such that the package 300 is prevented from sliding off of the shelf during movement of the vehicle 10.

As mentioned above, a computing entity (e.g., the central computing entity 802) may determine an optimal loading plan for all packages 300 to be placed within a vehicle 10.

In such embodiments, the computing entity may transmit data indicative of the loading plan to the cargo area controller 520, which is configured to control movement of the shelf brackets 110. The cargo area controller 520 may be configured to receive the data indicative of the loading plan, determine the proper shelf placement within the cargo area 14 to enable the loading plan, and may transmit signals to the various shelf brackets 110 to move those shelf brackets 110 into the appropriate position to support packages 300 according to the loading plan. The cargo area controller 520 may further store data indicative of the placement of each package 300 assigned to the vehicle 10, such that the picking robots 500 are configured to properly place the packages 300 within the cargo area 14 once received.

Specifically with reference to the movement of the shelving brackets 110, the cargo area controller 520 may be configured to transmit a signal to movement mechanisms positioned within the individual shelving brackets 110 and/or within the individual vertical bracket supports 101 to move the shelving brackets 110 to a desired vertical position. As mentioned above, the shelving brackets 110 may be movable between a plurality of discrete vertical positions (e.g., defined by locking positions) or the positioning of the shelving brackets 110 may be infinitely adjustable along the length of the vertical bracket supports 101. Accordingly, the cargo area controller 520 may transmit a signal to move the shelving brackets 110 to determined locations along the length of the vertical bracket supports 101. The shelving brackets 110 move upon receipt of the movement signals from the cargo area controller 520, and form shelves at the desired positions within the cargo area 14.

2. Receiving/Placing Packages

Reference will now be made herein to the loading of package 300 to the vehicle 10. As may be appreciated, a sender may send a package 300 to a consignee through a carrier. The carrier may transport the package 300 to one or more intermediate locations, such as processing centers and/or warehouses, in the process of delivering the package 300 to the consignee. Ultimately, the packages 300 may be loaded onto a delivery vehicle 10 for final "last-mile" delivery to an applicable destination location for the package 300.

Referring to FIG. 13, a perspective view of a vehicle 10 being loaded with packages 300 is schematically depicted. In embodiments, the packages 300 may be conveyed into a rear opening of the vehicle 10 by a package conveyor 700. The package conveyor 700 may include a conveyor belt, powered rollers, and/or the like that move packages 300 into the vehicle 10. Moreover, as shown in FIG. 13, the package conveyor 700 may have a width substantially equal to the depth of shelving brackets 110 within the cargo area 14, and may be positioned proximate a shelving location within the cargo area 14. Such placement and configuration enables the picking robots 500 to retrieve packages 300 from the conveying mechanism 700 in a manner similar to retrieving packages 300 from a shelf As mentioned, the picking robots 500 may comprise one or more reading mechanisms configured to (1) determine whether a package 300 is present on the package conveyor 700 at a position that is retrievable by the picking robots 500, and (2) to retrieve package identifying information/data regarding the retrievable package 300 on the package conveyor 700, such that the picking robot 500 may determine the appropriate placement of the package 300 within the cargo area 14.

To retrieve the package 300 from the package conveyor 700, the picking robot 500 positions the end effector 510 parallel with a top surface of the package conveyor 700, such that the platform 514 of the end effector 510 is aligned with the bottom surface of the package 300. The clamping members 516 are then extended from the end effector 510 to opposite sides of the package 300 (while in the disengaged configuration), and the clamping members 516 compress toward the sides of the package 300 to grasp the package 300 (e.g., via a frictional engagement with the surface of the package 300). The clamping members 516 then retract toward the end effector platform 514, thereby pulling the package 300 onto the end effector platform 514. In various embodiments, the end effector rails 512 do not extend while the picking robot 500 retrieves a package 300 from the package conveyor 700. However, it should be understood that in certain embodiments, the end effector rails 512 extend (e.g., between powered rollers of the package conveyor 700) to facilitate a smooth transition from the surface of the package conveyor 700 onto the end effector platform 514.

Based on the package identifying data, the picking robot 500 determines an appropriate position to place the package 300 within the cargo area 14. For example, the cargo area controller 520 may have previously created a shelf (e.g., from a plurality of shelving brackets 110) for the particular package 300 retrieved from the package conveyor 700. Accordingly, the picking robot 500 may move the package 300 to a location aligned with the assigned shelf location for the package 300, and may move the package 300 from the end effector platform 514 onto the shelf (e.g., by extending the end effector rails 512 and/or the clamping members 516 toward the shelf, thereby moving the package 300 on the shelf). As the package 300 is moved onto the shelf, the retaining members 115 of the shelf brackets 110 are retracted as the package 300 passes over each retaining member 115, and the retaining members 115 return to their extended position once the package 300 has passed the retaining members 115. Moreover, retaining members 115 along the sides of the shelf that are not contacted by the package 300 remain in the upright, extended position, thereby forming a retaining perimeter around the package 300 to retain the package 300 on the shelf. Once the package 300 is properly placed on the shelf, the end effector rails 512 and/or the clamping members 516 disengage the package 300 and return to the end effector platform 514. The picking robot 500 may then return to the package conveyor 700 to retrieve another package 300.

In certain embodiments, the shelves may be formed within the cargo area 14 in real-time, as packages 300 are retrieved from the package conveyor 700 by the picking robots 500. In such embodiments, the picking robot 500 may be configured to obtain data indicative of the identity and/or dimensions of the package 300 to determine an appropriate size shelf to be utilized to store the package 300. Upon receipt of the package information/data via the picking robot 500, the cargo area controller 520 may determine an appropriate location for storing the package 300, for example, based on currently occupied space within the cargo area 14 (e.g., based on the location of previously formed shelves and/or previously loaded packages 300). Once a storage location is identified for the package 300, the cargo area controller 520 moves a plurality of shelving brackets 110 along vertical bracket supports 101 into position to support the package 300 at the identified location. After forming the shelf and/or simultaneously while the shelving brackets 110 are moving to form the shelf, the picking robot 500 moves the package 300 to be aligned with the determined location as discussed above. Once the shelf is formed and the picking robot 500 is aligned with the shelf, the picking robot 500 moves the package 300 onto the shelf, as discussed herein.

3. Placing Cargo Cartridge into Vehicle

As mentioned above, the shelving brackets 110 and corresponding vertical bracket supports 101 may be defined within the sidewalls of the vehicle 10 itself, and in such embodiments, packages 300 may be loaded directly into the vehicle 10. However, in certain embodiments the various shelf brackets 110, corresponding vertical bracket supports 101, picking robots 500, and other aspects of the cargo area 14 may be defined within a removable cargo cartridge 1400 that may be selectably loaded and/or unloaded from the vehicle 10.

In embodiments utilizing a cargo cartridge 1400, the cargo cartridge 1400 may be loaded with packages 300 while the cargo cartridge 1400 is positioned outside of a vehicle 10 (according to methodologies discussed above). Once the cargo cartridge 1400 is loaded, the cargo cartridge 1400 may be placed within a delivery vehicle 10, as shown in FIG. 17. The cargo cartridge 1400 may be lifted by a cartridge loader 1401, which may comprise an automated mechanism configured to lift and maneuver cargo cartridges 1400 for movement into and out of vehicles 10. The cartridge loader 1401 may then autonomously move the cargo cartridge 1400 to an appropriate vehicle 10 (which may be determined based on data retrieved from the central computing entity 802 matching the identity of a particular cargo cartridge 1400 with the identity of a particular vehicle 10), and may load the cargo cartridge 1400 within the vehicle 10. In certain embodiments, the cargo cartridge 1400 defines one or more features, such as tabs, rails, grooves, and/or the like), that are configured to engage corresponding features of the vehicle 10, such as corresponding grooves, rails, tabs, and/or the like,) to align the cargo cartridge 1400 within the vehicle 10 and/or to selectably lock the cargo cartridge 1400 within the vehicle 10.

B. Picking Packages for Delivery (Package Presentation)

The cargo area 14 configuration including the picking robots 500 discussed above enables automatic picking of packages 300 for delivery. The picking robots 500 may be configured to automatically identify packages 300 for an upcoming delivery (e.g., the next delivery within an expected delivery order), and may retrieve the one or more packages 300 for the upcoming delivery prior to the vehicle 10 arriving at the delivery location for the upcoming delivery.

In certain embodiments, the vehicle computing entity 810 may periodically and/or continuously monitor the location of the vehicle 10 relative to map data and/or data indicative of an expected delivery order to identify upcoming deliveries along a delivery route. Upon determining that the vehicle 10 remains on an expected travel path corresponding to an originally planned delivery route, the vehicle computing entity 810 may be configured to determine that a next delivery is the sequentially designated next delivery within a delivery plan. However, upon determining that the vehicle 10 deviates from a planned route (e.g., to avoid heavy traffic, closed roads, and/or the like), the vehicle computing entity 810 may be configured to reorganize planned deliveries based on stored map data and the location of planned deliveries on the route, and may identify a next delivery based on the reorganized delivery plan.

In any event, the vehicle computing entity 810 (and/or the cargo area controller 520) may be configured to identify a next package 300 for delivery at an upcoming delivery stop. Because the cargo area controller 520 may store data indicative of the location of the various packages 300 within the cargo area 14 (e.g., on respective shelves therein), the controller is configured to maneuver a picking robot 500 to a position adjacent the particular package 300 for the upcoming delivery to retrieve the package 300.

Figure 8B:
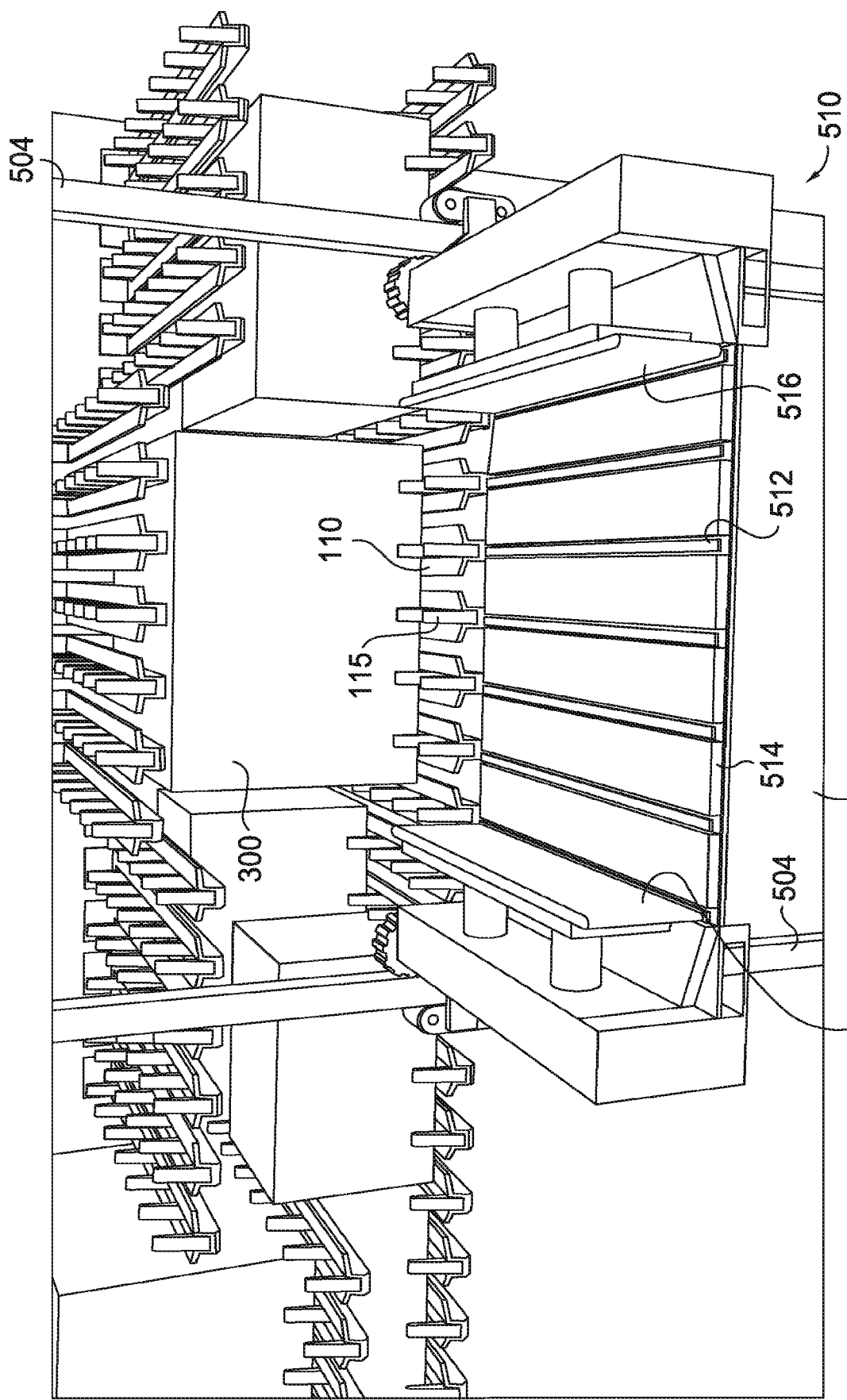

FIGS. 8A-8G provide sequential views of a picking robot 500 retrieving a package 300 from a particular shelf. As shown in FIG. 8A, the retrieval process begins by aligning the end effector 510 with the shelf of a package 300 to be retrieved. The end effector 510 is aligned such that the top surface of the end effector platform 514 is at least substantially planar with the top surface of the support rails 113 of the shelf brackets 110 forming the shelf. As discussed herein, the alignment of the end effector platform 514 with the shelf brackets 110 enables the package 300 to be slid from the shelf brackets 110 onto the end effector platform 514.

Figure 8C:
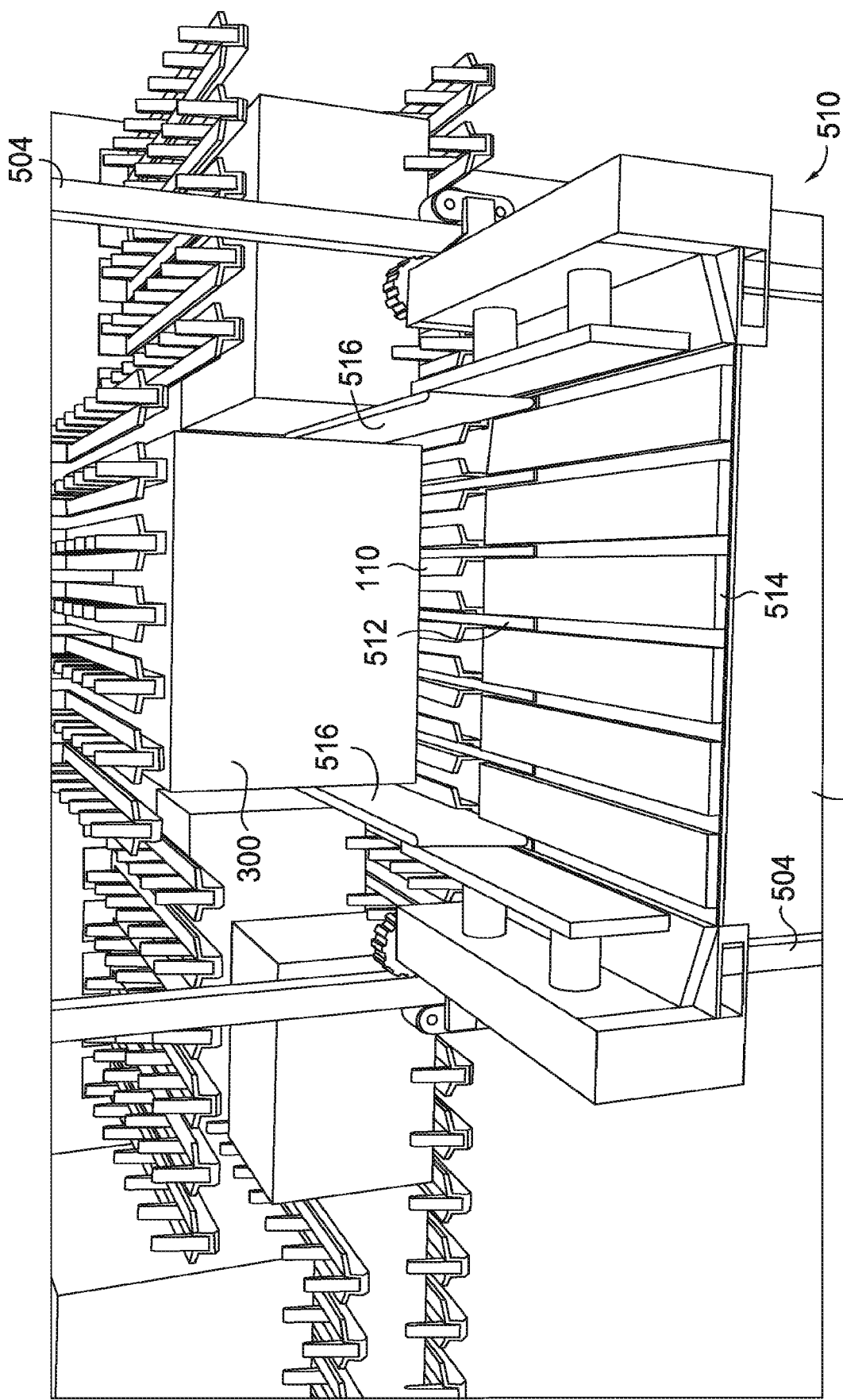
Figure 8D:
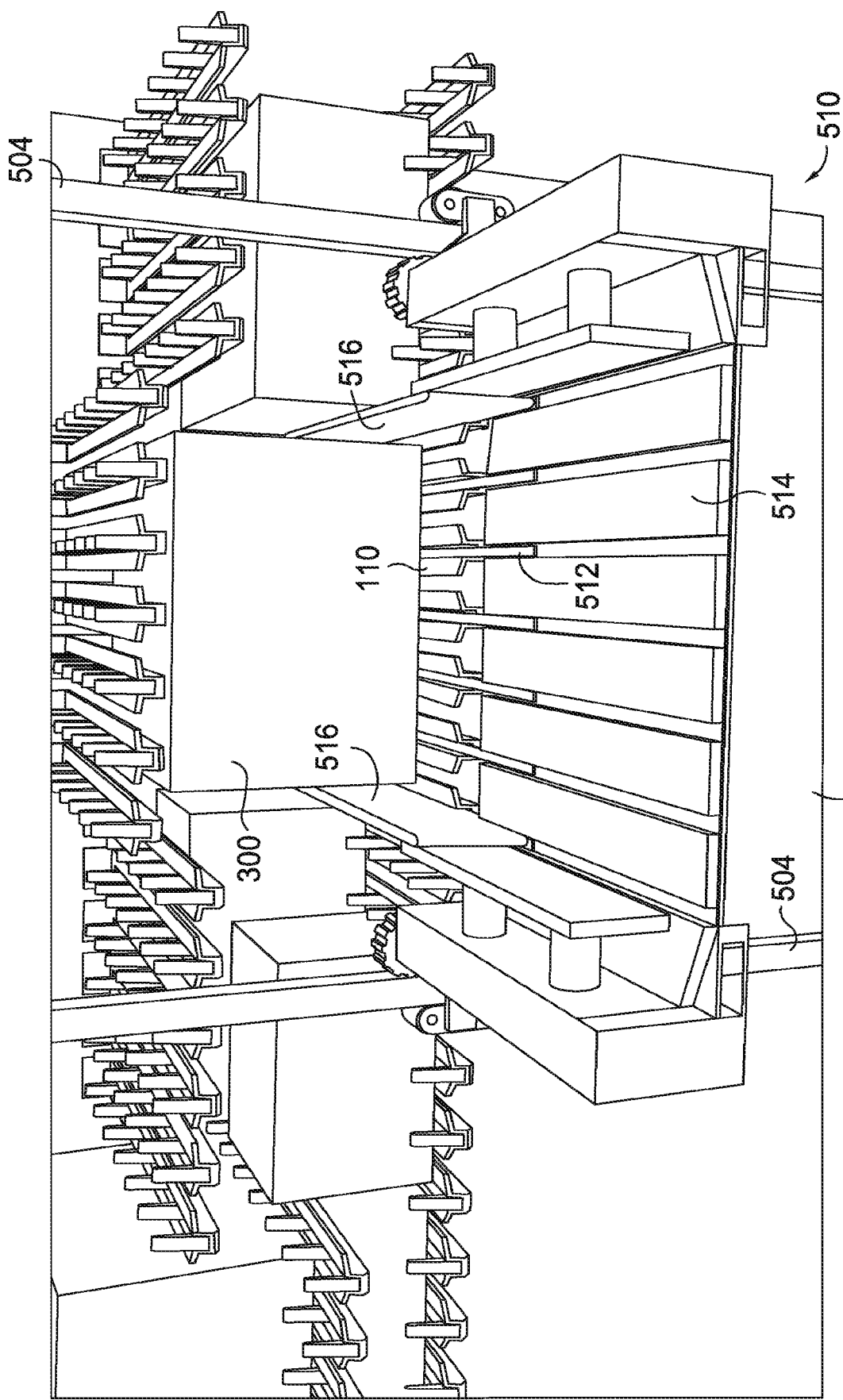

Once aligned with the package 300, the end effector 510 moves the clamping members 516 to enable the clamping members 516 to move between the particular package 300 to be retrieved and any packages 300 on lateral sides of the particular package 300, as shown in FIG. 8B. The picking robot 500 may then extend the end effector rails 512 (e.g., all of the end effector rails 512, or a subset of the end effector rails 512 determined based on the number of shelving brackets 110 utilized to form the shelf for the particular package 300) into the shelving brackets 110 to move the shelf retaining members 115 to the retracted position, thereby enabling the package 300 to be slid along the planar top surface of the shelf support rails 113 onto the end effector platform 514 of the picking robot 500. The picking robot 500 may also extend the clamping members 516 of the end effector 510 onto opposing sides of the package 300. FIG. 8C illustrates the end effector 510 having both clamping members 516 and end effector rails 512 extended to retrieve a particular package 300. As shown in FIG. 8D, the clamping members 516 then move to the engaged configuration in which the clamping members 516 are in frictional engagement with side surfaces of the package 300.

In certain embodiments, the clamping members 516 and/or the end effector rails 512 may move vertically upward relative to the end effector platform 514, as shown in FIG. 8E, thereby lifting the package 300 off of the top surface of the support rails 13 of the shelf brackets 110. By lifting the package 300, the amount of lateral force required to move the package 300 toward the end effector platform 514 may be decreased. Moreover, lifting the package 300 relative to the shelf and the end effector platform 514 may compensate for tolerable differences between the height of the end effector platform 514 and the height of the shelf, which may arise during positioning of the end effector platform 514 relative to the shelf.

Figure 8F:
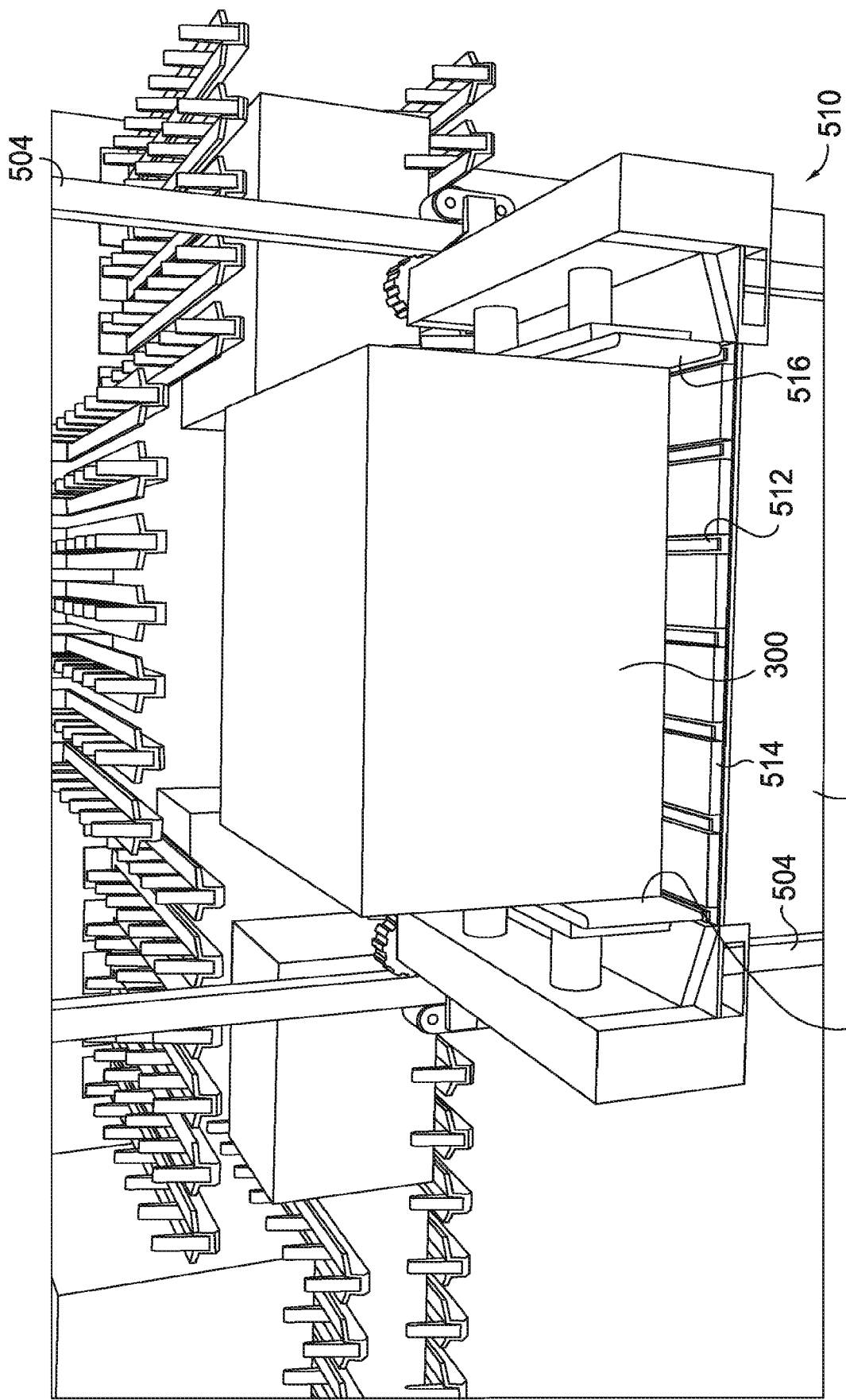

As shown in FIG. 8F, the clamping members 516 are then retracted toward the end effector platform 514 to pull the package 300 onto the end effector platform 514. In certain embodiments, the end effector rails 512 may remain extended during lateral movement of the package 300. However in certain embodiments the end effector rails 512 may retract to the end effector platform 514 at least substantially simultaneously with the clamping members 516.

Figure 8G:
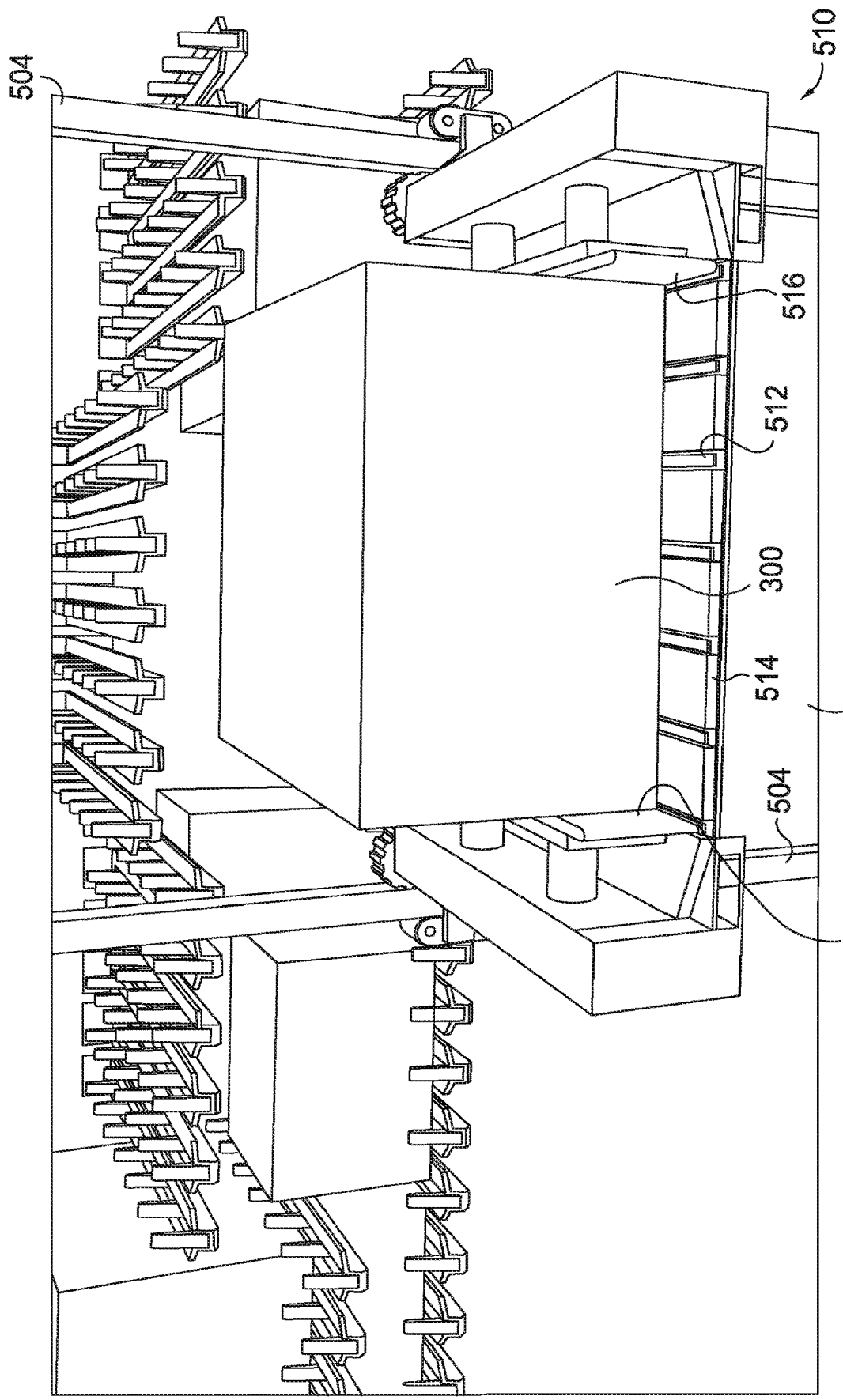
Figure 18:
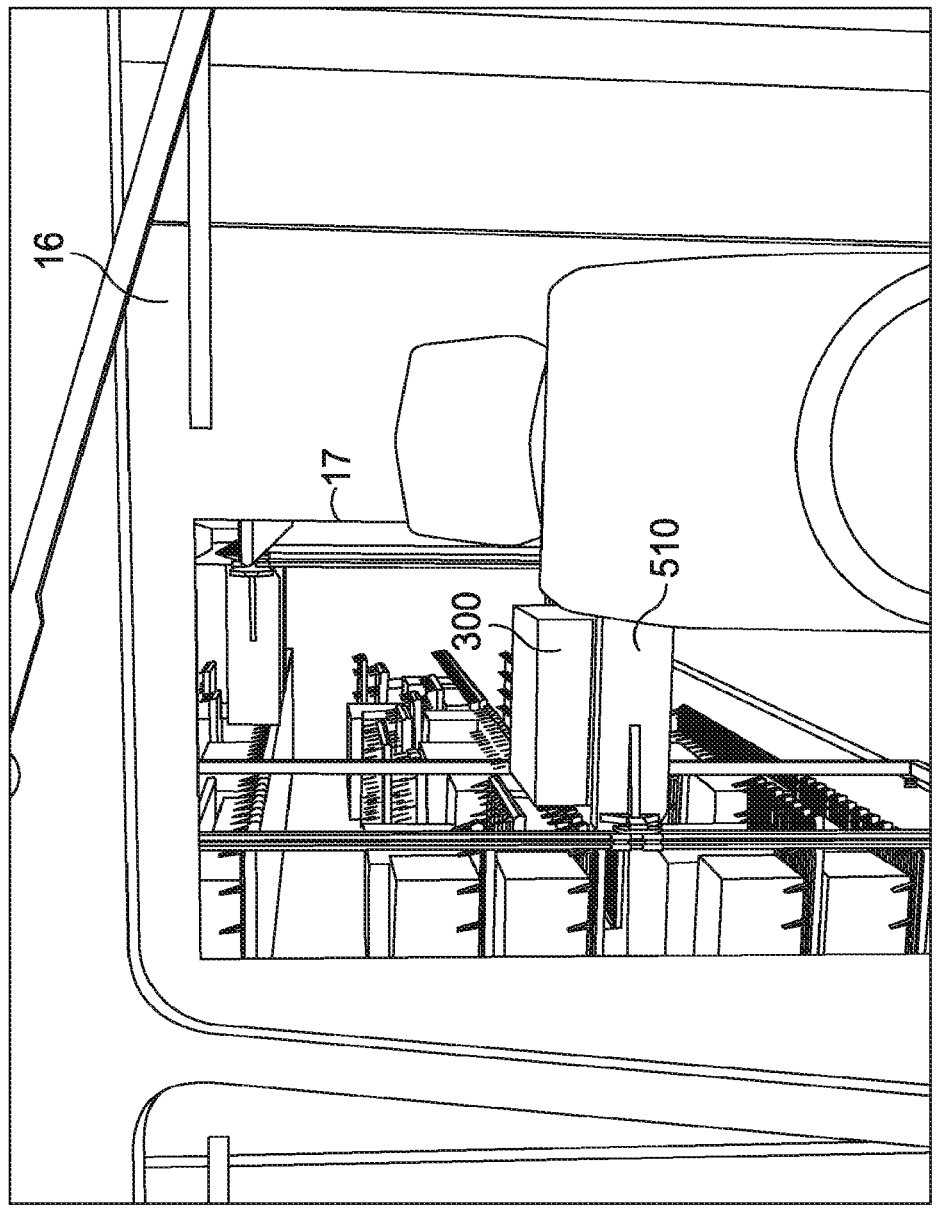
FIG. 18 shows a package presented to a delivery vehicle operator according to one embodiment.

Once the package 300 is secured on the end effector platform 514 (as shown in FIG. 8F), the picking robot 500 moves the package 300 toward the cockpit 13 of the vehicle 10 as represented in FIG. 8G. The picking robot 500 ultimately moves the package 300 to a presentation position as shown in FIG. 18. The clamping members 516 and/or the end effector rails 512 may move downward such that the weight of the package 300 is supported by the end effector platform 514. Moreover, the clamping members 516 may remain in frictional engagement with the sidewalls of the package 300 while the package 300 is moved by the picking robot 500 to ensure the package 300 remains on the end effector platform 514 during movement of the picking robot 500.

In certain embodiments, the presentation position may be located in the cockpit 13 (and accordingly the picking robots 500 may be configured to move into the cockpit 13 of the vehicle 10). However, in certain embodiments, the presentation position may be located within the cargo area 14, adjacent the cockpit 13, such that a delivery vehicle operator may retrieve the package 300 from the picking robot 500 while the delivery vehicle operator remains within the cockpit 13. In certain embodiments, the presentation position may be located adjacent a window and/or door extending through the bulkhead wall 16.

The picking robot 500 may be configured to retain the clamping members 516 in holding engagement with the package 300 while the package 300 is on the end effector platform 514 and the vehicle 10 is moving. Once the vehicle 10 reaches the delivery destination for the package 300, and the vehicle 10 stops moving (e.g., as determined by the vehicle computing entity 810), the picking robot 500 may be configured to release the clamping members 516 from the package 300, thereby enabling the vehicle operator to lift the package 300 off of the end effector platform 514 to transport the package 300 to the delivery location. In certain embodiments, the end effector 510 may comprise one or more package sensors thereon, the package sensors being configured to determine whether the package 300 has been removed from the end effector platform 514. For example, the package sensors may comprise pressure sensors, optical sensors, and/or the like. Accordingly, upon determining that a package 300 has been removed from the end effector platform 514, the picking robot 500 may begin performance of additional actions, such as retrieving another package 300 for delivery.

In certain embodiments, the picking robot 500 may be configured to repeat the process of retrieving and presenting a package 300 to the vehicle operator while the vehicle 10 remains at a delivery stop. For example, while the delivery vehicle operator is transporting a first package 300 to the delivery location, the picking robot 500 may retrieve a second package 300 for delivery to the same destination location, such that the package 300 is available and presented for the delivery vehicle operator when the delivery vehicle operator returns to the vehicle 10.

C. Picking Packages for Delivery (Cart Loading)

In certain embodiments, the picking robots 500 may be configured to generate a stack of packages 300 to be delivered at a single delivery stop in the delivery staging area 15 of the cargo area 14. For example, upon determining that a plurality of packages 300 are to be delivered at a single, upcoming delivery stop, the picking robots 500 (e.g., via the cargo area controller 520) may be configured to load the packages 300 into a stack located in the delivery staging area 15 of the cargo area 14, such that a plurality of packages 300 may be easily transported from the vehicle 10 to the delivery destination simultaneously via the cart 50.

As discussed above, the vehicle computing entity 810 and/or the cargo area controller 520 may be configured to identify the one or more packages 300 to be delivered to the upcoming destination location. Upon determining the identity and location of the packages 300 to be delivered, the picking robots 500 may retrieve the packages 300 from the respective locations within the cargo area 14 as discussed above with reference to FIGS. 8A-8G (e.g., by aligning the end effector 510 with the package 300, extending the end effector rails 512 and the clamping members 516, and pulling the package 300 onto the end effector platform 514). The picking robots 500 may then deliver the packages 300 to the delivery staging area 15 to create a stack of packages 300 therein.

In certain embodiments, as the picking robot 500 approaches the delivery staging area 15 with a package 300, the picking robot 500 determines the height of an existing stack of packages 300 at the delivery staging area 15. For example, the cargo area controller 520 may monitor the identity of packages 300 previously placed in the delivery staging area 15, and may sum the height of those packages 300 therein. As yet another example, the picking robot 500 may comprise a sensor (e.g., an optical sensor) for identifying a top surface of a stack of packages 300 within the delivery staging area 15. Thus, the picking robot 500 may determine the height of packages 300 within the delivery staging area 15, and may align the end effector 510 at the appropriate height to place the package 300 onto the top surface of the stack of packages 300. Once aligned, the clamping members 516 may extend outward toward the stack of packages 300 to move the package 300 onto the top surface of the stack of packages 300. The clamping members 516 may then release the package 300.

In certain embodiments, the delivery staging area 15 may comprise a stack retaining member configured to retain the packages 300 in a stack of packages 300 within the delivery staging area 15. For example, an extendable member may be configured to place a compressive force on the top surface of the stack of packages 300, to prevent the packages 300 from moving within the delivery staging area 15. As yet another example, the picking robot 500 may be configured to retain the stack of packages 300 within the delivery staging area 15 after placement of a package 300 therein. For example, once the package 300 has been placed within the delivery staging area 15, the picking robot 500 may move vertically to the newly formed top surface of the stack of packages 300, and may be configured to extend the end effector rails 512 above the top surface of the stack of packages 300. The picking robot 500 may be configured to apply a compressive force onto the top surface of the stack of packages 300 with the end effector rails 512, to retain the package 300 stack while the vehicle 10 continues travelling. In embodiments in which the cargo area 14 comprises a plurality of picking robots 500, the other picking robots 500 may continue retrieving additional packages 300 to be placed within the stack of packages 300 in the delivery staging area 15. Once an additional picking robot 500 is ready to place another package 300 onto the stack of packages 300 within the delivery staging area 15, the picking robot 500 holding the packages 300 in place is moved away from the delivery staging area 15 such that the additional picking robot 500 can stack an additional package 300, and to apply a holding pressure on the stack. The picking robots 500 may then switch roles, such that the initial picking robot 500 can then retrieve another package 300 for the stack. This process may be repeated until all packages 300 to be delivered during a single delivery stop are placed within the delivery staging area 15, and/or until the delivery staging area 15 is full (e.g., the packages 300 within the delivery staging area 15 reach a height and/or weight threshold). As discussed herein, if additional packages 300 are to be delivered to at the delivery stop, the delivery staging area 15 loading process may continue later, while the vehicle operator is delivering the first load of packages 300 to the delivery location.

Once the delivery vehicle 10 has stopped at the delivery location, the delivery staging area 15 (including the cart 50 and the cart staging plate 61) may be lowered below the cargo area floor, to the support surface for the vehicle 10 (e.g., the ground on which the vehicle 10 travels). As mentioned above, the cart 50 is secured relative to the cart staging plate 61, such that both the cart 50 and cart staging plate 61 may be lowered simultaneously, while supporting the formed stack of packages 300 thereon. Once the cart 50 and cart staging plate 61 are supported on the support surface below the vehicle 10, the delivery vehicle operator may access the cart 50 (e.g., through the access door 12) to perform a delivery. Moreover, once the cart 50 and cart staging plate 61 are supported on the support surface, the cart 50 may be released from the cart staging plate 61, thereby enabling the cart 50 and packages 300 placed on the cart 50 to be lifted away from the cart staging plate 61 to enable delivery of the packages 300.

In certain embodiments, the cart staging plate 61 may be configured to return into the interior of the cargo area 14 while the cart 50 is removed therefrom during a delivery. Once inside the cargo area 14, the cart staging plate 61 is configured to receive additional packages 300 to be delivered at the same delivery location. The picking robots 500 may continue picking packages 300 for delivery at the particular destination location and placing those packages 300 in the delivery staging area 15 (on the cart staging plate 61) as discussed above. Once the delivery staging area 15 is full and/or all of the packages 300 for delivery at the destination location are loaded in the delivery staging area 15, the cart staging plate 61 is lowered to the support surface below the vehicle 10. In certain embodiments, the cart staging plate 61 may remain within the cargo area 14 until the occurrence of a trigger event, such as the vehicle operator pressing a button on the vehicle 10 and/or the mobile carrier computing entity 806, the vehicle computing entity 810 detecting the presence of the vehicle operator, and/or the like. Such trigger events may provide added security against unauthorized retrieval of packages 300 from the vehicle 10 by retaining the packages 300 within the locked cargo area 14 of the vehicle 10 until the delivery vehicle operator is ready to retrieve additional packages 300 for delivery.

With the cart staging plate 61 on the support surface below the vehicle 10, the tines 56 of the cart 50 may be inserted between corresponding staging tines 62 of the cart staging plate 61 to enable the cart 50 to engage the stack of packages 300. With the cart's tines 56 positioned below the stack of packages 300 (and between the staging tines 62 of the cart staging plate 61), the cart 50 and packages 300 may be lifted away from the cart staging plate 61 (e.g., by tilting the cart 50 onto the cart's wheels to lift the base portion 55 of the cart 50), and may be delivered to the delivery location. The process may be repeated, with the cart staging plate 61 retracting into the cargo area interior to enable another loading procedure thereon.

D. Irregular Package Delivery

Large packages, heavy packages, irregularly shaped packages 302, and/or the like that are not capable of automated storage, retrieval, and/or delivery utilizing the adjustable shelving brackets 110 and/or the picking robots 500 may be retrieved from the cargo area 14 manually to complete delivery. Upon determining that an upcoming delivery comprises one or more irregular packages 302, the vehicle computing entity 810 and/or the cargo area controller 520 may be configured to move the picking robots 500 to a starting position to enable unobstructed access to the interior of the cargo area 14 by the vehicle operator. For example, the picking robots 500 may be moved to an uppermost position along a vertical upright member 504, such that the vehicle operator may walk along the central aisle of the cargo area 14, below the end effectors 510 of the one or more picking robots 500.

In certain embodiments, the irregular package 302 may be removable from a rear-access door of the cargo area 14. As yet another example, the delivery staging area 15 may be accessible to the delivery vehicle operator, such that the irregular packages 302 may be manually stacked in the delivery staging area 15. Once all of the packages 300 (e.g., including irregular packages 302) for delivery are stacked thereon, the delivery vehicle operator may provide an indicator to the cargo area controller 520 (e.g., by pressing a button located within the cargo area 14, by scanning all packages 300 loaded on the cart 50, and/or the like), and the cart 50 may lower onto the support surface below the vehicle 10 to ease transportation of the irregular packages to the delivery location.

In certain embodiments, irregular or other packages 302 not capable of automated picking by the picking robots 500 may be provided on one or more shelves within the cargo area 14. These irregular packages 302 may be retrievable from the shelves manually, by a vehicle operator. However, due to the presence of the package retaining members 115 in the shelving brackets 110, the vehicle operator may utilize a tool or other retaining member retraction mechanisms to enable access to the irregular packages 302 stored in on the shelves. For example, a tool comprising one or more prongs configured to be inserted into the channel 114 of the shelving brackets 110 may be inserted therein to retract the retaining members 115 of the shelves to enable access to an irregular package 302 stored thereon. As yet another example, the shelving brackets 110 may have integrated retaining member retraction mechanisms, such as manually operated buttons, levers, and/or the like connected to a mechanism for retracting the retaining members 115. Accordingly, the delivery vehicle operator may activate the retaining member retraction mechanism to enable manual access to an irregular package 302 stored on a shelf within the cargo area 14.

E. Letter Delivery

As discussed herein, letters 301 may be presented to a vehicle operator for delivery according to one or more mechanisms.

In certain embodiments, letters 301 are stored within a tote 70 that is stored on a shelf within the cargo area 14. In certain embodiments, the tote 70 may be stored at a predetermined tote location, however in other embodiments the cargo area controller 520 may rearrange the tote 70 to optimize the total configuration of packages 300 within the cargo area 14.

Upon determining that a letter 301 is to be delivered to an upcoming delivery stop (e.g., based at least in part on map information/data and/or information/data indicative of an original delivery plan), the cargo area controller 520 is configured to retrieve the tote 70 from the storage location in a manner as described for retrieving a package 300 in reference to FIGS. 8A-8G, and to present the tote 70 to the delivery vehicle operator in the presentation position. The delivery vehicle operator may retrieve the letter 301 for delivery from the tote 70, and the picking robot 500 may then return the tote 70 to the designated storage location within the cargo area 14. In certain embodiments, the letters 301 may be sorted within the tote 70 according to an expected delivery order, to ease the delivery vehicle operator's task of selecting a letter 301 for delivery at the desired destination location. However, it should be understood that letters 301 within the tote 70 may be provided in any order.

As yet another example, the tote 70 may be provided with an automated, single-letter presentation mechanism configured to present a single letter 301 to the delivery vehicle operator while the vehicle 10 is at a delivery location for a letter 301. As discussed above, the tote 70 may define a letter slot 71 within a bottom portion of the tote 70, and may comprise an advancement mechanism configured to move letters 301 through the letter slot 71, down a letter chute 77 extending through the bulkhead wall 16, and into a letter bin 78 within the cockpit 13 of the vehicle 10. In such embodiments, the letters 301 are sorted within the tote 70 in an expected delivery order, such that the letters 301 are presented to the delivery vehicle operator in order, as the delivery locations are approached along the delivery route.

In use, the vehicle computing entity 810 and/or cargo area controller 520 are configured to determine that a letter 300 is to be delivered at an upcoming delivery stop. As the vehicle 10 approaches the delivery stop, the cargo area controller 520 may operate the letter advancement mechanism within the tote 70 (e.g., via an external power source within the vehicle 10) to cause the next letter 301 within the tote 70 to advance to the letter slot 71, and slide down the letter chute 77 into the letter bin 78 within the cockpit 13 of the vehicle 10. The delivery vehicle operator may then retrieve the letter 301 from the letter bin 78 to complete the delivery.

Upon determining that the automated tote 70 is emptied (e.g., all letters 301 have been provided to the letter bin 78 and delivered to respective destination locations), the cargo area controller 520 may cause the picking robot 500 to remove the tote 70 from the loaded position to place the tote 70 in a storage location on a shelf of the cargo area 14. In certain embodiments, another partially or fully filled tote 70 may be placed in the loaded configuration to provide additional letters 301 to the delivery vehicle operator for later deliveries.

F. Package Pick-Ups

During a delivery route, delivery vehicles 10 may obtain additional package pickups from package origin locations that are to be delivered by a package carrier. The automated delivery vehicle 10 may be configured to receive those picked-up packages 300 to be carried back to a carrier location.

In certain embodiments, picked-up packages 300 may be placed on the end effector 510 of the picking robot 500 to be placed into the cargo area 14. The picking robot 500 may be configured to retrieve data indicative of the weight and/or dimensions of the picked-up package 300. For example, package data regarding the picked-up package 300 may be stored in the central computing entity 802 and may be provided to the vehicle computing entity 810 upon scanning of the package 300 or otherwise identifying the package 300. The cargo area controller 520 may then utilize the data of the dimensions and/or weight of the package 300, and may determine an appropriate location for the picked-up package 300 to be stored within the cargo area 14. In certain embodiments, the cargo area controller 520 may move one or more shelving brackets 110 to form a new shelf for the picked-up package 300.

The cargo area 14 may additionally comprise a picked-up package staging area configured to receive picked-up packages 300 prior to sorting into storage locations within the cargo area 14. For example, the picked-up package staging area may be defined as an area within the cargo area 14 proximate the rear door, proximate (and/or including) the delivery staging area 15, and/or the like. The delivery vehicle operator may place a plurality of packages 300 into the picked-up package staging area, and the one or more picking robots 500 may be configured to retrieve the packages 300 from the picked-up package staging area to place those packages 300 into respective storage locations (e.g., on shelves) within the cargo area 14. As yet another alternative, the cart 50 may be loaded into the delivery staging area 15 while having a plurality of picked-up packages 300 thereon. Once the cart 50 is secured within the cargo area 14, the one or more picking robots 500 may retrieve packages 300 from the stack of packages 300 on the cart 50, and may sort those packages 300 onto shelves within the cargo area 14.

As yet another example, a delivery vehicle operator may place picked-up packages 300 into the irregular package storage area that is not accessible by the picking robots 500. Such packages 300 may then be transported by the delivery vehicle 10, without interfering with the operation of the picking robots 500.

VII. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A cargo cartridge comprising:
   at least one vertical bracket support;
   an adjustable shelf bracket configured to move vertically relative to the at least one vertical bracket support in response to a signal transmitted from a cargo area controller; and
   a support rail, coupled to the adjustable shelf bracket, the support rail comprising a channel bound by a first sidewall that is substantially vertical, a second sidewall that is substantially vertical and parallel to the first sidewall, and a bottom surface extending at least partially along a length of the support rail.

2. The cargo cartridge of claim 1, wherein the adjustable shelf bracket is configured to move via one or more electrical motors driving a belt.

3. The cargo cartridge of claim 1, wherein the adjustable shelf bracket is configured to move via one or more electrical motors driving a screw-drive.

4. The cargo cartridge of claim 1, wherein the adjustable shelf bracket is configured to move via one or more solenoids.

5. A cargo cartridge comprising:
   a plurality of shelf brackets adjustably coupled to a plurality of vertical bracket supports; and
   a plurality of support rails coupled to the plurality of shelf brackets, wherein each of the plurality of support rails comprises a channel bound by a first sidewall that is substantially vertical, a second sidewall that is substantially vertical and parallel to the first sidewall, and a bottom surface extending at least partially along a length of the support rail, and the plurality of shelf brackets is configured to move vertically relative to the plurality of vertical bracket supports in response to signals transmitted from a cargo area controller.

6. The cargo cartridge of claim 5, wherein each of the plurality of vertical bracket supports defines a plurality of engagement positions that comprise at least one of grooves, detents, notches, or ridges configured to enable a secure engagement between the plurality of shelf brackets and the plurality of vertical bracket supports.

7. The cargo cartridge of claim 1, wherein the cargo cartridge is configured to engage with a cargo area.

8. The cargo cartridge of claim 7, wherein the cargo area comprises at least one of rails, tracks, or grooves on at least one of a floor or a sidewall of the cargo area that is configured to guide the cargo cartridge into engagement with the cargo area.

9. The cargo cartridge of claim 7, wherein the cargo area further comprises
a picking robot configured to interact with the adjustable shelf bracket, the picking robot movable along a horizontal track associated with the cargo area.

10. The cargo cartridge of claim 7, wherein the cargo area is associated with a delivery vehicle.

11. The cargo cartridge of claim 10, wherein the cargo area controller is in communication with a central computing entity.

12. The cargo cartridge of claim 5, wherein the plurality of shelf brackets is configured to move via one or more solenoids.

13. The cargo cartridge of claim 5, wherein the plurality of vertical bracket supports extends along at least substantially the entire height of a sidewall of the cargo cartridge.

14. The cargo cartridge of claim 5, wherein the vertical brackets of the plurality of vertical brackets are spaced at least substantially evenly across the length of the cargo cartridge.

15. The cargo cartridge of claim 5, wherein the plurality of shelf brackets further comprises an engagement feature configured to engage with the plurality vertical bracket supports.

16. The cargo cartridge of claim 5, wherein the plurality of shelf brackets is configured to move via one or more electrical motors driving a belt.

17. The cargo cartridge of claim 5, wherein the plurality of shelf brackets is configured to move via one or more electrical motors driving a chain.

18. The cargo cartridge of claim 5, wherein the plurality of shelf brackets is configured to move via one or more electrical motors driving a screw-drive.

19. A method comprising:
receiving, via a cargo cartridge, a movement signal from a cargo area controller, the cargo cartridge comprising:
a plurality of shelf brackets adjustably coupled to a plurality of vertical bracket supports;
a plurality of support rails coupled to the plurality of shelf brackets; and
based on receiving the movement signal, causing movement of a shelf bracket of the plurality of shelf brackets vertically relative to at least one vertical bracket support of the plurality of vertical bracket supports.

20. The method of claim 19, further comprising:
determining, by a central computing entity, package characteristics of a package, wherein the package characteristics comprise at least one of a length, a width, or a height of the package;
determining, by the central computing entity and based at least in part on the package characteristics, a cubic measurement of the package;
generating, by the central computing entity, a loading plan, wherein the loading plan comprises the cubic measurement of the package; and
transmitting, by the central computing entity, the loading plan to the cargo area controller, wherein the movement signal provided by cargo area controller is based at least in part on the loading plan.

* * * * *